United States Patent
Tajima et al.

(10) Patent No.: US 6,565,116 B1
(45) Date of Patent: May 20, 2003

(54) HEAD PROTECTING AIRBAG DEVICE

(75) Inventors: Hiroyuki Tajima, Chiryu (JP); Yutaka Nagai, Ichinomiya (JP); Fumitake Kobayashi, Ichinomiya (JP); Chiharu Totani, Gifu (JP); Yasuyuki Osawa, Nagoya (JP); Yoshitaka Terada, Nagoya (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 10 days.

(21) Appl. No.: 09/586,613

(22) Filed: Jun. 2, 2000

(30) Foreign Application Priority Data

| Jun. 2, 1999 | (JP) | 11-155480 |
| Oct. 19, 1999 | (JP) | 11-297433 |
| Oct. 27, 1999 | (JP) | 11-306033 |
| Dec. 24, 1999 | (JP) | 11-367024 |

(51) Int. Cl.[7] .................................... B60R 21/22
(52) U.S. Cl. .................. 280/730.2; 280/728.2; 280/728.3; 24/453; 24/297; 411/41; 411/45; 411/60
(58) Field of Search .................. 280/728.3, 728.2, 280/730.2; 24/453, 297; 411/41, 45, 46, 47, 48, 60.1

(56) References Cited

U.S. PATENT DOCUMENTS

| 3,310,929 A | * | 3/1967 | Garvey | 24/295 |
| 4,402,118 A | * | 9/1983 | Benedetti | 24/289 |
| 4,630,338 A | * | 12/1986 | Osterland et al. | 24/293 |
| 4,644,612 A | * | 2/1987 | Osterland | 24/289 |
| 4,784,550 A | * | 11/1988 | Wollar | 411/32 |
| 4,874,276 A | * | 10/1989 | Iguchi | 24/297 |
| 4,952,106 A | * | 8/1990 | Kubogochi et al. | 411/48 |
| 5,201,623 A | * | 4/1993 | Benedetti et al. | 411/41 |
| 5,265,903 A | * | 11/1993 | Kuretake et al. | 280/730.2 |
| 5,370,484 A | * | 12/1994 | Morikawa et al. | 411/41 |
| 5,542,158 A | * | 8/1996 | Gronau et al. | 24/289 |
| 5,562,375 A | * | 10/1996 | Jackson | 411/48 |
| 5,636,891 A | * | 6/1997 | Van Order et al. | 224/313 |
| 5,722,124 A | * | 3/1998 | Wisniewski | 24/295 |
| 5,788,270 A | * | 8/1998 | Håland et al. | 280/729 |
| 5,791,683 A |   | 8/1998 | Shibata et al. | 280/730.2 |
| 5,846,040 A | * | 12/1998 | Ueno | 411/369 |
| 6,074,150 A | * | 6/2000 | Shinozaki et al. | 24/297 |
| 6,082,761 A | * | 7/2000 | Kato et al. | 280/728.2 |
| 6,089,805 A | * | 7/2000 | Salmon | 411/40 |

(List continued on next page.)

FOREIGN PATENT DOCUMENTS

| EP | 705738 A1 | * | 4/1996 | B60R/21/22 |
| EP | 983915 A2 | * | 3/2000 | B60R/21/22 |

OTHER PUBLICATIONS

Patent Abstracts of Japan, JP 09315253 (Sep. 1997).

*Primary Examiner*—Anne Marie Boehler
*Assistant Examiner*—Paul Royal, Jr.
(74) *Attorney, Agent, or Firm*—Pillsbury Winthrop LLP

(57) ABSTRACT

A head-protecting airbag device includes an airbag cover mounted on the body of a vehicle for covering a folded airbag. The airbag cover includes an airbag cover body and a clip portion protruding from the back side of the airbag cover body. The clip portion is inserted into a retaining of the vehicle body and is retained by the vehicle body. The clip portion can establish two states: a first retaining state, in which the clip portion is so unextractably retained in the retaining hole that the clip portion cannot be pulled from the body; and a second retaining state, in which the clip portion is inserted farther into the retaining hole compared to the first retaining state and is extractably retained to permit extraction of the clip portion from the body. The head-protecting airbag device can firmly mount the airbag cover to and easily dismount the airbag cover from the vehicle body.

16 Claims, 48 Drawing Sheets

U.S. PATENT DOCUMENTS

| | | | | |
|---|---|---|---|---|
| 6,101,686 A | * | 8/2000 | Velthoven et al. | 24/289 |
| 6,129,377 A | * | 10/2000 | Okumura et al. | 280/730.2 |
| 6,141,837 A | * | 11/2000 | Wisniewski | 24/289 |
| 6,142,506 A | * | 11/2000 | Patel et al. | 280/728.2 |
| 6,224,091 B1 | * | 5/2001 | Eyrainer et al. | 280/730.2 |
| 6,234,515 B1 | * | 5/2001 | Iwanaga | 280/728.2 |
| 6,234,516 B1 | * | 5/2001 | Boxey | 280/729 |
| 6,238,438 B1 | * | 5/2001 | Fischer et al. | 280/728.2 |
| 6,254,123 B1 | * | 7/2001 | Urushi et al. | 280/730.2 |
| 6,260,878 B1 | * | 7/2001 | Tanase | 280/730.2 |
| 6,264,234 B1 | * | 7/2001 | Hill et al. | 280/729 |
| 6,264,393 B1 | * | 7/2001 | Kraus | 24/297 |
| 6,296,269 B1 | * | 10/2001 | Nagai et al. | 280/728.2 |
| 6,311,960 B1 | * | 11/2001 | Pierman et al. | 267/260 |
| 6,322,126 B1 | * | 11/2001 | Kraus | 24/297 |
| 6,332,628 B1 | * | 12/2001 | Tschaeschke | 280/728.2 |

* cited by examiner

First fastening condition

Inserting direction

First fastening condition

Inserting direction

Second fastening condition

First fastening condition

Second fastening condition

HEAD PROTECTING AIRBAG DEVICE

RELATED APPLICATIONS

This application claims priority of Japanese Patent Application No. Hei 11-155480, Japanese Patent Application No. Hei 11-297433, Japanese Patent Application No. Hei 11-306033, and Japanese Patent Application No. Hei 11-367024. The complete disclosures of each of these Japanese patent applications are incorporated herein by reference.

BACKGROUND OF THE INVENTION

1. Field of the Invention

The present invention relates to a head-protecting airbag device provided with an airbag cover mounted on a body and covering a housed airbag. The airbag cover is pushed and opened by the airbag as the airbag inflates and expands, thus creating an opening for the airbag to protrude into the vehicle interior compartment.

2. Description of the Related Art

In the prior art, the airbag of the head-protecting airbag device is folded and housed from a pillar portion to a roof side rail portion at the peripheral edge of an opening, such as a door or window, on the interior side of a vehicle. An airbag cover conceals the airbag. The airbag is inflated to expand while opening the airbag cover (or a pillar garnish) when inflating gas flows into the airbag (as referred to in Unexamined Published Japanese Patent Application No. 9-315253).

The airbag cover of the head-protecting airbag device is firmly fixed on the body so as to prevent the airbag cover from being removed when pushed by the inflating airbag. Typically, the airbag cover is fixed on the body by mounting bolts, which are fastened on the body from the interior side of the vehicle.

When bolts are used, however, the head portions of the bolts are exposed to the vehicle compartment. From a design standpoint, it is necessary to hide the head portions of the bolts with caps or the like. Naturally, such caps have to be mounted so that the caps, too, are not removed when the airbag cover is opened. Thus, members for preventing the caps from being removed are indispensable in the prior art.

In summary, in order to fix the airbag cover on the body, not only are mounting bolts required, but caps and mounting members for the caps are also required. These requirements increase the number of parts and manufacturing steps, as well as the cost for mounting the airbag cover.

In order to avoid the requirements and problems of prior art, it is conceivable to provide clips on the back side of the airbag cover. These clips are retained on the body by inserting the clips into retaining holes formed in the body. By using these clips, the airbag cover is fixed on the body. These clips must be so firmly mounted on the body to prevent the airbag cover from being removed from the body when the airbag expands. If the clips are firmly mounted on the body, however, the airbag cover cannot be easily demounted, for maintenance or the like, from the body.

SUMMARY OF THE INVENTION

In order to solve the above-specified problems, the invention has a first object to provide a head-protecting airbag device with an airbag cover which can be firmly mounted in an easily demountable manner on the body without using any mounting bolt.

A second object of the invention is to provide a head-protecting airbag device with an airbag cover which can cover an airbag folded in a rear pillar portion, while maintaining an aesthetically pleasing appearance in the design of the rear pillar portion.

A third object of the invention is to provide a head-protecting airbag device with an airbag cover having a door portion which opens smoothly and quickly when the airbag is inflated to expand.

The first object of the invention can be achieved by a head-protecting airbag device comprising an airbag cover mounted on the body of a vehicle for covering a folded airbag. The vehicle body includes a retaining hole. The airbag cover includes an airbag cover body and a clip portion protruding from the back side of the airbag cover body. The clip portion is inserted into the retaining hole and retained by the body. The clip portion can establish two states: a first retaining state, in which the clip portion is so unextractably retained, when inserted into the retaining hole, that the clip portion cannot be removed from the retaining hole of the body by pulling the clip portion in an opposite direction to the inserting direction; and a second retaining state, in which the clip portion is inserted farther into the retaining hole than the position of the stated first retaining state, and is extractably retained to permit removal of the clip portion from the retaining hole of the body.

In the airbag cover of this head-protecting airbag device, the clip portion is inserted into the retaining hole to establish the first retaining state. Then, the clip portion is retained unextractably to the body so that the airbag cover is firmly mounted on the body. If the clip portion is pushed into the second retaining state, the clip portion can be simply extracted from the body.

In this head-protecting airbag device, therefore, the airbag cover can be firmly mounted in an easily demountable manner on the body without using any mounting bolt.

The stated clip portion may be constructed in the following manner. Specifically, the clip portion includes a plurality of pawl members adapted to be unextractably retained by the back side of a circumferential edge portion of the body defining the retaining hole. Each of these pawl members has a shrinking guide portion. From the first retaining position, the clip portion may be moved farther in the inserting direction so that the shrinking guide portion is guided by the retaining hole circumferential edge into the second retaining position, in which the pawl members are retained close to each other.

In the first retaining state, the clip portion is inserted into the retaining hole so that each pawl member is arranged on the body back side of the retaining hole circumferential edge. As a result, the airbag cover can be firmly mounted on the body.

When the airbag cover is to be demounted from the body, the clip portion is inserted together with the airbag cover farther in the inserting direction so as to take the second retaining state. Then, the shrinking guide portion is guided by the retaining hole circumferential edge on the body surface side to bring the pawls members close to each other, into a proximate (or narrow) state, in which the pawl members are retained. After placing the pawl members into the proximate state, the clip portion can be extracted from the retaining hole, without any interference with the circumferential edge of the retaining hole, by moving the airbag cover in an opposite direction to extract the clip portion from the retaining hole. As a result, the airbag cover can be simply demounted from the airbag cover.

The clip portion may be constructed of a core member and a cap as follows. The core member has rigidity, and includes a neck portion and a head portion. The neck portion protrudes from the back side of the airbag cover body. The head portion is arranged at the leading end of the neck portion, and has a larger width size than the neck portion. The cap is elastically deformable, and is mounted around the core member so as to cover the root portion side of the neck portion and the root portion side of the head portion. The cap includes first and second grooves and a fixedly retained portion. The first groove and the second groove of the cap are arranged, when the cap is mounted around the core member, so that the first groove is positioned on the leading end portion side of the neck portion, and the second groove is positioned on the root portion side of the neck portion. The inner circumference of the retaining hole can be fitted in the first groove and the second groove. The fixedly retained portion is arranged on the leading end side of the first groove, so that the fixedly retained portion is retained on the retaining hole circumferential edge on the body back side when the retaining hole is fitted in the first groove. The inner side face of the fixedly retained portion is set: such that a smaller clearance is present between the inner side face of the fixedly retained portion and the neck portion of the core member, when the cap is mounted around the core member, so that the fixedly retained portion can be deformed into the smaller clearance as the fixedly retained portion is pushed in the inserting direction into the retaining hole; such that the head portion of the core member cannot be extracted when the fixedly retained portion is retained in the first retaining position on the body back side of the retaining hole circumferential edge; and such that the head portion of the core member can be extracted from the cap when the inner circumferential portion of the retaining hole is arranged in the second groove. The inner side face of the cap on the root portion side of the fixedly retained portion is set: such that a larger clearance is left between the inner side face and the neck portion of the core member, when the cap is mounted around the core member, so that the clip portion can be pushed in the inserting direction until the inner circumferential portion of the retaining hole is arranged at the position of the second groove; and such that the head portion of the core member can be extracted from the cap when the inner circumferential portion of the retaining hole is arranged in the second groove.

In this airbag cover, the cap is mounted in advance around the core member from the root portion side of the neck portion to the root portion side of the head portion. Then, the fixedly retained portion of the cap is inserted into the retaining hole circumferential edge, so that the fixedly retained portion is positioned on the body back side. The inner side face of the fixedly retained portion is enabled, by the small clearance left between itself and the neck portion of the core member, to be pushed in the inserting direction into the retaining hole. As a result, the fixedly retained portion can be inserted so that the portion of the inner circumference of the retaining hole is seated in the first groove. When the inner circumferential portion of the retaining hole is seated in the first groove, moreover, the fixedly retained portion of the cap is retained on the body back side of the retaining hole circumferential edge so that the clip portion takes the first retaining state. During retention in the first retaining state, the inner side face of the fixedly retained portion is set so that the head portion of the core member cannot be extracted by pulling of the cap in a direction opposite to the insertion direction. Therefore, the fixedly retained portion of the cap is unextractably retained together with the core member on the retaining hole circumferential edge on the body back side. As a result, the airbag cover is firmly mounted on the body.

In order to demount the airbag cover from the body, the clip portion is pushed in the inserting direction so far as to arrange the inner circumferential portion of the retaining hole in the second groove of the cap. The larger clearance between the inner side face on the root portion side of the cap and the neck portion of the core member permits warping and makes it easy to arrange the inner circumferential portion of the retaining hole in the second groove, also known as the second retaining state. With the retaining hole circumferential edge retained in the second groove, the root portion side of the cap and the inner side face of the fixedly retained portion permits extraction of the head portion of the core member. Therefore, the core member can be simply extracted together with the airbag cover body. As a result, the airbag cover body can be easily demounted from the body. After demounting, the cap can be easily extracted from the retaining hole because the cap is elastically deformable.

The core member can be formed into a rod shape or a sheet shape. Moreover, the core member may be molded integrally with the airbag cover body.

Optionally, the cap desirably has a slit extending in the axial direction thereof from the leading end of the fixedly retained portion. The provision of a slit in the clip portion allows the cap to be mounted around the core member more easily. The slit may extend in the axial direction the entire length of the cap. If such a slit is present in the clip portion, the cap can be mounted around the core member in a radial direction, i.e., the direction perpendicular to the axial direction of the core member, by widening the slit.

The core member also may be formed so as to be interchangeable with a cap having a lower retaining force on the circumferential edge of the retaining hole. Interchanging for a cap having a low retaining force may be done, for example, if the airbag cover is to be used as an ordinary garnish that does not cover the airbag.

The airbag cover body may include an interchangeable base portion into which different clip portions can be mounted. For example, the interchangeable base portion can mount a clip portion having a lower retaining force on the circumferential edge of the retaining hole, so as to be demountable. In this case, the airbag cover can be used, if interchanged with a clip portion having a low retaining force, as an ordinary garnish.

The interchangeable base portion may have a retaining recess at a position different from the mounting position of the clip portion. The clip portion, which has a lower retaining force on the circumferential edge of the retaining hole, is mounted so as to be demountable in the retaining recess.

The second object of the invention is achieved by a head-protecting airbag device comprising an airbag cover, mounted on the body of a vehicle, for covering a folded airbag. The airbag is housed from a rear pillar portion to a roof side rail portion on the interior side of the vehicle. The airbag cover is a rear pillar garnish mounted on the body of the rear pillar portion. The rear pillar garnish includes a body portion and a door portion molded integrally. The body portion has a mounting seat capable of being mounted on the rear pillar portion of the body. The door portion is arranged on the upper end side of the garnish, and is opened by the airbag being inflated to expand. The portions of the door portion and the mounting seat of the body portion in the vicinity of the door portion are made of a thermoplastic elastomer. The remaining portion (i.e., the portion other than the portions of the door portion and the mounting seat of the body portion in the vicinity of the door portion) is made of a hard synthetic resin.

In the rear pillar garnish of this head-protecting airbag device, the door portion is pushed and opened by the airbag being inflated to expand, so as to protrude the airbag into the interior compartment of the vehicle.

The rear pillar garnish is an integral molding of the door portion and the body portion so that the door portion of the rear pillar garnish is not separately mounted. Therefore, the rear pillar garnish can be constructed without the parting line of the door portion being formed on the interior side of the garnish. In this manner, the appearance and design of the rear pillar portion are improved.

The mounting seat in the vicinity of the door portion is made of a thermoplastic elastomer. Therefore, even if the mounting seat is impacted when the door portion is pushed and opened as the airbag inflates to expand, the mounting seat is not broken. Rather, the impact is absorbed by the elasticity of the thermoplastic elastomer. The pushing force exerted by the inflating airbag properly acts on the door portion so that the door portion is smoothly opened.

In this head-protecting airbag device, therefore, the folded airbag can be arranged in the rear pillar portion while preventing deterioration in the appearance of the rear pillar portion. Additionally, the door portion can be smoothly opened when the airbag is inflated to expand.

The thermoplastic elastomer and the hard synthetic resin have a mutual compatibility to allow the door portion and the body portion to be closely bonded to each other.

Moreover, the mounting seat desirably has a clip portion capable of establishing first and second retaining states, as discussed above, so that the rear pillar garnish can be firmly mounted on the body in an easily demountable manner. As also discussed above, the clip portion may include a rigid core member and an elastically deformable cap.

A surface skin is desirably arranged on the interior surface side of the rear pillar garnish in the interior compartment of the vehicle to improve the appearance of the rear pillar portion.

The door portion can be arranged on the upper edge of the rear pillar garnish, and can have a hinge portion arranged on the lower edge side of the door portion so that the door portion is pushed and opened downward as the airbag inflates to expand. Alternatively, the door portion may have a portion arranged therearound to be ruptured so that the door portion is opened, when pushed by the airbag being inflated to expand, by rupturing the rupturable portion. In this rear pillar garnish, a portion of the airbag can cover the rear pillar portion.

The third object of the invention is achieved by a head-protecting airbag device comprising an airbag cover mounted on the body of a vehicle for covering a folded airbag. The airbag cover includes a body portion and a door portion. The door portion is pushed and opened by the airbag being inflated to expand. A regulating wall for separating or partitioning the airbag from the body portion is arranged at the boundary between the body portion and the door portion. In this head-protecting airbag device, when the airbag is inflated and expands, the regulating wall guides the pressure of the airbag towards the door portion to open the door smoothly and quickly.

The regulating wall may protrude from the side of the airbag cover and/or from the side of the body.

These and other objects, aspects and advantages of the invention will be apparent to those skilled in the art upon reading the specification and appended claims which, when read in conjunction with the accompanying drawings, explain the principles of this invention.

BRIEF DESCRIPTION OF THE DRAWINGS

The principles of this invention are elucidated upon by the following drawings, in which.

DESCRIPTION OF THE PREFERRED EMBODIMENTS

The invention will be described in connection with its embodiments with reference to the accompanying drawings. It is to be understood that the illustrated embodiments are not exhaustive as to the scope of this invention. Rather, changes and modifications are encompassed by the scope of this invention and the scope of the appended claims and their equivalents.

Figure 1:
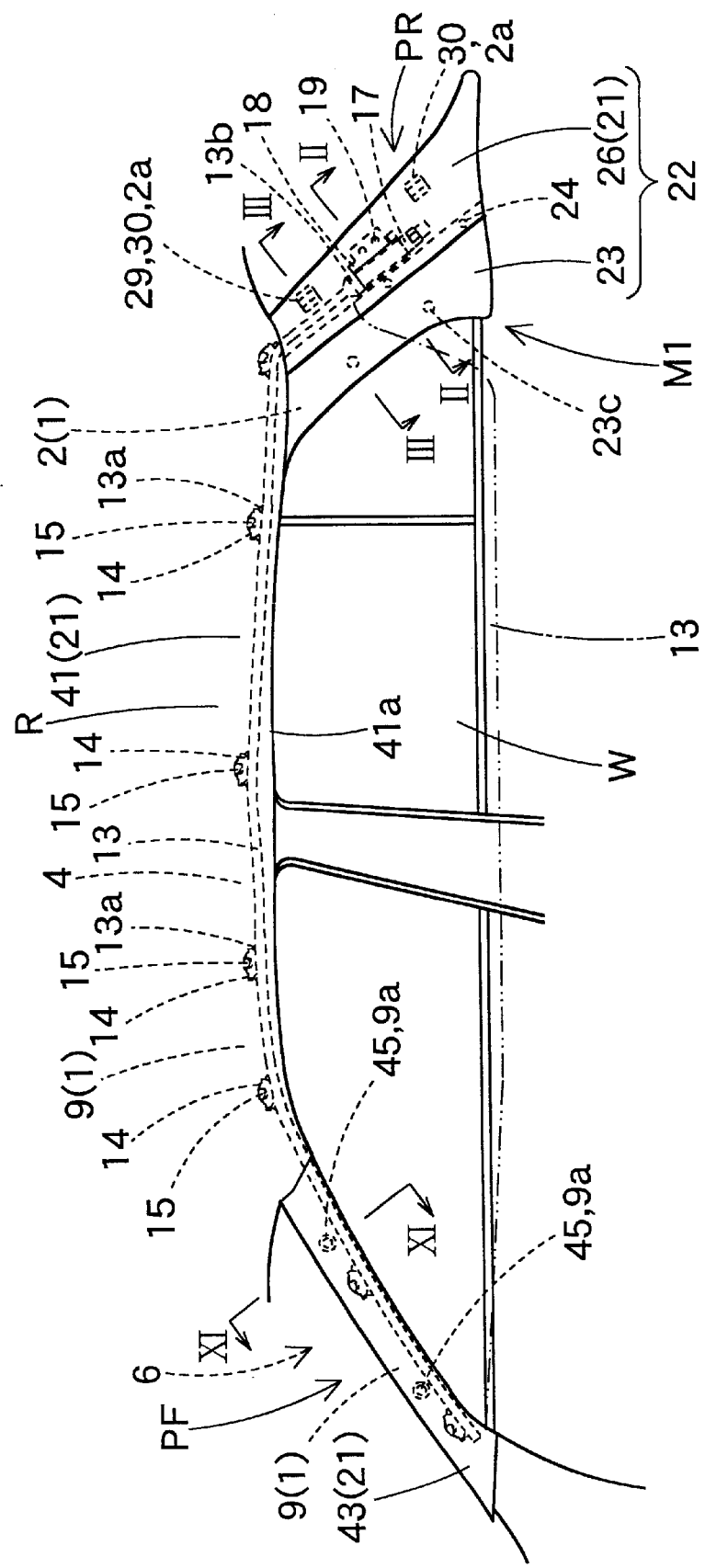
FIG. 1 is a front elevation taken from the inside of a vehicle and showing a head protecting airbag device according to a first embodiment of the invention.

A head-protecting airbag device M1 according to a first embodiment is provided with an airbag 13, an inflator 17, and an airbag cover 21, as shown in FIG. 1. The airbag 13 is folded and housed in a rear pillar portion PR, a roof side rail portion R, and a front pillar portion PF on the interior side of the vehicle compartment. The inflator 17 feeds the airbag 13 with an inflating gas. The airbag cover 21 covers the folded airbag 13 and conceals the folded airbag 13 from the vehicle compartment. The airbag cover 21 is constructed, in the case of the embodiment, to include a rear panel portion 26 of a rear pillar garnish 22, a lower edge 41a of a roof interior member 41, and a front pillar garnish 43. The rear panel portion 26 is provided with a clip portion 29 capable of fixing the airbag cover 21 firmly on a body 1. The front pillar garnish 43 is provided with a clip portion 45 capable of fixing the airbag cover firmly on the body 1.

The airbag 13 is provided with a plurality of mounting portions 13a and a plurality of jointing cylindrical portions 13b. Each mounting portion 13a is arranged on the upper edge side of an opening W on the interior side. To the mounting portion 13a, there is fixed a mounting bracket 14 made of a sheet metal. The jointing cylindrical portion 13b is mounted on the inflator 17. Then, the airbag 13 is mounted on an inner panel 9 by the mounting brackets 14 and mounting bolts 15. The inner panel 9 is arranged at a front pillar body 6 and a roof side rail body 4. The front pillar body 6 and roof side rail body 4 construct the vehicle body 1.

Figure 2:
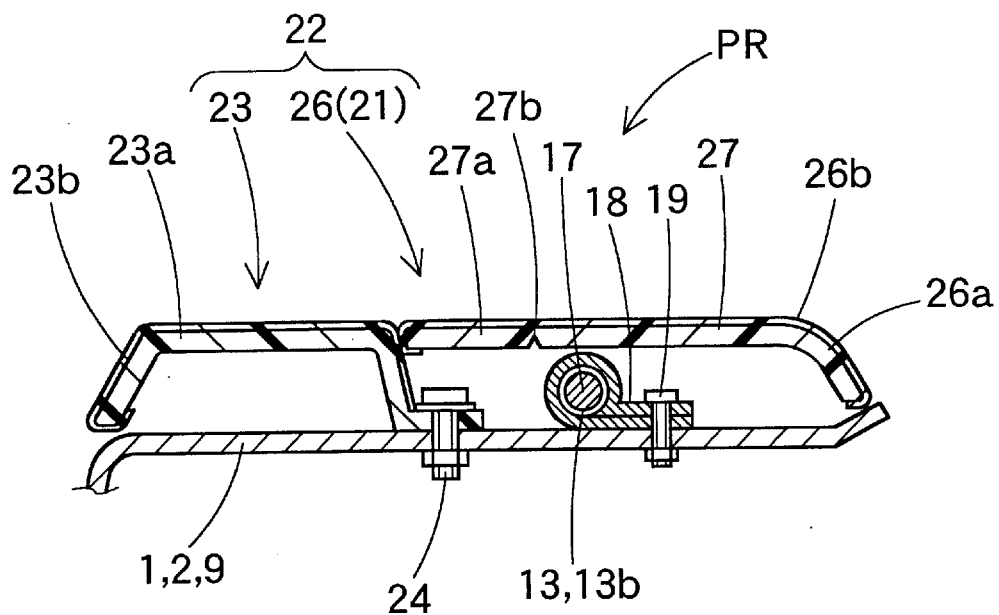
FIG. 2 is an enlarged schematic section taken along II—II of FIG. 1 and shows an airbag cover (or a rear pillar garnish) of the first embodiment.

The inflator 17 is of a cylinder-type, mounting the jointing cylindrical portion 13b of the airbag 13 therearound, as shown in FIGS. 1 and 2. Around the jointing cylindrical portion 13b, there is mounted a mounting bracket 18, which can be made of sheet metal. This mounting bracket 18 is mounted on the inner panel 9 of a rear pillar body 2 by means of two mounting bolts 19. As a result, the inflator 17 is mounted on the inner panel 9 at a generally vertically intermediate position of the rear pillar portion PR by means of the bracket 18 and the bolts 19. The inner panel 9 extends from the front pillar body 6 through the roof side rail body 4 to the rear pillar body 2.

Hereinbelow will be described a method of assembling the head-protecting airbag device M1 of the first embodiment into the vehicle. First, the airbag 13 is folded, and the mounting brackets 15 are mounted on the individual mounting portions 13a. The inflator 17 is inserted into the jointing cylindrical portion 13b, and the mounting bracket 18 is mounted. In order to prevent the airbag 13 from being unfolded (or restored), the folded airbag 13 is wrapped at its predetermined portions by means of a tape member (not shown). As a result, there is produced an airbag assembly. Then, the individual mounting brackets 14 and 18 are mounted on the inner panel 9 by means of mounting bolts 15 and 19, respectively, to mount the airbag assembly on the inner panel 9. By further mounting the rear pillar garnish 22, the front pillar garnish 43 and the roof interior member 41 on the inner panel 9, the head protecting airbag device M1 can be assembled in the vehicle.

Figure 3:
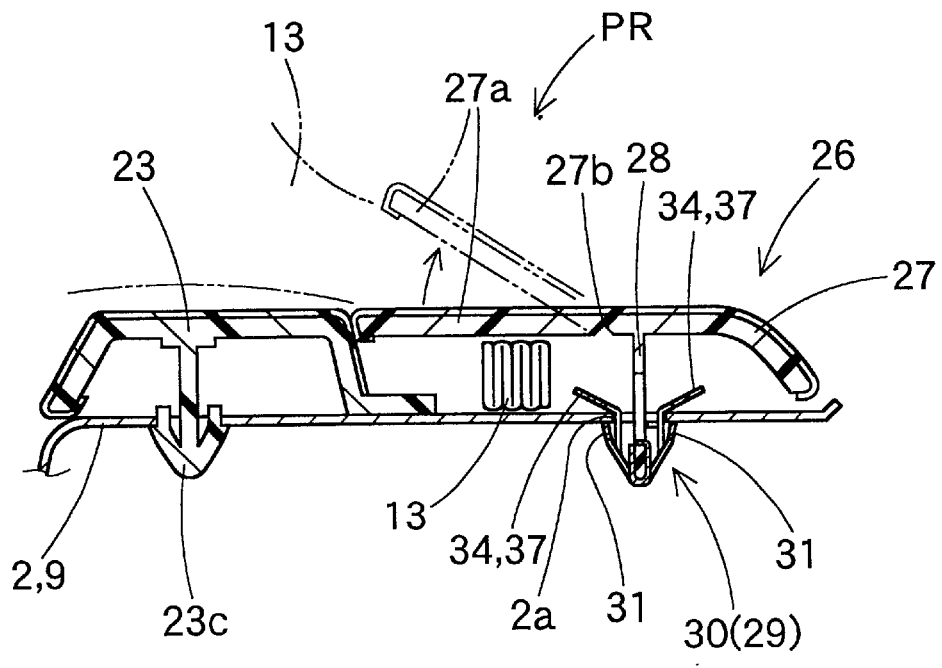
FIG. 3 is an enlarged schematic section taken along line III—III of FIG. 1, and shows a rear pillar garnish of the first embodiment.

As shown in FIGS. 1 to 3, the rear pillar portion PR comprises the rear pillar body 2, the inner panel 9, and the rear pillar garnish 22. The rear pillar garnish 22 covers and conceals the interior side of the inner panel 9.

The rear pillar garnish 22 is provided with a front panel portion 23 on the front edge side and a rear panel portion 26 on the rear edge side. The rear panel portion 26 forms part of the airbag cover 21 covering the folded airbag 13. The front and rear panel portions 23 and 26 are individually provided with base portions 23a and 26a and surface skins 23b and 26b. The base portions 23a and 26a can be made of a synthetic resin such as thermoplastic elastomers of olefins. The surface skins 23b and 26b can be made of a synthetic resin such as soft vinyl chloride or thermoplastic elastomers of olefins, or a fabric, and are bonded to the surface sides of the base portions 23a and 26a.

The front panel portion 23 is mounted on the inner panel 9 or the rear pillar body 2. For this mounting, there are used a plurality of mounting bolts 24 and a plurality of retaining clip portions 23c. These clip portions 23c protrude from the front panel portion 23.

Figure 4:
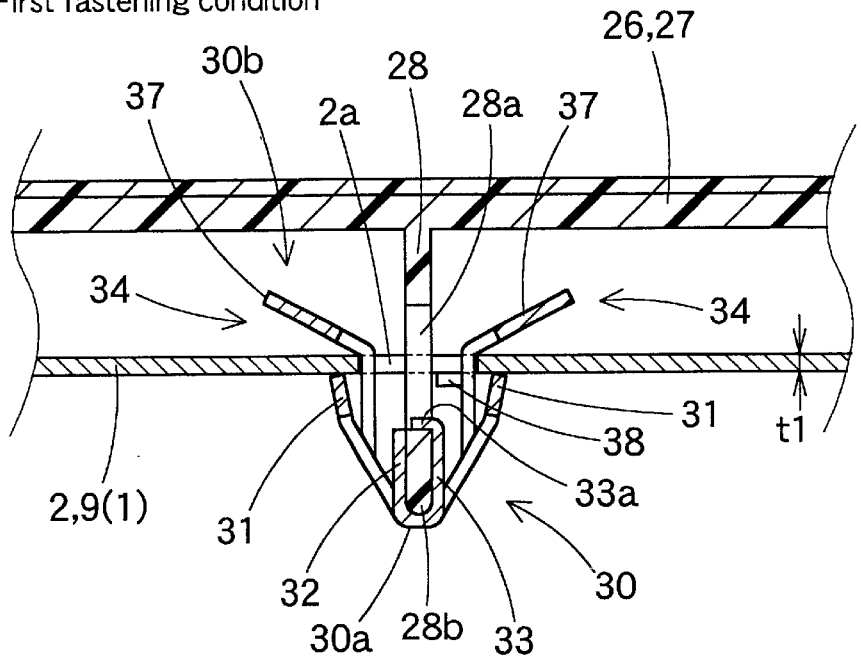
FIG. 4 is an enlarged section showing a fixedly mounted state of the rear pillar garnish (or a rear panel portion) of the first embodiment.
Figure 7:
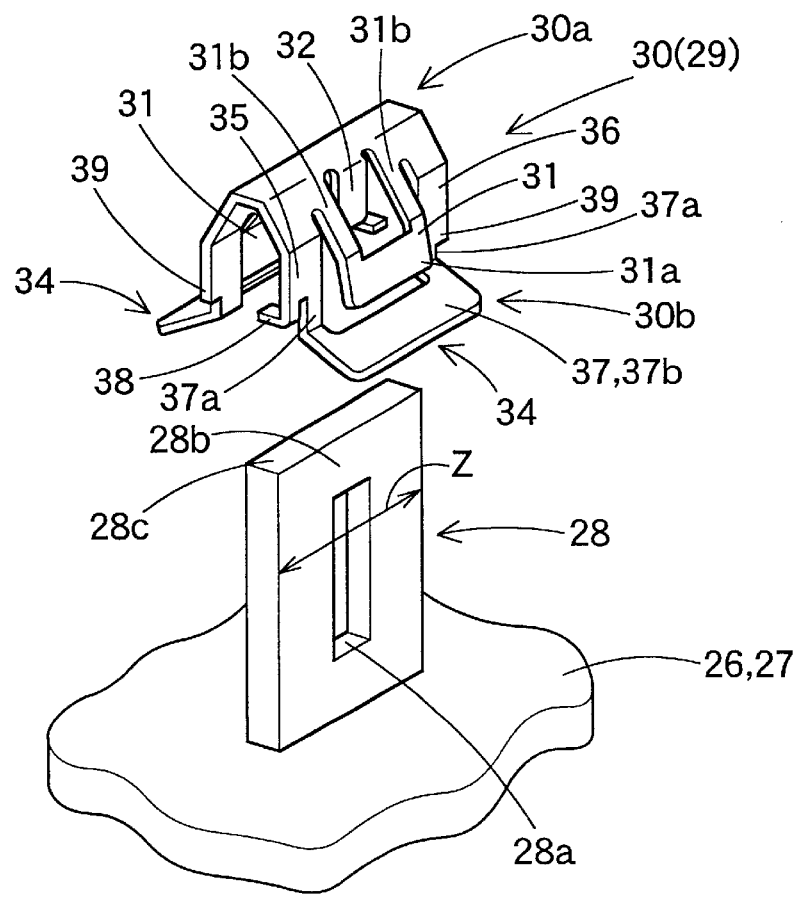
FIG. 7 is an exploded perspective view of the vicinity of a clip portion (or a retained leg) in the rear panel portion of the first embodiment.
Figure 9:
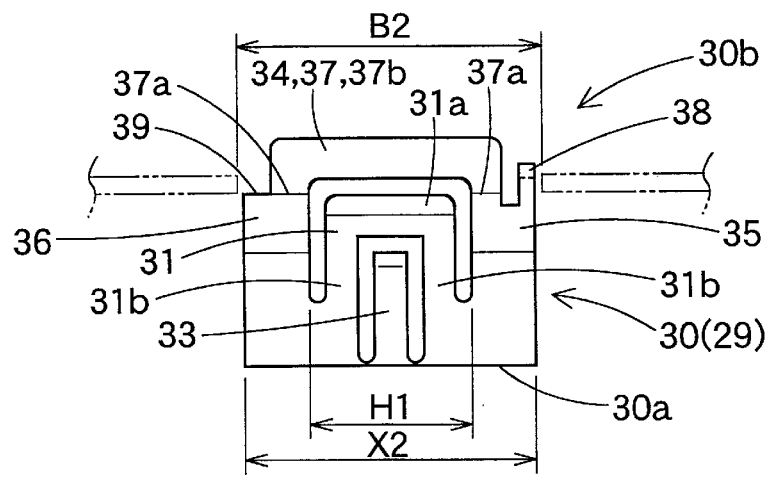
FIG. 9 is an enlarged side elevation of the retained leg of the first embodiment.
Figure 10:
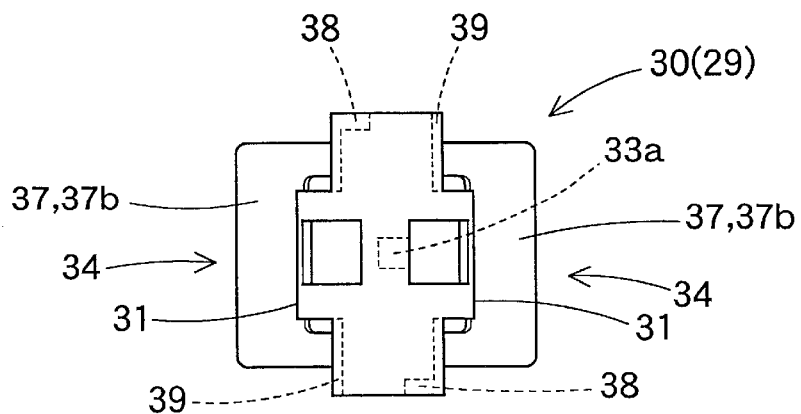
FIG. 10 is a bottom view of the retained leg of the first embodiment.

The rear panel portion 26 forming part of the airbag cover 21 is provided with a panel body 27 and the two clip portions 29, as shown in FIGS. 1 to 3. The panel body 27 forms part of an airbag cover body. The clip portions 29 comprise retained legs 30, which are mounted on the panel body 27. The front edge side of the panel body 27 provides a door portion 27a. This door portion 27a is pushed and opened into the vehicle compartment by the airbag 13 when this airbag 13 is inflated to expand. On the rear edge side of the door portion 27a, there is formed a thin hinge portion 27b. The door portion 27a is easily opened by pivoting about the hinge portion 27b. On the back side of the panel body 27, there are disposed two mounting members 28, as shown in FIGS. 3, 4 and 7. Each mounting member 28 is formed into a rectangular shape to fix the retained leg 30. The mounting member 28 is provided at its center with a through hole 28a which has a rectangular shape. Each mounting member 28 has a length Z smaller than a gap H1 (as shown in FIG. 9). This gap H1 is formed between the leg portions 37a of a later-described guide member 37 of the retained leg 30. On the leading end side of the circumferential edge of the through hole 28a of the mounting member 28, there is arranged a mounting rod portion 28b.

The retained leg 30 is formed into a generally symmetric shape by folding a band material at the center, as shown in FIGS. 3 and 4 and FIGS. 7 to 10. This band material is formed by notching a sheet metal at a predetermined portion. The folded center of the band material provides a crest 30a. The retained leg 30 is inserted into a retaining hole 2a and retained on the circumferential edge of the retaining hole 2a. This retaining hole 2a is formed in the inner panel 9 of the rear pillar body 2 forming part of the body 1. Moreover, the retained leg 30 is provided with a pair of pawl members 31. These pawl members 31 diverge away from each other from the two sides of the central portion of the crest 30a toward a bottom portion 30b. In a first retaining state0, the pawl members 31 are retained on the circumferential edge of the retaining hole 2a on the back side of the inner panel 9. Each pawl member 31 is provided with a holding member 32 and a hook member 33, which can be formed by cutting off their peripheries. The holding member 32 and hook member 33 function to fix the retained leg 30 on the mounting members 28 of the rear panel portion 26. When the retained legs 30 are to be mounted on the mounting member 28, the hook members 33 initially are unbent at their leading end portions 33a. Then, the back side of the crest portion 30a of the retained leg 30 is brought into abutment against the leading end face 28c of the mounting member 28. Then, the mounting rod portion 28b of the mounting member 28 is enclosed by the crest portion 30a, the holding member 32, and the hook member 33. As a result, each retained leg 30 is fixed on the mounting member 28.

Figure 5:
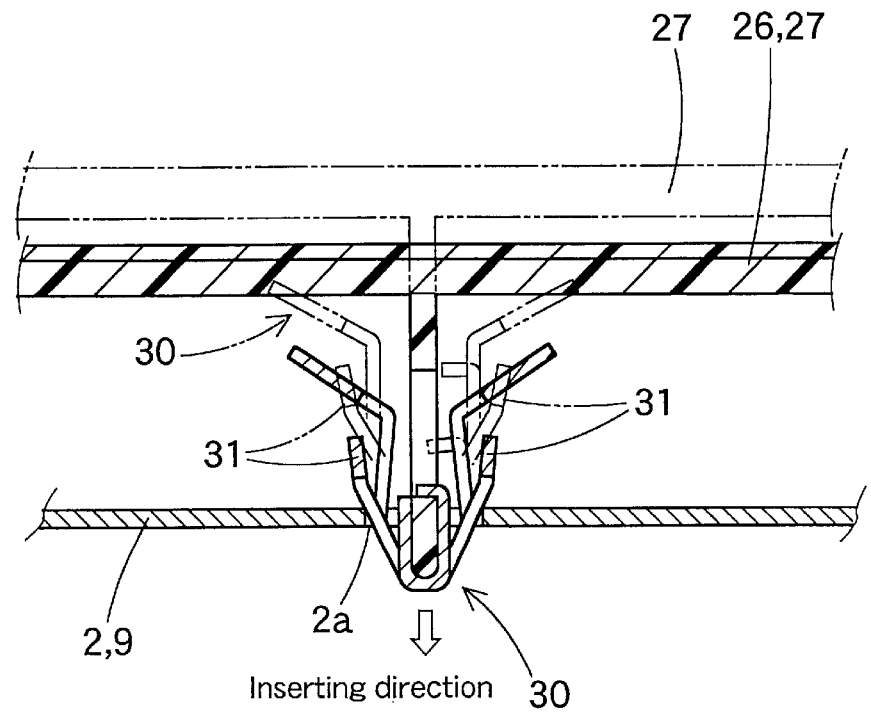
FIG. 5 is an enlarged section showing a mounting procedure for mounting the rear panel portion of the first embodiment.
Figure 8A:
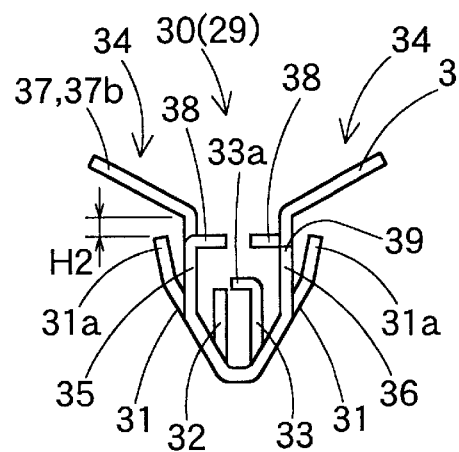
FIGS. 8A and 8B are enlarged front elevations of the retained leg of the first embodiment.
Figure 8B:
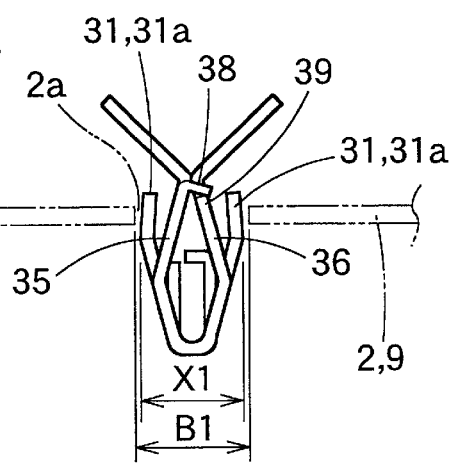

The retained leg 30 is provided with a pair of shrinking guide portions 34. Each shrinking guide portion 34 is so protruded as to extend from the vicinities of the two ends of the crest 30a toward the bottom portion 30b. Each shrinking guide portion 34 is provided with joint portions 35 and 36 and the guide members 37. The joint portions 35 and 36 are joined on the side of the crest 30a to the root portions 31b of the pawl portion 31. The guide members 37 are joined to the leading ends of the individual joint portions 35 and 36. Each guide member 37 is provided with the leg portions 37a and wing portions 37b. The individual leg portions 37a extend from the opposed edge sides of the joint portions 35 and 36. Each wing portion 37b is joined to a respective one of the leg portions 37a. Moreover, the individual wing portions 37b diverge from each other from the leading end portions 31a of the individual pawl members 31 on the sides of the bottoms 30b. The individual wing portions 37b are opened more widely than the pawl members 31. A gap H2 (as shown in FIG. 8A) between the pawl member leading end portion 31a and the wing portion 37b is substantially equal to or slightly larger than a sheet thickness t1 (as shown in FIG. 4). The sheet thickness t1 is the thickness of the inner panel of the portion where the retaining holes 2a are arranged. Each joint portion 35 is bent inward to form a hook pawl 38. This hook pawl 38 is set as follows. Specifically, the hook pawl 38 retains a hook edge 39 at the leading end of the joint portion 36, as shown in FIG. 8B, when an opening size X1 becomes smaller than an opening width B1. Moreover, the hook pawls 38 keep the narrow state of the pawl members 31. This state is a second retaining state of the retained legs 30. On the other hand, the hook pawls 38 do not retain the hook edges 39 when the pawl members 31 are inserted into the retaining holes 2a. The opening size X1 is the distance size between the pawl members 31 on the sides of the leading end portions 31a. The opening width B1 is that of the retaining holes 2a. The opening length B2 of the retaining holes 2a is slightly larger than the length X2 of the retained legs 30, as shown in FIG. 9. Hereinbelow will be described steps for fixing the rear panel portion 26 or the airbag cover 21 of the first embodiment on the rear pillar body 2 (or the inner panel 9) on the side of the body 1. First, the leading end portions 33a of the hook portions 33 are bent to mount the retained legs 30 on the individual mounting members 28, as has been described hereinbefore. The individual retained legs 30 are then inserted from the inside of the vehicle into the retaining holes 2a of the inner panel 9, as shown in FIG. 5. Then, the individual pawl members 31 are flexed inwardly so as to pass their leading end portions 31a through the retaining holes 2a. After having been passed through the retaining holes 2a, the leading end portions 31a restore themselves to their original unflexed shapes and are arranged on the circumferential edges of the retaining holes 2a on the back side of the inner panel 9. As a result, the leading end portions 31a retain the circumferential edges of the retaining holes 2a, as shown in FIG. 4, preventing movement of the retained legs 30 back through the retaining holes 2a. In this first retaining state, the inner panel 9 is arranged between the wing portions 37b of the individual guide members 37 and the leading end portions 31a of the pawl members 31. Thus, the rear panel portion 26 is firmly fixed on the rear pillar body 2 on the side of the body 1.

Before the rear panel portion 26 is mounted on the rear pillar body 2, the airbag assembly is mounted in advance on the inner panel 9 on the side of the body 1, as has been described hereinbefore. The front panel portion 23 is also mounted on the inner panel 9 or the rear pillar body 2.

When the rear panel portion 26 is fixed on the rear pillar body 2, therefore, the work for mounting the head protecting airbag device M1 on the vehicle is completed. After this, the airbag 13 is inflated to expand when the inflator 17 is activated. In the rear pillar portion PR, the door portion 27a of the rear panel portion 26 is then pushed and opened by the airbag 13, as indicated by double-dotted lines in FIGS. 1 and 3. Then, the airbag 13 is protruded to cover the opening W.

Figure 6:
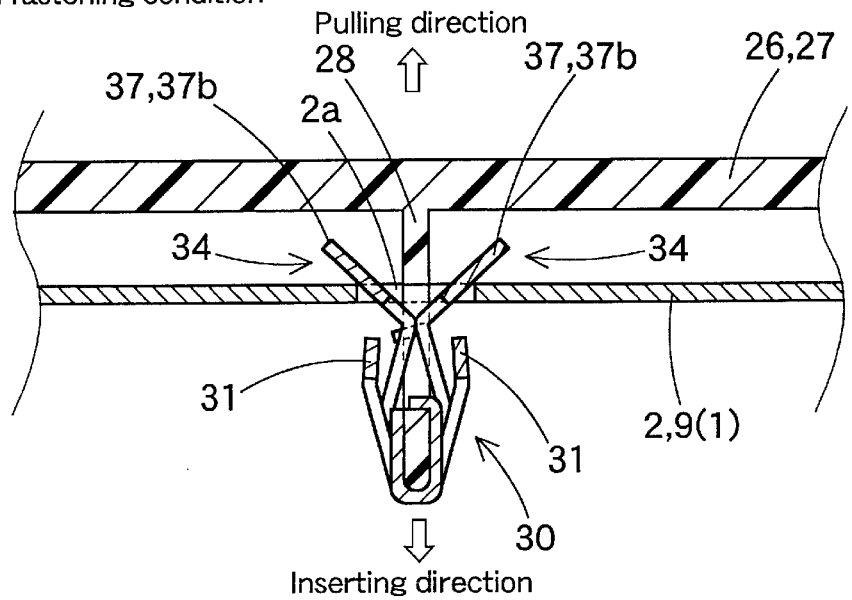
FIG. 6 is an enlarged section for explaining the demounting state of the rear panel portion of the first embodiment.

The rear panel portion 26 is demounted from the rear pillar body 2 in the following manner. First, the retained legs 30 are inserted farther forward, as shown in FIG. 6. Then, the wing portions 37b of the individual guide members 37 are mutually guided on the circumferential edges of the retaining holes 2a on the surface side of the inner panel 9. The wing portions 37b of the guide members 37 approach each other so as to narrow the gap between the wing portions 37b. As a result, not only the individual guide members 37, but also the individual pawl members 31 joined to the guide members 37, come closer to each other so that the opening size X1 becomes smaller. When the opening size X1 between the individual pawl members 31 becomes smaller than the opening width B1 of the retaining holes 2a, the hook pawls 38 retain the hook edges 39. As a result, the pawl members 31 which have been narrowed so as to approach each other maintain their approaching state. In other words, the retained legs 30 take the second retaining state. After this, the rear panel portion 26 is moved in the opposite direction for the retained legs 30 to be pulled out from the retaining holes 2a. At this time, the pawl members 31 are closer together than the opening width B1 of the retaining holes 2a. Therefore, the retained legs 30 can be pulled out from the retaining holes 2a without any interference from the circumferential edges of the retaining holes 2a. In this manner, the rear panel portion 26 can be simply demounted from the rear pillar body 2 on the side of the body 1.

When the pawl members 31 are closer to each other than the opening width B1 of the retaining holes 2a, the leg portions 37a of the paired guide members 37 approach to contact with each other. The mounting members 28 are not arranged in the vicinity of the leg portions 37a. Hence, the leg portions 37a are permitted to approach each other without any obstruction from the mounting members 28.

When the rear panel portion 26 is fixed again on the rear pillar body 2 after the rear panel portion 26 has been previously demounted, the hook pawls 38 are released from the hook edges 39. Then, the rear panel portion 26 can be fixed again on the rear pillar body 2.

In the head-protecting airbag device M1 of the first embodiment, therefore, the rear panel portion 26 can be easily removed as the airbag cover 21, so that the rear panel portion 26 can be firmly fixed on the rear pillar body 2 on the side of the body 1 without using any mounting bolt.

In the first embodiment, the retained legs 30 forming the clip portions 29 are made of sheet metal. However, the retained legs 30 may be made of a synthetic resin having a spring elasticity. In this case, the retained legs 30 may be formed integrally with the mounting members 28 of the airbag cover body 27.

Figure 11:
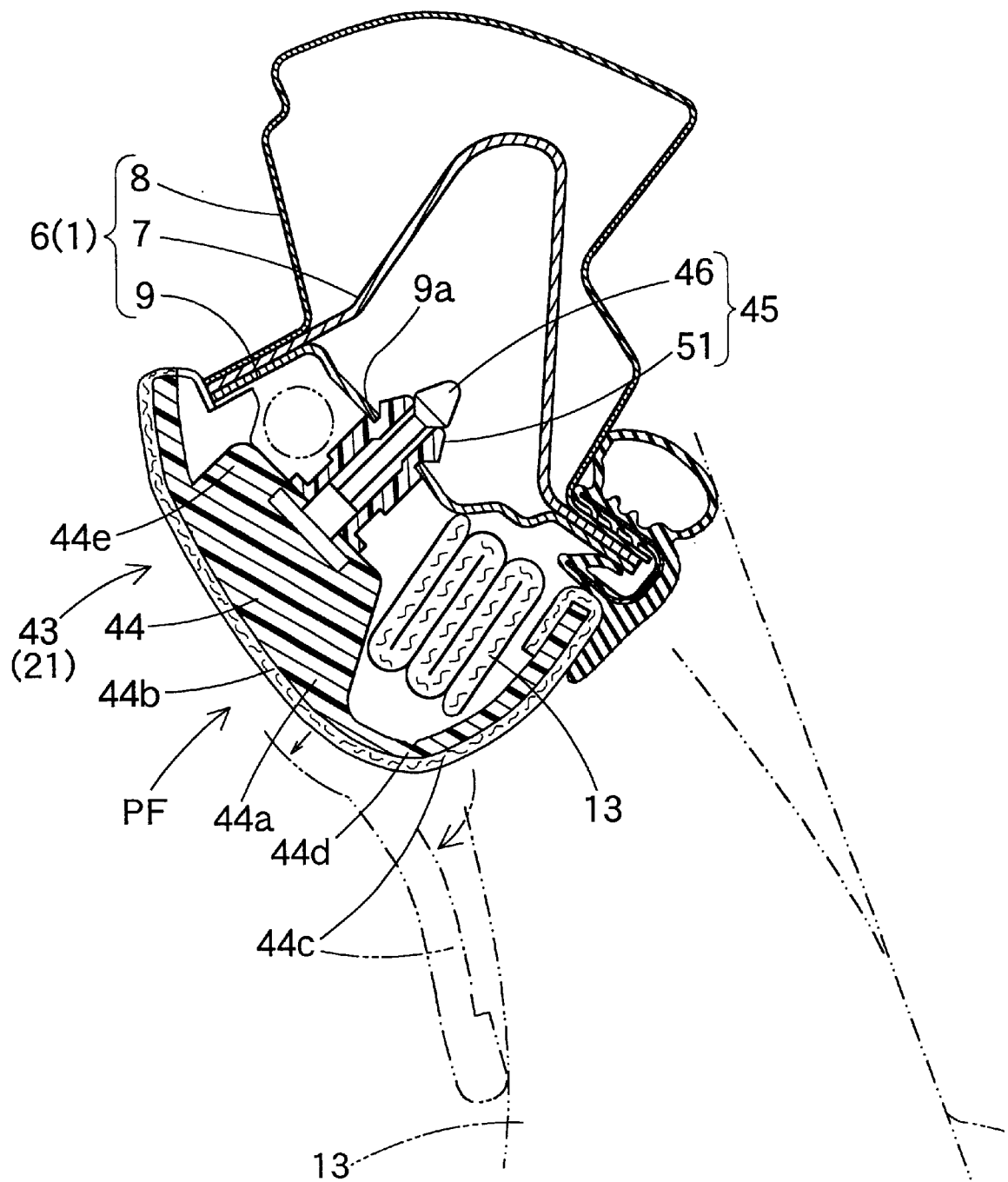
FIG. 11 is an enlarged schematic section taken along XI—XI of FIG. 1, and shows an airbag cover (or a front pillar garnish) of the first embodiment.

The clip portion 45 which is disposed in the front pillar garnish 43 will now be described. This pillar garnish 43 is mounted on the front pillar body 6 on the side of the body 1, as shown in FIGS. 1 and 11. The front pillar body 6 is constructed to include a reinforcement panel 7, an outer panel 8 and an inner panel 9, which are individually made of sheet steel. The inner panel 9 of the front pillar portion PF is provided with two retaining holes 9a for mounting the pillar garnish 43. Each of the retaining holes 9a is individually shaped as a circle.

The front pillar garnish 43 is composed of the two clip portions 45 and a garnish body 44. The clip portions 45 are used to mount the garnish 43 on the inner panel 9. The garnish body 44 belongs to the airbag cover body, except for the clip portions 45 in the garnish 43. The garnish body 44 is provided with a base portion 44a and a surface skin 44b. The base portion 44a can be made of a synthetic resin such as thermoplastic olefinic elastomers. The surface skin 44b can be made of a synthetic resin such as soft vinyl chloride or thermoplastic olefinic elastomers, or a fabric. The garnish body 44 is provided with a door portion 44c on its lower edge side. The door portion 44c is pushed and opened by the airbag 13 when the airbag 13 is inflated to expand. On the upper edge side of the door portion 44c, there is formed a thin hinge portion 44d so that the door portion 44c may be easily opened. On the back of the garnish body 44, there are formed two thick boss portions 44e. In these individual boss portions 44e, there are buried core members 46 of the clip portions 45, as will be described hereinafter. The garnish body 44 is molded by inserting the core member 46.

Each clip portion 45 comprises the core member 46 and a cap 51. The core member 46 can be made of a rigid steel rod. The cap 51 is formed into a generally cylindrical shape, and can be made of an elastically deformable synthetic resin such as polyamide (or 66 nylon) or thermoplastic olefinic elastomers, or rubber.

Figure 14:
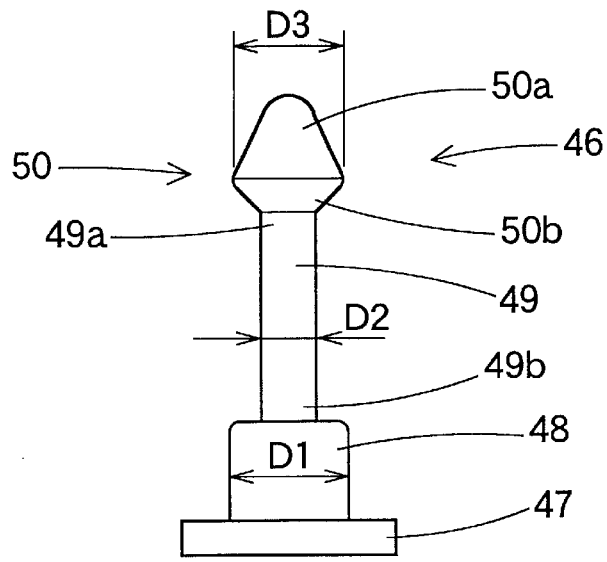
FIG. 14 is a front elevation showing a core member of the front pillar garnish of the first embodiment.
Figure 15:
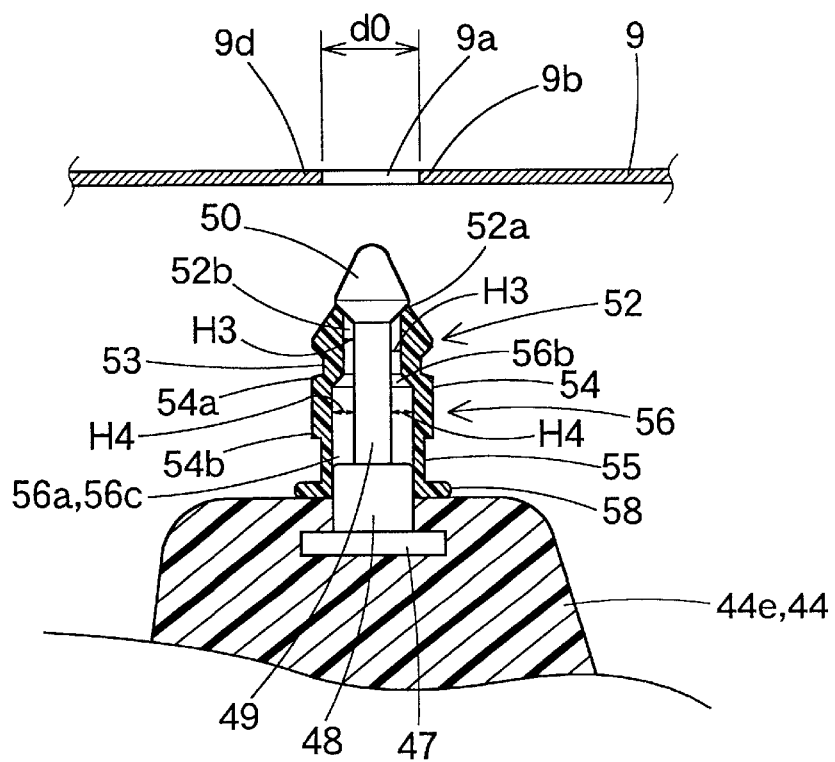
FIG. 15 is an enlarged section showing a state before the front pillar garnish of the first embodiment is mounted.

As shown in FIGS. 14 and 15, the core member 46 comprises a flange portion 47, a diametrically larger portion 48, a neck portion 49 and a head portion 50. The flange portion 47 is disc shaped, and is buried in the boss portion 44e of the garnish body 44. The diametrically larger portion 48 protrudes in a column shape from the flange portion 47. The neck portion 49 has a column shape, is diametrically smaller than the diametrically larger portion 48, and protrudes from the end face of the diametrically larger portion 48. The head portion 50 is joined to the leading end portion 49a of the neck portion 49. The head portion 50 is made larger in width (or external diameter in the embodiment) than the neck portion 49. The head portion 50 is provided with diverging and converging portions 50b and 50a. The diverging portion 50b is arranged on the root side of the head portion 50 and diverges toward the leading end side. The converging portion 50a is arranged on the leading end side of the head portion 50 and converges toward the leading end side.

Figure 12:
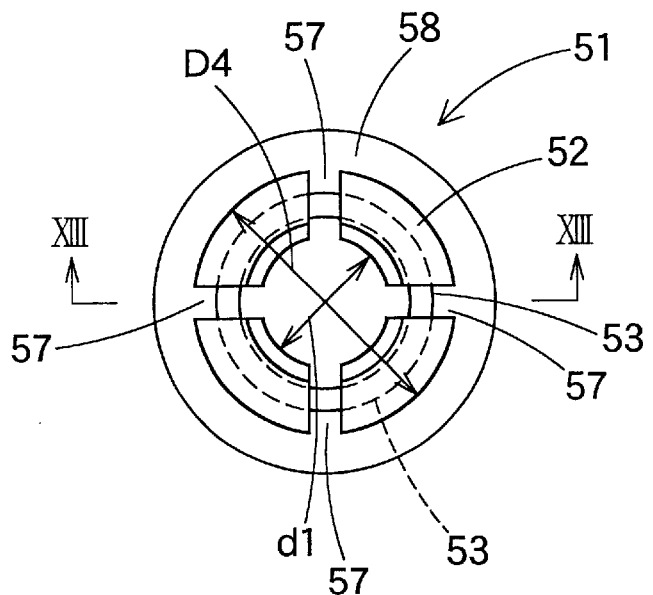
FIG. 12 is a top plan view showing a cap of a clip portion in the front pillar garnish of the first embodiment.
Figure 13:
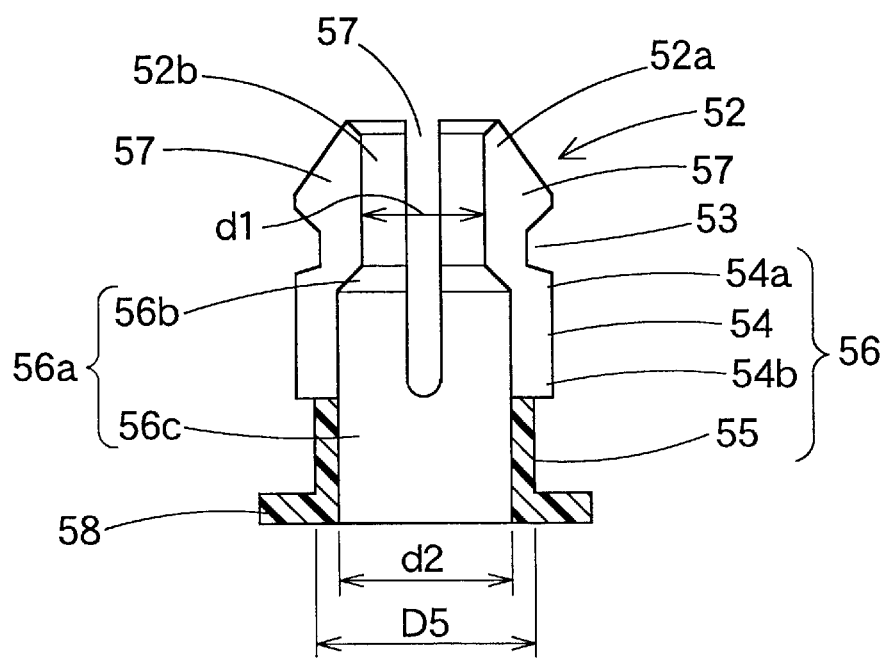
FIG. 13 is a longitudinal section taken along line XIII—XIII of FIG. 12, and shows the cap of the first embodiment.

The cap 51 is formed into a generally cylindrical shape, as shown in FIGS. 12, 13 and 15, and is mounted around the core member 46. The cap 51 is provided with an annular flange portion 58 at its end portion on the root side. The cap 51 is caused, when mounted around the core member 46, to have its flange portion 58 in abutment against the boss portion 44e of the garnish body 44, thereby covering the core member 46 from the root portion 49b of the neck portion 49 to the root portion (or the diverging portion 50b) of the head portion 50.

The cap 51 is provided with two first and second grooves 53 and 55. These grooves 53 and 55 are formed around the entire circumference of the cap 51. The first and second grooves 53 and 55 are arranged about the outer sides of the leading end portion 49a and the root portion 49b of the neck portion 49, respectively, when the cap 51 is mounted around the core member 46. The first and second grooves 53 and 55 can fit the inner circumferential portion 9b of the retaining hole 9a. This retaining hole 9a is formed in the inner panel 9 on the side of the body 1. Moreover, the leading end side of the first groove 53 provides a fixedly retained portion 52. This fixedly retained portion 52 is inserted into the retaining hole 9a, and retained on the circumferential edge of the retaining hole 9a. This state is the first retaining state of the clip portion 45. The fixedly retained portion 52 has a converging leading end portion 52a. This leading end portion 52a is substantially flush with the converging portion 50a on the leading end side of the head portion 50 when the cap 51 is mounted around the core member 46. Between the first and second grooves 53 and 55, there is arranged a cylindrical portion 54. This cylindrical portion 54 has a constant width size (or a constant external diameter in the embodiment).

On the inner side face of the cap 51, the inner side face (or the inner circumference) on the side of a root portion 56 is diametrically larger than the inner side face (or an inner circumference) 52b of the fixedly retained portion 52. In the root portion 56, there are arranged the cylindrical portion 54 and the second groove 55. The root portion inner side face 56a is composed of a diverging portion 56b and a straight portion 56c. The diverging portion 56b diverges from the inner side face 52b of the fixedly retained portion 52. The straight portion 56c has a constant opening width (or a constant internal diameter) from the diverging portion 56b.

The inner side face 52b of the fixedly retained portion 52 is set with such an opening width d1 that the fixedly retained portion 52 can be inserted into the retaining hole 9a with the cap 51 being mounted around the core member 46. When the cap 51 is mounted around the core member 46, more specifically, a predetermined smaller clearance H3 is left between the inner side face 52b and the neck portion 49. When the fixedly retaining portion 52 is inserted into the retaining hole 9a, the smaller clearance H3 absorbs the warpage or diametric reduction of the fixedly retained portion 52. In other words, the opening width d1 is so set that the fixedly retained portion 52 can be pushed in the inserting direction into the retaining hole 9a. On the other hand, the opening width d1 is so set that the head portion 50 of the core member 46 cannot be extracted when the fixedly retained portion 52 is retained on the circumferential edge of the retaining hole 9a. Moreover, the opening width d1 is so set that the head portion 50 of the core member 46 can be inserted when the inner circumferential portion 9b of the retaining hole 9a is arranged in the second groove 55.

The inner side face 56a (or 56c) of the root portion 56 is formed to leave a predetermined larger clearance H4 between itself and the neck portion 49 when the cap 51 is mounted around the core member 46. The larger clearance H4 is made larger than the smaller clearance H3. The larger clearance H4 absorbs the constricting warpage of the root portion 56 when the clip portion 45 is inserted to arrange the inner circumferential portion 9b of the retaining hole 9a in the second groove 55. The straight portion 56c has an opening width d2 set so that the head portion 50 of the core member 46 can be pulled out from the cap 51. Extraction is performed with the inner circumferential portion 9b of the retaining hole 9a arranged in the second groove 55, and with the cap 51 retained on the circumferential edge of the retaining hole 9a. On the other hand, the cylindrical portion 54 of the root portion 56 has a width size (or an external diameter) D4 set so that the cap 51 is retained on the circumferential edge of the retaining hole 9a when the inner circumferential portion 9b of the retaining hole 9a is arranged in the second groove 55. When the inner circumferential portion 9b of the retaining hole 9a is arranged in the second groove 55, the clip portion 45 is in the second retaining state.

In the illustrated embodiment, the opening width d2 of the straight portion 56c of the cap 51 is equal to the width size (or the external diameter) D1 of the diametrically larger portion 48 of the core member 46.

In the cap 51 of the embodiment, there are formed four slits 57 in the axial direction. Each slit 57 is formed to extend from the leading end of the fixedly retained portion 52 to the root portion 54b of the cylindrical portion 54. These slits 57 are arranged so that the fixedly retained portion and the cylindrical portion 54 of the cap 51 can be diametrically enlarged or reduced with ease. In short, the cap 51 can be easily mounted around the core member 46.

In accordance with one practical example of the core member 46 of the embodiment: the diametrically larger portion 48 has the width size D1 of 11 mm; the neck portion 49 has a width size (or an external diameter) D2 of 5 mm; and the head portion 50 has a maximum size (or an external diameter) D3 of 11 mm. In the cap 51: the fixedly retained portion 52 and the cylindrical portion 56 has the maximum width size (or the external diameter) D4 of 16 mm; the first and second grooves 53 and 55 have a width size (or an external diameter) D5 of 14 mm; the inner side face 52b of the fixedly retained portion 52 has an opening width d1 of 8 mm; and the straight portion 56c of the root portion inner side face 56a has an opening width d2 of 11 mm. The smaller clearances H3 and H3 are individually set to 1.5 mm, and the larger clearances H4 and H4 are individually set to 3 mm. The retaining hole 9a of the inner panel 9 has an opening width (or an internal diameter) d0 set to 14 mm.

The front pillar garnish 43 (as the airbag cover 21) is mounted on the inner panel 9 on the side of the body 1 in the following manner. First, the caps 51 are mounted in advance around the two core members 46. The individual caps 51 are mounted from the side of the root portion 49b of the neck portion 49 to the diverging portion 50b on the root portion side of the head portion 50 (as shown in FIG. 15) by bringing the flange portion 58 into abutment against the boss portion 44e. Because the cap 51 can be elastically deformed, the cap 51 can be easily mounted around the core member 46. For this mounting, the cap 51 is fitted at first from the side of the flange portion 58 onto the core member 46. This fitting of the cap 51 is performed by protruding the converging portion 50a on the side of the leading end portion of the head portion 50 from the fixed retained portion 52.

Figure 16:
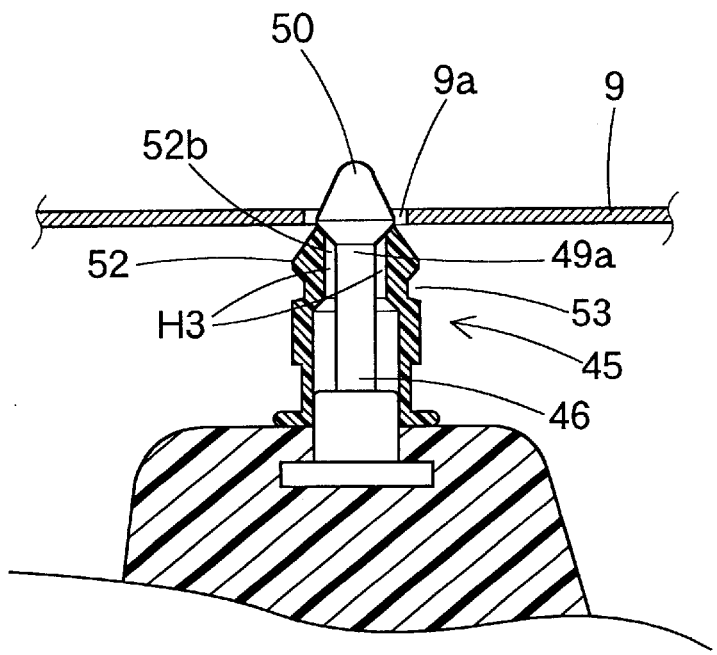
FIG. 16 is an enlarged section showing the front pillar garnish of the first embodiment during mounted.
Figure 17:
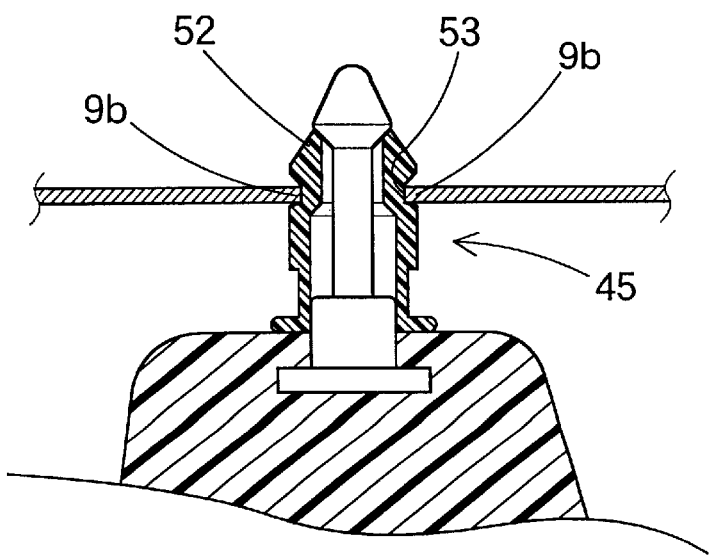
FIG. 17 is an enlarged section showing the front pillar garnish of the first embodiment mounted.

In this state, the fixedly retained portion 52 of the cap 51 is inserted into the circumferential edge of the retaining hole 9a on the back side of the inner panel 9, as shown in FIGS. 16 and 17. At this time, the inner side face 52b of the fixed retained portion 52 is allowed by the smaller clearances H3 to be inserted in the inserting direction into the retaining hole 9a of the fixedly retained portion 52. In other words, the smaller clearances H3 provide space for permitting warping of the fixedly retained portion 52. As a result, the fixedly retained portion 52 can be easily inserted by a distance sufficient to arrange the inner circumferential portion 9b of the retaining hole 9a in the first groove 53. When the inner circumferential portion 9b of the retaining hole 9a is arranged in the first groove 53, the fixedly retained portion 52 of the cap 51 is retained on the circumferential edge of the retaining hole 9a on the back side of the inner panel 9. The opening width d1 of the inner side face 52b of the fixedly retained portion 52 is so set that the head portion 50 of the core member 46 is retained and cannot be extracted. As a result, the fixedly retained portion 52 of the cap 51 is so retained together with the core member 46 on the circumferential edge of the retaining hole 9a in the first retaining state so that the fixedly retained portion 52 also cannot be extracted. As a result, the front pillar garnish 43 is firmly fixed as the airbag cover 21 on the inner panel 9 on the side of the body 1.

Figure 18:
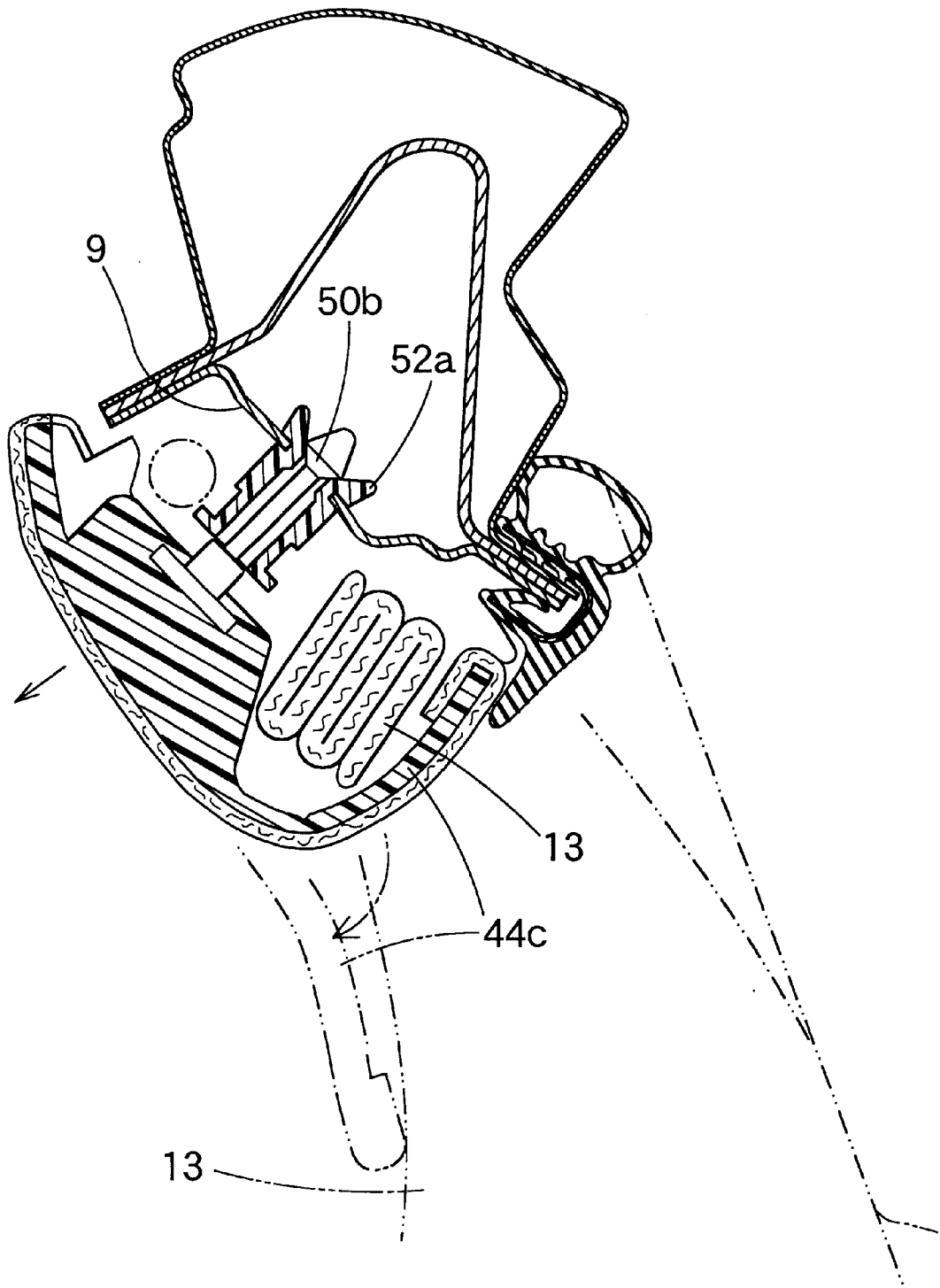
FIG. 18 is an enlarged section showing a state of the front pillar garnish of the first embodiment when the airbag is inflated to expand.

If the inflator 17 is activated after the front pillar garnish 43 has been fixed on the inner panel 9 of the front pillar body 6, the airbag 13 is inflated to expand. In the front pillar portion PF, the door portion 44c of the garnish 43 is thereby pushed and opened by the airbag 13, as indicated by double-dotted lines in FIGS. 1, 11 and 18. Then, the airbag 13 protrudes to cover the opening W.

In the illustrated embodiment, expansion of the airbag 13 pushes the front pillar garnish 43 into the vehicle and widens the area for the door portion to be opened. This is because the head portion 50 of the core member 46 is caused to enlarge the diameter of the leading end portion 52a by the diverging portion 50b when the garnish body 44 as the airbag cover body is pushed by the airbag 13. The head portion 50 cannot be extracted from the fixedly retained portion 52. Rather, the leading end portion 52a undergoes elastic deformation to radially expand, thereby permitting the garnish body 44 to move into the vehicle. As a result, the area for the door portion 44c is enlarged.

Figure 19:
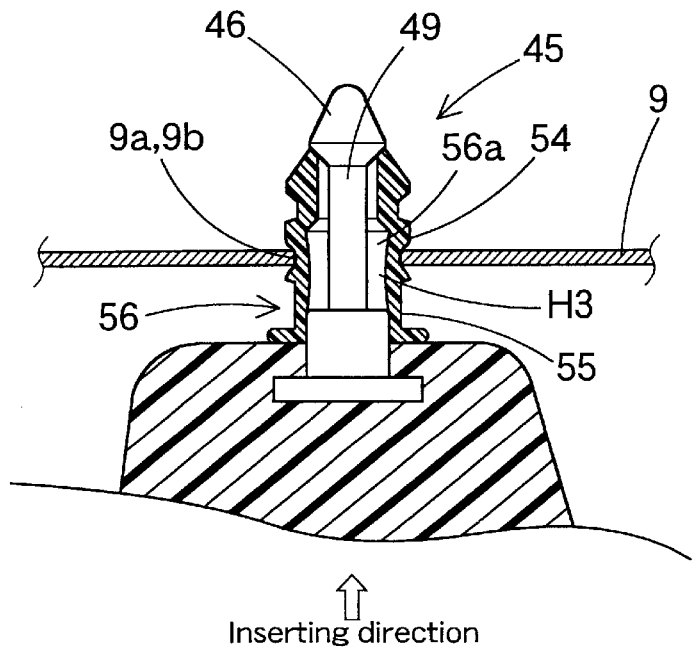
FIG. 19 is an enlarged section showing the front pillar garnish of the first embodiment during demounting.
Figure 20:
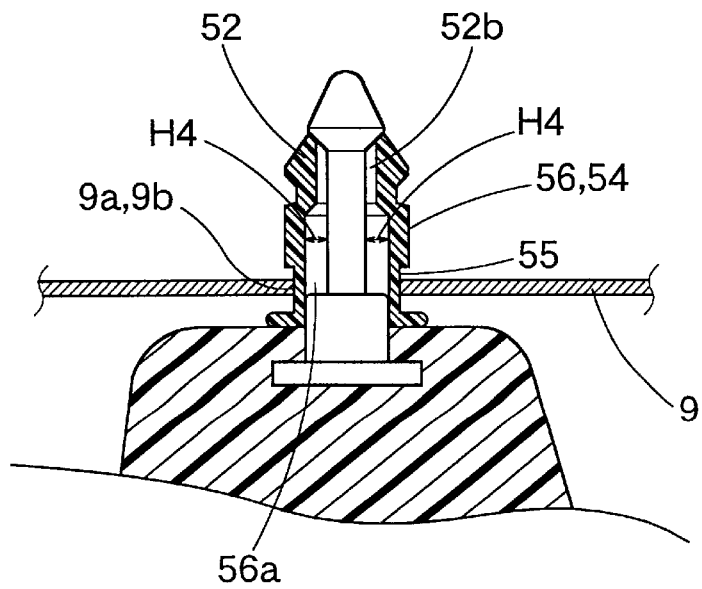
FIG. 20 is an enlarged section showing the front pillar garnish of the first embodiment during demounting, but after the state shown in FIG. 19.

The front pillar garnish 43 is demounted from the inner panel 9 in the manner shown in FIGS. 19 and 20. First, the clip portion 45 is pushed in the inserting direction so that the inner circumferential portion 9b of the retaining hole 9a rests in the second groove 55 of the cap 51. At this time, the larger clearances H4 are formed between the inner side face 56a on the side of the root portion 56 of the cap 51 and the neck portion 49 of the core member 46. As a result, the root portion 56 of the cap 51 is warped to narrow those clearances H4, so that the retaining hole inner circumferential portion 9b can be arranged at the position of the second groove 55.

Figure 21:
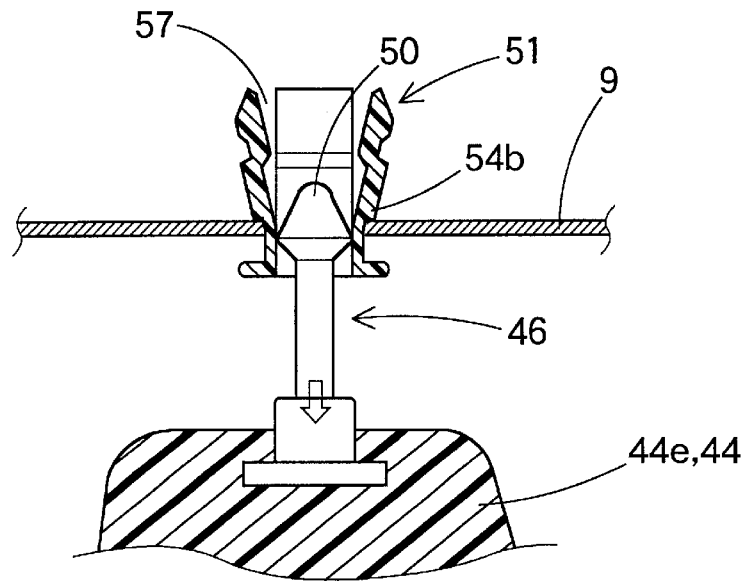
FIG. 21 is an enlarged section showing the front pillar garnish of the first embodiment during demounting, but after the state shown in FIG. 20.

When the inner circumferential portion 9b of the retaining hole 9a is arranged at the position of the second groove 55, moreover, the cylindrical portion 54 is retained on the back side of the circumferential edge of the retaining hole 9a. As referred to herein, in this position the clip portion 45 is in the second retaining state. At this time, the inner side faces 56a and 52b of the root portion 52 and the fixedly retained portion 52 of the cap 51 are so set as to extract the head portion 50 of the core member 46. As shown in FIG. 21, therefore, the core member 46 can be easily extracted together with the garnish body 44 from the cap 51. As a result, the garnish body 44 can be demounted from the inner panel 9 on the side of the body 1. The cap 51 can then be easily extracted from the retaining hole 9a, since the cap 51 is elastically deformable. Then, the cap 51 is mounted around the core member 46 which has already been demounted from the inner panel 9.

As a result, the front pillar garnish 43 can be fixed to and demounted from the airbag cover of the first embodiment without any mounting bolt being fixed on the inner panel 9 on the side of the body 1.

Figure 24:
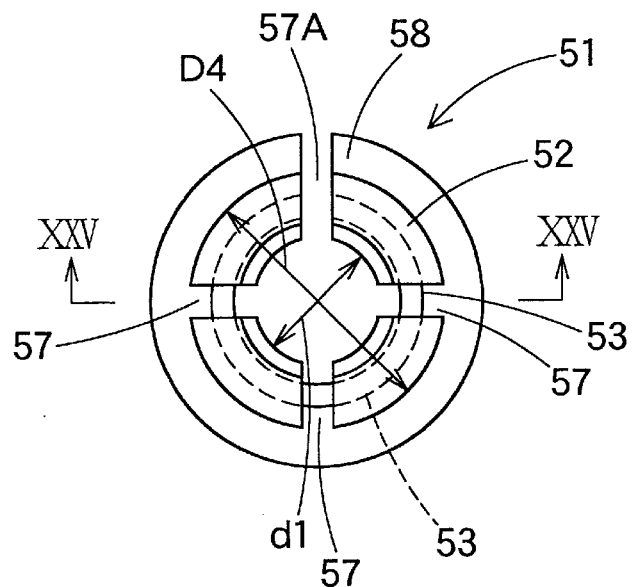
FIG. 24 is a top plan view showing a modification of the cap.
Figure 25:
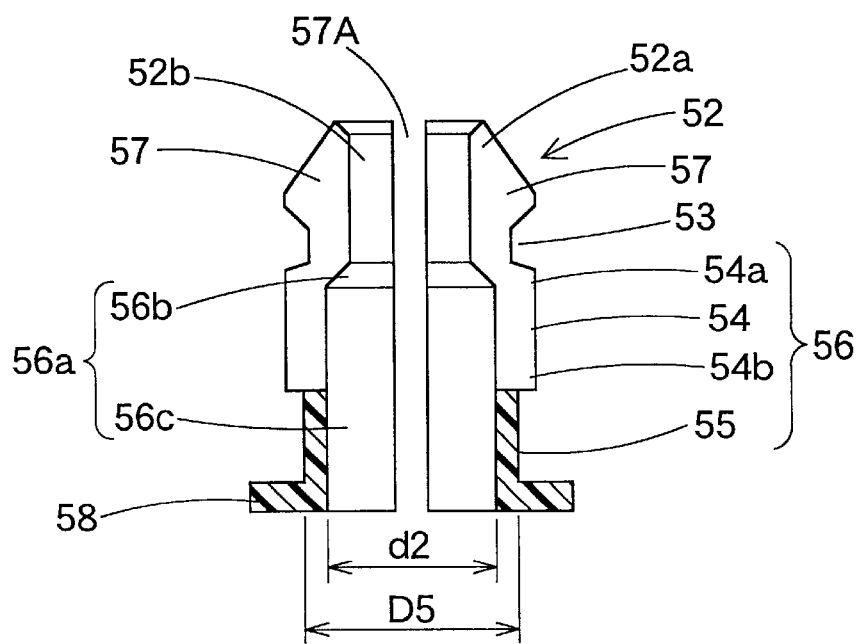
FIG. 25 is a section taken along line XXV—XXV of FIG. 24, showing the modified cap.

In the garnish 43 of the first embodiment, the cap 51 is mounted around and over the core member 46 in the axial direction of the core member 46. In order to facilitate passage of the core member 46 through the portion of the fixedly retained portion 52 of the cap 51, in a modification to the first embodiment the cap 51 can be constructed as shown in FIGS. 24 and 25. Specifically, one 57A of the slits 57 of the cap 51 is formed throughout the length of the cap 51. By widening that slit 57A, the cap 51 is mounted around the core member 46 in a radial direction, i.e., perpendicular to the axial direction of the core member 46. The cap 51 may be formed in the described manner.

In the garnish 43 of the first embodiment, the core member 46 of the clip portion 45 is made separate from the garnish body 44. Specifically, the core member 46 is inserted and buried in the garnish body 44 when this body 44 is molded. However, in accordance with another modification of the first embodiment the core member 46 may be molded integrally with the garnish body 44 made of a synthetic resin, as shown in FIGS. 22 and 23.

Figure 22:
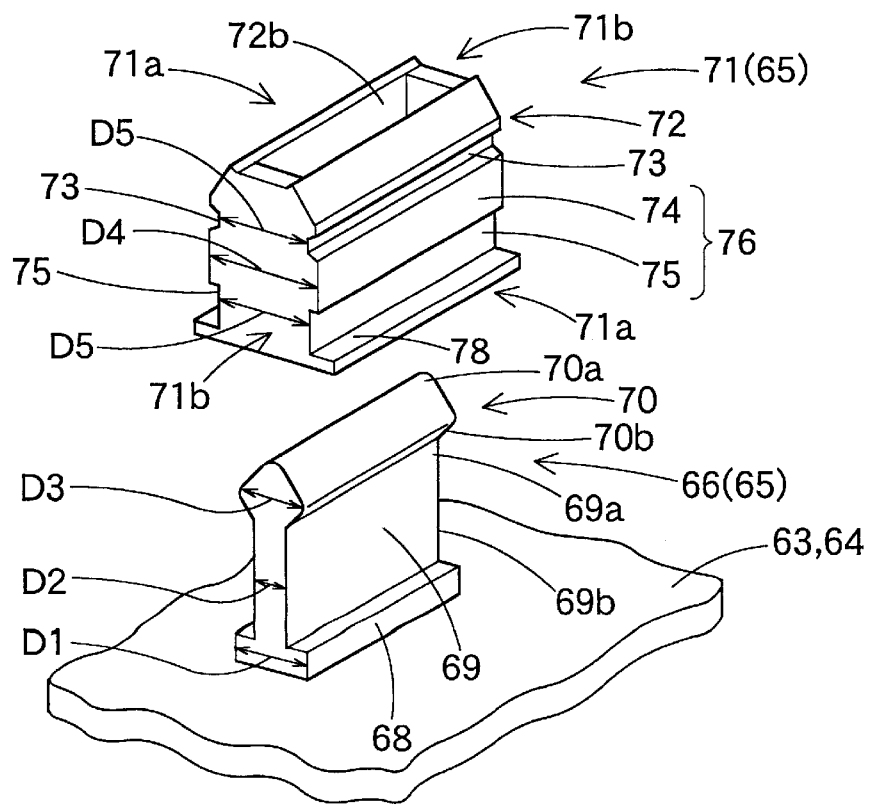
FIG. 22 is an exploded perspective view showing a modification of the clip portion of the first embodiment.
Figure 23:
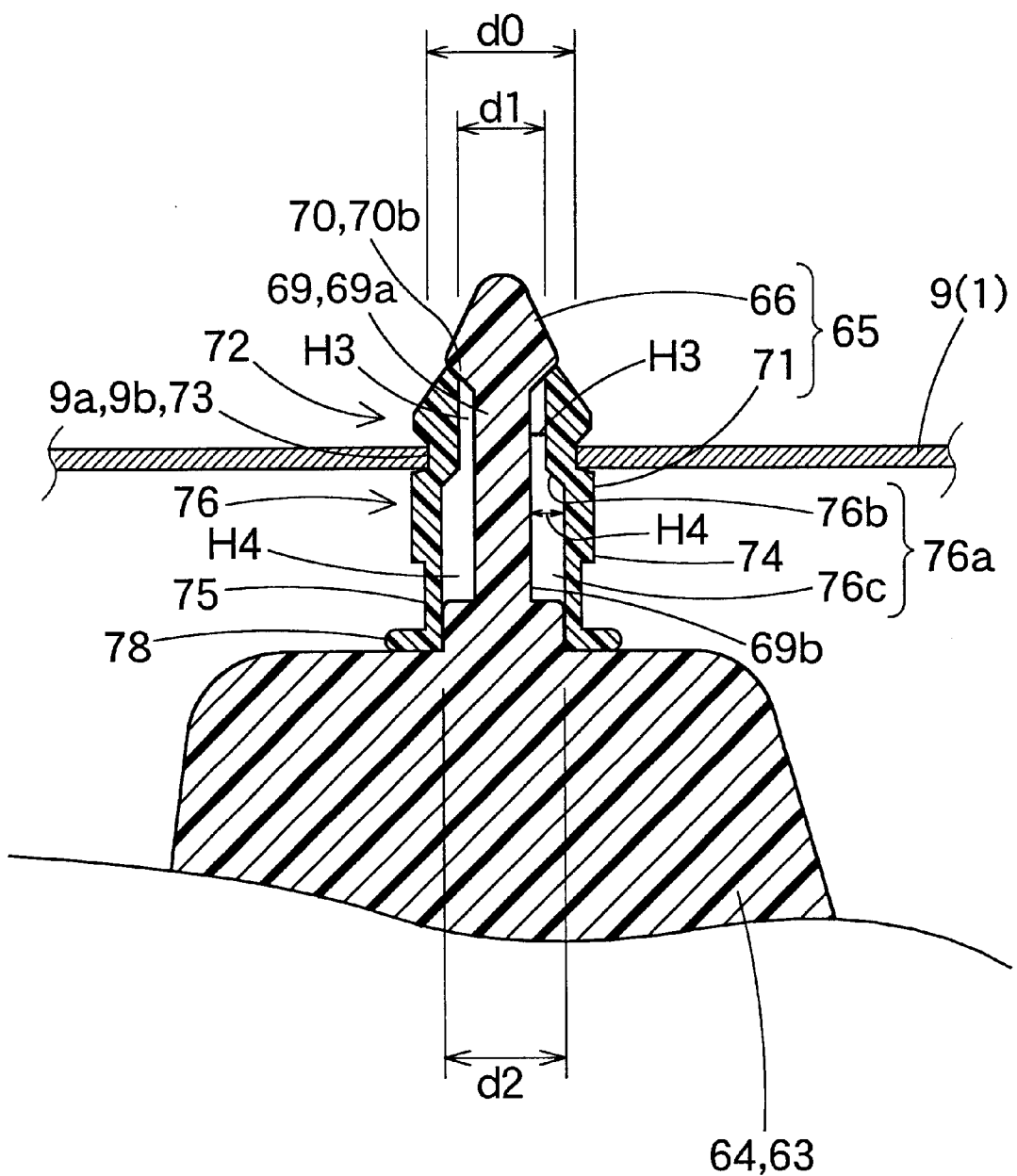
FIG. 23 is a section showing a state in which the mounting of the clip portion shown in FIG. 22 has been completed.

In accordance with yet another modification to the first embodiment, the core member of the clip portion may be formed into a plate shape, as also is shown in FIGS. 22 and 23, in place of the rod-shaped core member 46. Then, the core member 66 is made, like an airbag cover body 64, of a synthetic resin such as thermoplastic olefinic elastomers. Moreover, the core member 66 is provided with a base portion 68, a neck portion 69 and a head portion 70. The neck portion 69 is formed into a plate shape having a smaller thickness than that of the base portion 68. The neck portion 69 protrudes from the end face of the base portion 68. The head portion 70 is joined to the leading end portion 69a of the neck portion 69. The head portion 70 has a larger width size than that of the neck portion 69. The head portion 70 is provided with a diverging portion 70b and a converging portion 70a. The diverging portion 70b is arranged on the side of the root portion and diverges toward the leading end side. The converging portion is arranged on the side of the leading end portion, and converges toward the leading end side.

A cap 71 is formed into a generally rectangular shape, and is made of an elastically deformable synthetic resin such as polyamide (or 66 nylon) or thermoplastic olefinic elastomers, or rubber. The cap 71 is provided with two sets of opposed side walls 71a and 71a, and 71b and 71b. The cap 71 covers the core member 66, when mounted around the core member 66, from the root portion 69b of the neck portion 69 to the root portion (or the diverging portion 70b) of the head portion 70. The cap 71 is provided with a flange portion 78. When the cap 71 is mounted around the core member 66, the flange portion 78 abuts against the airbag cover body 64, and the leading end portion of the cap 71 covers the core member 66 up to the diverging portion 70b.

In addition, the cap 71 is provided with first and second grooves 73 and 75 in the outer side faces of the side walls 71a adjacent to each other. The first and second grooves 73 and 75 are arranged at the positions of the leading end portion 69a and the root portion 69b of the neck portion 69, respectively, when the cap 71 is mounted around the core member 66. The first and second grooves 73 and 75 can receive the portion 9b of the inner circumference of the retaining hole 9a therein. The retaining hole 9a is formed in a rectangular shape in the inner panel 9 on the side of the body 1. The leading end side from the first groove 73 is provided as a fixedly retained portion 72. This fixedly retained portion 72 is retained on the circumferential edge of the retaining hole 9a when the fixedly retained portion 72 is inserted into the retaining hole 9a. The fixedly retained portion 72 converges at its leading end portion 72a. This leading end portion 72a is generally flush with the converging portion 70a on the leading end side of the head 70 in the core member 66 when the cap 71 is mounted around the core member 66. Between the first and second grooves 73 and 75, there is arranged a cylindrical portion 74 having a constant width size.

On the side of the inner circumference of the cap 71, an inner side face 76a is set so as to diverge from an inner side face 72b. This inner side face 72b is located between the side walls 71a in the fixedly retained portion 72. The inner side face 76a is located between the side walls 71a on the side of the cylindrical portion 74 and a root portion 76. The root portion 76 contains the second groove 75. The root portion inner side face 76a is composed of a diverging portion 76b and a straight portion 76c. The diverging portion 76b diverges from the inner side face 72b of the fixedly retained portion 72. The straight portion 76c has a constant opening width from the diverging portion 76b.

The opening width d1 of the inner side face 72b of the fixedly retained portion 72 is set so that the cap 71 can be pushed in the inserting direction into the retaining hole 9a of the fixedly retained portion 72 when the cap 71 is mounted around the core member 66. With the cap 71 being mounted around the core member 66, more specifically, the predetermined smaller clearances H3 are arranged between the inner side face 72b and the neck portion 69. These smaller clearances H3 absorb the warpage of the fixedly retained portion 72 when this portion 72 is constricted. On the other hand, the opening width d1 is so set that the head portion 70 of the core member 66 cannot be extracted when the fixedly retained portion 72 is retained on the circumferential edge of the retaining hole 9a and the head portion 70 is on the back side of the inner panel 9. Moreover, the opening width d1 is set so that the head portion 70 of the core member 66 can be inserted when the inner circumferential portion 9b of the retaining hole 9a is arranged in the second groove 75.

The inner side face 76a between the side walls 71a and 71a of the root portion 76 is so set as to push a clip portion 65 in the inserting direction. The clip portion 65 is arranged so that the inner circumferential portion 9b of the retaining hole 9a is positioned in the second groove 75. With the cap 71 being mounted around the core member 66, the larger clearances H4 are present between the inner side face 76a and the neck portion 69. The larger clearance H4 is larger than the smaller clearance H3. The larger clearance H4 absorbs the constricting warpage of the root portion 76. As a result, the clip portion 65 can be pushed in the inserting direction to set the inner circumferential portion 9b of the retaining hole 9a in the second groove 75. Moreover, the opening width d2 is set so that the head portion 70 of the core member 66 can be pulled out from the cap 71, when the inner circumferential portion 9b of the retaining hole 9a is arranged at the position of the second groove 75. The opening width d2 is defined by the straight portion 76c in the root portion 76 of the cap 71 having the second groove 75.

An airbag cover 63 is mounted on the body 1 in the following manner. First, the cap 71 is mounted in advance around the core member 66 of the airbag cover body 64 by bringing the flange portion 78 into abutment against the cover body 64 so that the cap 71 covers the core member 66 from the root portion 69b of the neck portion 69 to the diverging portion 70b on the root portion side of the head portion 70. Then, the fixedly retained portion 72 of the cap 71 is inserted to the circumferential edge of the retaining hole 9a on the back side of the inner panel 9 so that the fixedly retained portion 72 warps to constrict. This warpage is absorbed by the smaller clearances H3. As a result, the fixedly retained portion 72 can be inserted so that the portion 9b of the inner circumference of the retaining hole 9a is arranged in the first groove 73. When the retaining hole inner circumference portion 9b is arranged in the first groove 73, the fixedly retained portion 72 of the cap 71 is retained on the circumferential edge of the retaining hole 9a on the back side of the inner panel 9. The opening width d1 of the inner side face 72b of the fixedly retained portion 72 is so set that the head portion 70 of the core member 66 cannot be pulled out during retention. As a result, the fixedly retained portion 72 of the cap 71 is retained together with the core member 66 on the circumferential edge of the retaining hole 9a so that the cap 71 cannot be pulled out. The clip portion 65 is in the first retaining state. As a result, the airbag cover 63 can be firmly fixed onto the inner panel 9.

Demounting of the airbag cover 63 from the inner panel 9 is performed in the following manner. First, the clip portion 65 is pushed in the inserting direction so far as to set the inner circumferential portion 9b of the retaining hole 9a in the second groove 75. During movement of the clip portion 65, the larger clearances H4 formed between the inner side face 76a and the neck portion 69 permit the cap 71 to warp to narrow the clearances H4 so that the retaining hole inner circumferential portion 9b can be arranged at the position of the second groove 75.

When the inner circumferential portion 9b of the retaining hole 9a is thus arranged at the position of the second groove 75, the inner circumferences 76*b* and 76*c* of the root portion 76 and the fixedly retained portion 72 of the cap 71 are set so as to permit the head portion 70 to be pulled out of the core member 66, so that the clip portion 65 takes the second retaining state. The core member 66 can be easily pulled out together with the airbag cover body from the cap 71. As a result, the cover body 64 can be demounted from the inner panel 9 on the side of the body 1. After demounting, the cap 71 can be easily pulled out from the retaining hole 9*a* because the cap 71 is elastically deformable. Then, the cap 71 is mounted around the core member 66 on the side of the cover body 64 which has already been demounted from the inner panel 9.

Thus, the airbag cover 63 can be easily demounted and fixedly re-mounted on the inner panel 9 on the side of the body 1 without using any mounting bolt.

Figure 26:
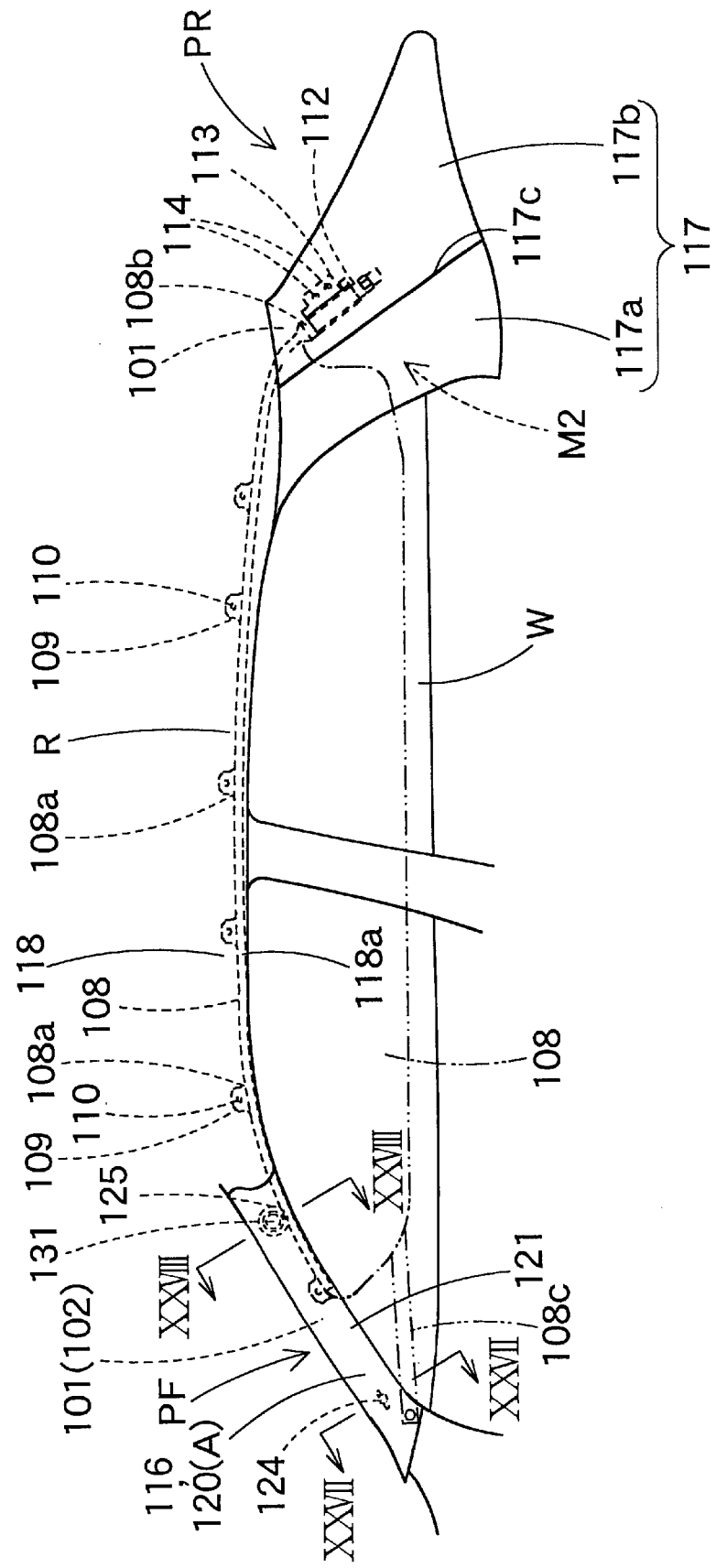
FIG. 26 is a front elevation taken from the inside of a vehicle, and shows a head protecting airbag device according to a second embodiment.
Figure 28:
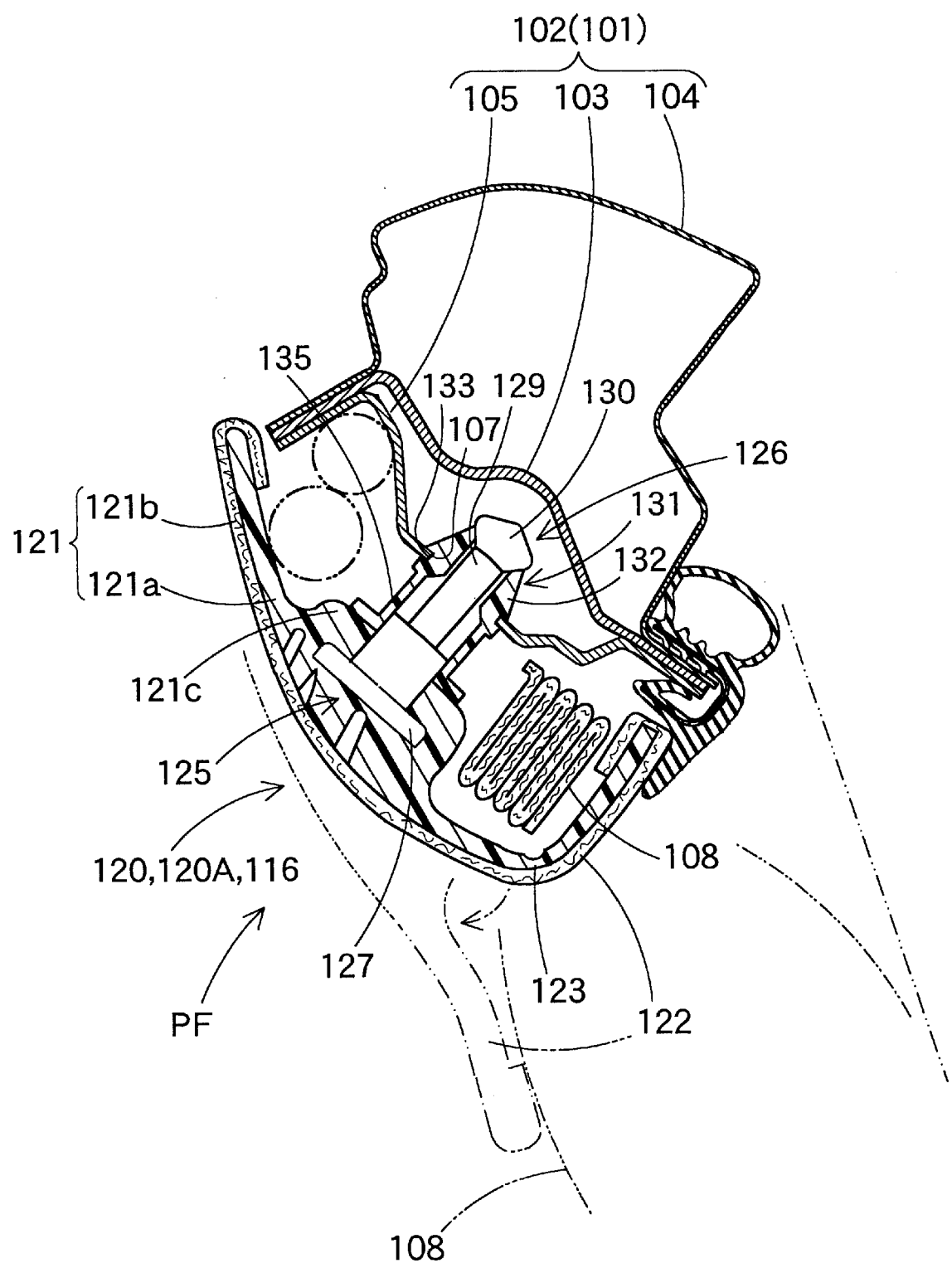
FIG. 28 is an enlarged schematic section taken along XXVIII—XXVIII of FIG. 26, and shows the front pillar garnish of the second embodiment.
Figure 36:
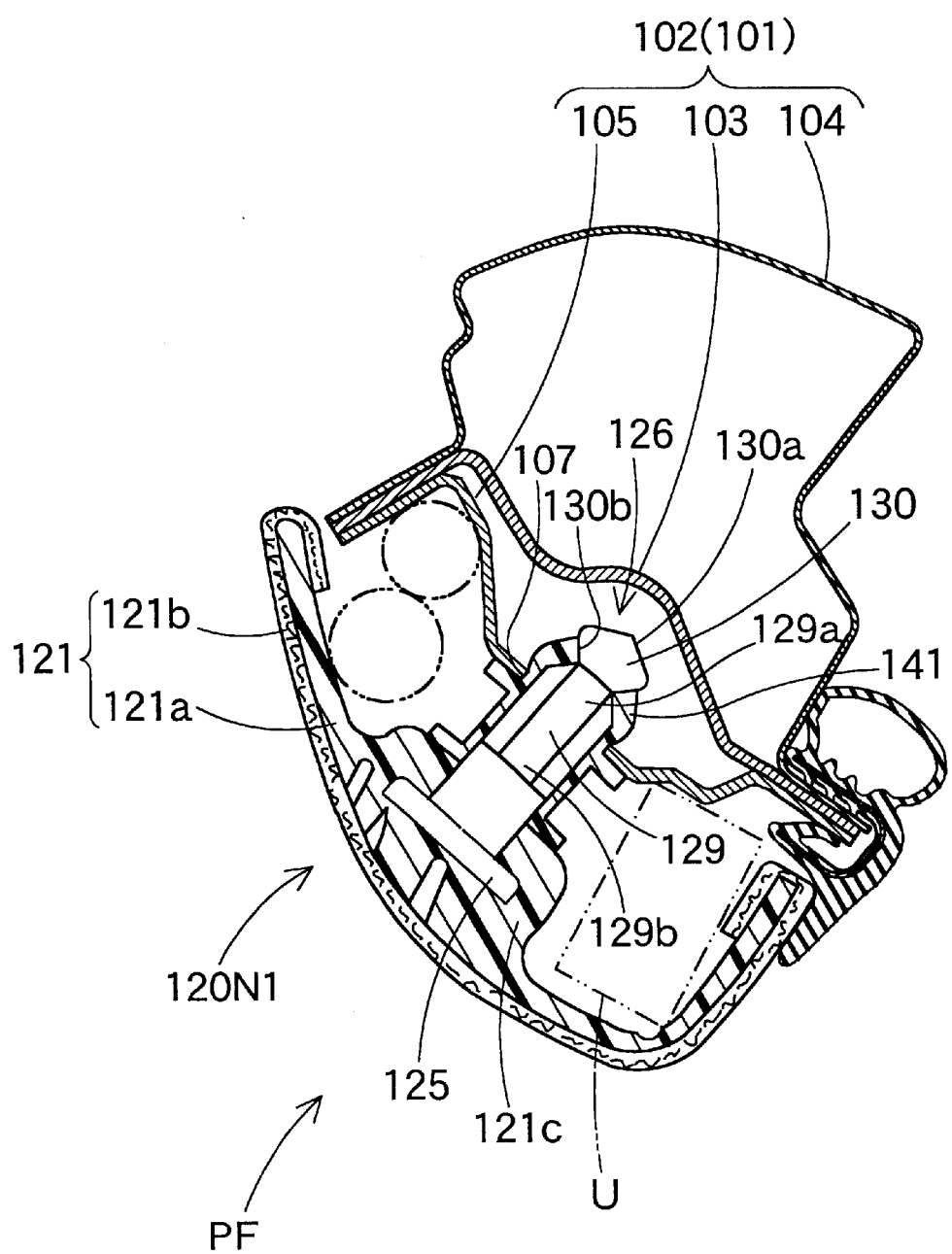
FIG. 36 is an enlarged section showing the vicinity of the clip portion when the airbag cover of the second embodiment is used as a normal-type garnish.
Figure 37:
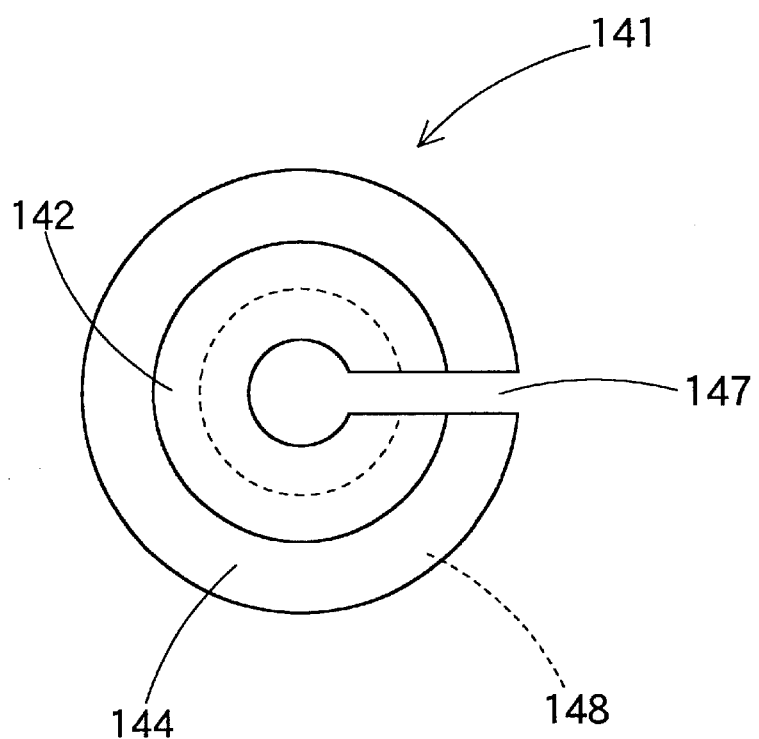
FIG. 37 is a top plan view showing the cap when the airbag cover of the second embodiment is used as a normal-type garnish.
Figure 38:
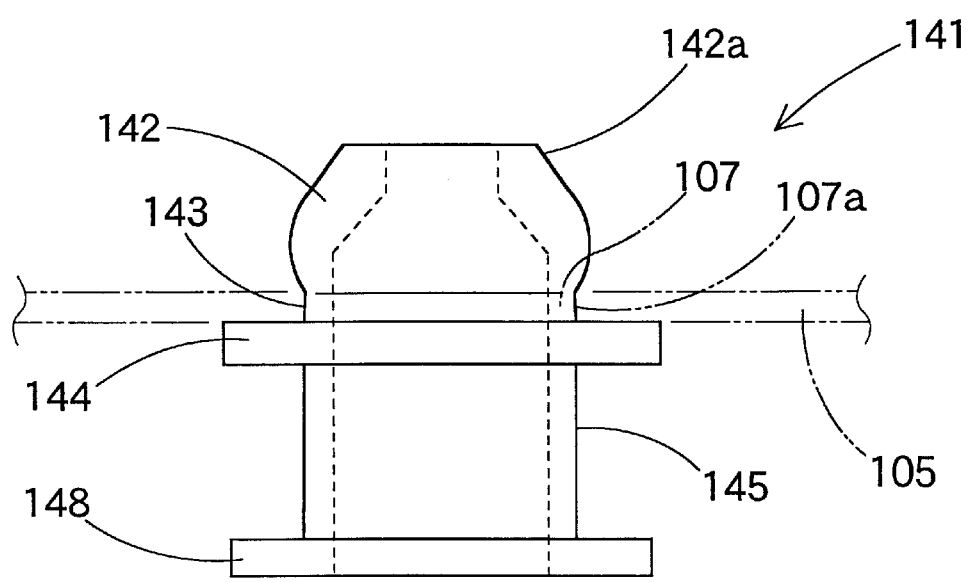
FIG. 38 is a front elevation showing the cap when the airbag cover of the second embodiment is used as a normal-type garnish.
Figure 39:
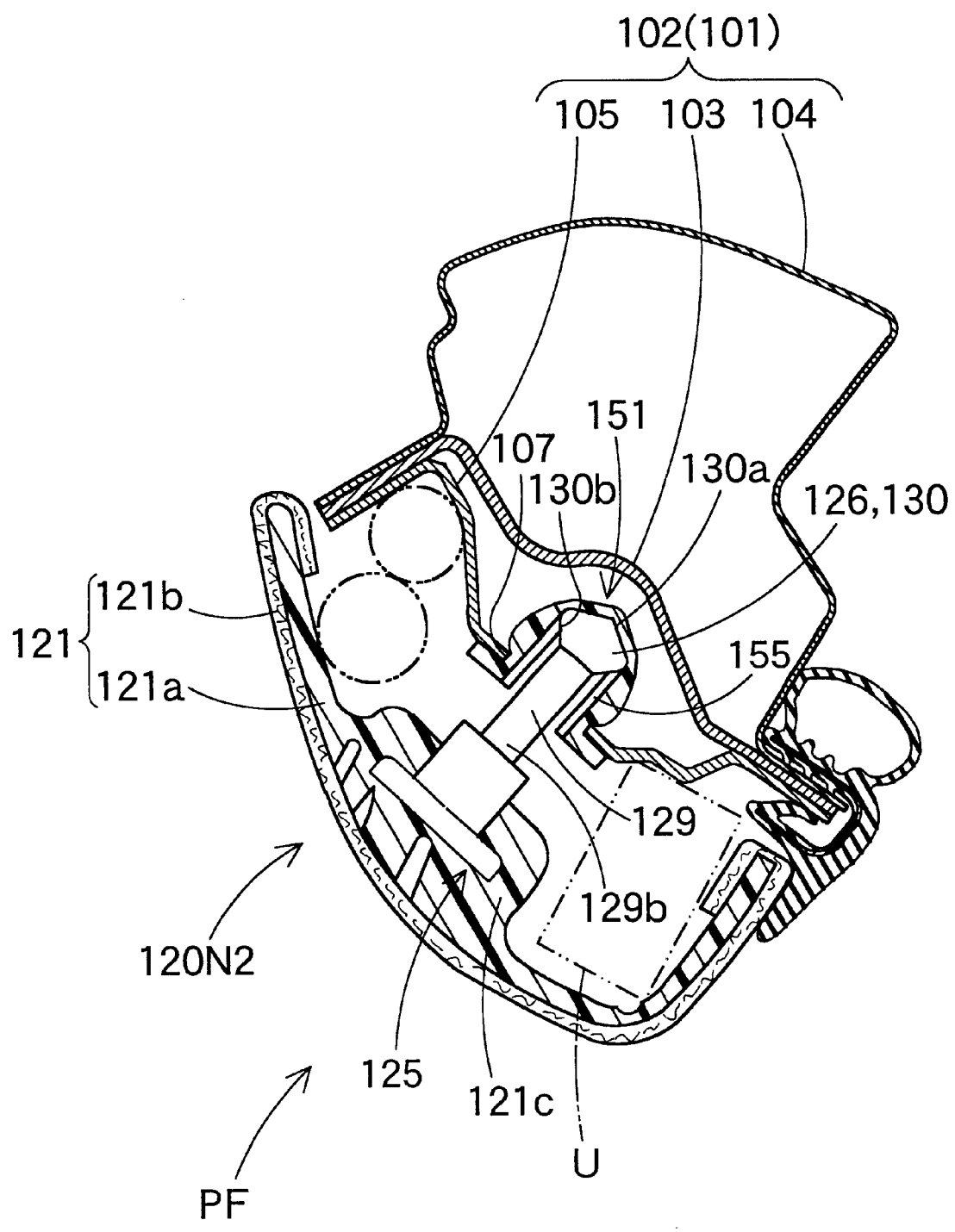
FIG. 39 is an enlarged section showing the vicinity of the clip portion when the airbag cover of the second embodiment is used as a normal-type garnish.

In a head-protecting airbag device M2 as shown in FIG. 26, a front pillar garnish 120 can be used commonly as an airbag cover garnish 120A and as normal garnishes 120N1 and 120N2. The garnish 120 is arranged in the front pillar portion PF on the interior side of the vehicle. The front pillar garnish 120 can be used as the airbag cover 120A and as the normal garnishes 120N1 and 120N2, as shown in FIGS. 28, 36 and 39, by mounting caps 131, 141 and 151 on core members 126 of clip portions 125. The pillar garnish 120A for the airbag cover covers a portion of a folded airbag 108, as shown in FIG. 26. This airbag 108 is folded throughout the rear pillar portion PR, the roof side rail portion R and the front pillar portion PF of the vehicle.

The head-protecting airbag device M2 is provided with the airbag 108, an inflator 112 and an airbag cover 116. The inflator 112 feeds the airbag 108 with an inflating gas. The inflator 112 is covered with a rear panel portion 117*b* of a rear pillar garnish 117. The inflator 112 is fixed in a body 101 of the rear pillar portion PR. The airbag cover 116 covers the folded airbag 108 on the interior side. In the case of the embodiment, the airbag cover 116 is composed of the front pillar garnish 120A, a lower edge 118*a* of a roof interior member 118, and the rear pillar garnish 117.

The airbag 108 is provided with a plurality of mounting portions 108*a* and a plurality of jointing cylindrical portions 108*b*. Each mounting portion 108*a* is arranged on the upper edge side of an opening W on the interior side by fixing a mounting bracket 109 made of a sheet metal. The jointing cylindrical portion 108*b* is mounted around the inflator 112. Moreover, the airbag 108 is mounted on the side of the body 101 of the vehicle by means of the mounting brackets 109 and mounting bolts 110. A belt portion 108*c* is provided on the front side of the airbag 108. The belt portion 108*c* is joined at its front end to the body 101 in the lower portion of the front pillar portion PF. The belt portion 108*c* applies its tension to the lower edge of the airbag 108 when this airbag 108 is inflated to expand. Moreover, the belt portion 108*c* prevents the airbag 108 from moving to the exterior side of the vehicle.

The inflator 112 is of a cylinder type mounting the jointing cylindrical portion 108*b* of the airbag 108 therearound. Around the jointing cylindrical portion 108*b*, moreover, there is mounted a mounting bracket 113 made of a sheet metal. The inflator 112 is fixed on the rear pillar portion PR on the side of the body 101 by means of the mounting bracket 113 and two mounting bolts 114.

The rear pillar garnish 117 is provided with a front panel portion 117*a* on the front edge side and a rear panel portion 117*b* on the rear edge side. The rear panel portion 117*b* covers the folded airbag 108. The rear panel portion 117*b* provides a door portion 117*c* on its front edge side. The door portion 117*c* is opened when the airbag 108 is inflated to expand.

The mounting of the head protecting airbag device M2 of the second embodiment on the vehicle is similar to that of the first embodiment.

The garnish 120A of the second embodiment is mounted on a front pillar body 102 on the side of the body 101, as shown in FIGS. 26 to 29. The front pillar body 102 is composed of a reinforcement panel 103, an outer panel 104 and an inner panel 105, which are individually made of sheet steel. The inner panel 105 is provided with two retaining holes 106 and 107 for mounting the pillar garnish 120A. These retaining holes 106 and 107 are formed in a circular shape.

The pillar garnish 120A is provided with a garnish body 121 or the airbag cover body, retained legs 124 and the clip portions 125. The garnish body 121 covers the whole area of the front pillar portion PF on the interior side. The retained legs 124 are used to mount the garnish body 121 on the inner panel 105. The clip portions 125 are used to fix the garnish body 121 on the inner panel 105.

The garnish body 121 is provided with a base portion 121*a* and a surface skin 121*b*. The base portion 121 is made of a synthetic resin such as thermoplastic elastomers of olefins. The surface skin 121*b* is made of a synthetic resin such as soft vinyl chloride or thermoplastic elastomers of olefins, or a fabric, and is bonded to the surface side of the base portion 121*a*. On the other hand, the garnish body 121 has a door portion 122 arranged on its lower edge side. The door portion 122 is pushed and opened by the airbag 108 when this airbag 108 is inflated to expand. On the upper edge side of the door portion 122, there is formed a hinge portion 123 so that the door portion 122 may be easily opened. The hinge portion 123 is formed by thinning the base portion 121*a*.

Figure 27:
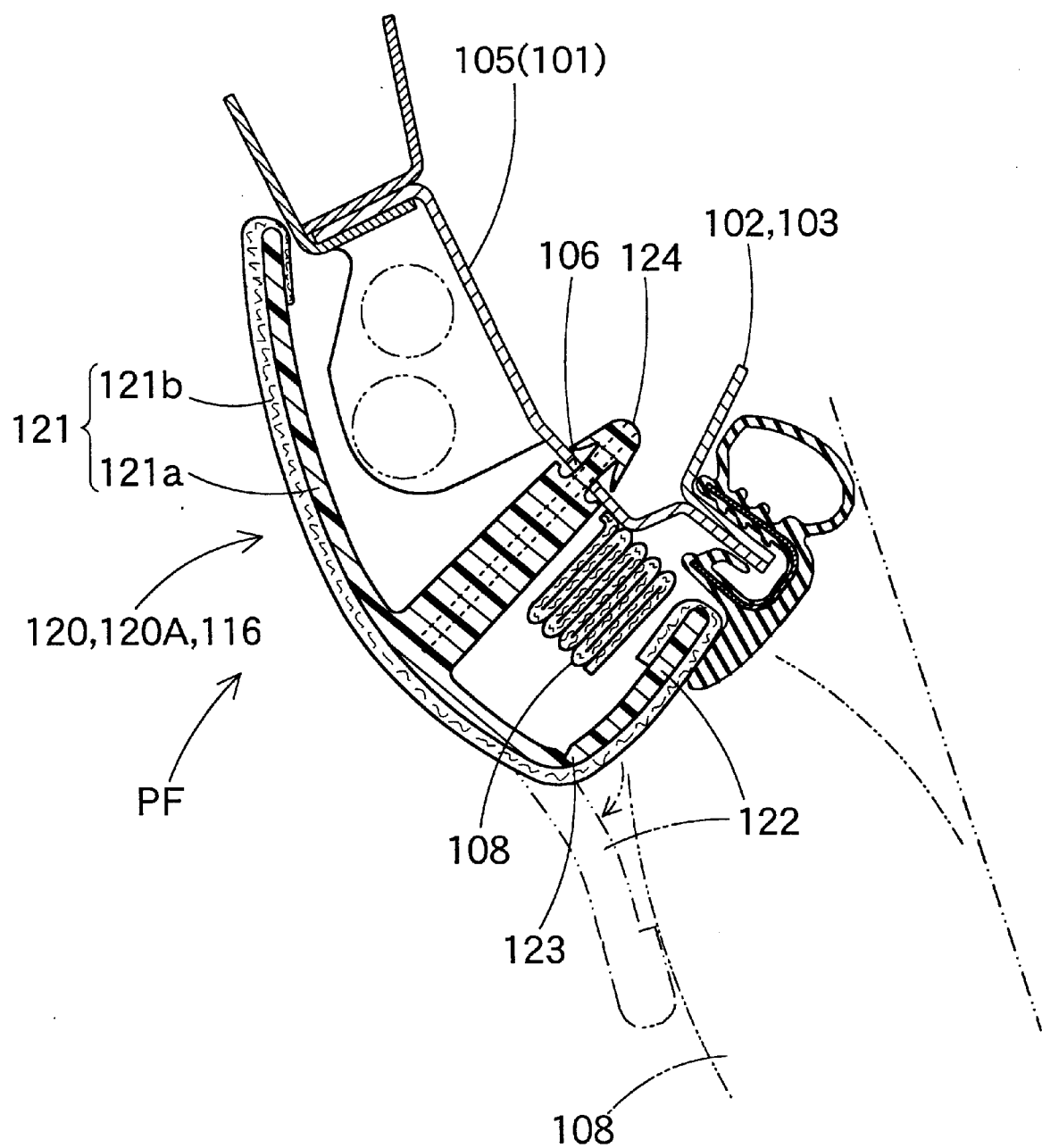
FIG. 27 is an enlarged schematic section taken along XXVII—XXVII of FIG. 26, and shows an airbag cover (or a front pillar garnish) of the second embodiment.
Figure 29:
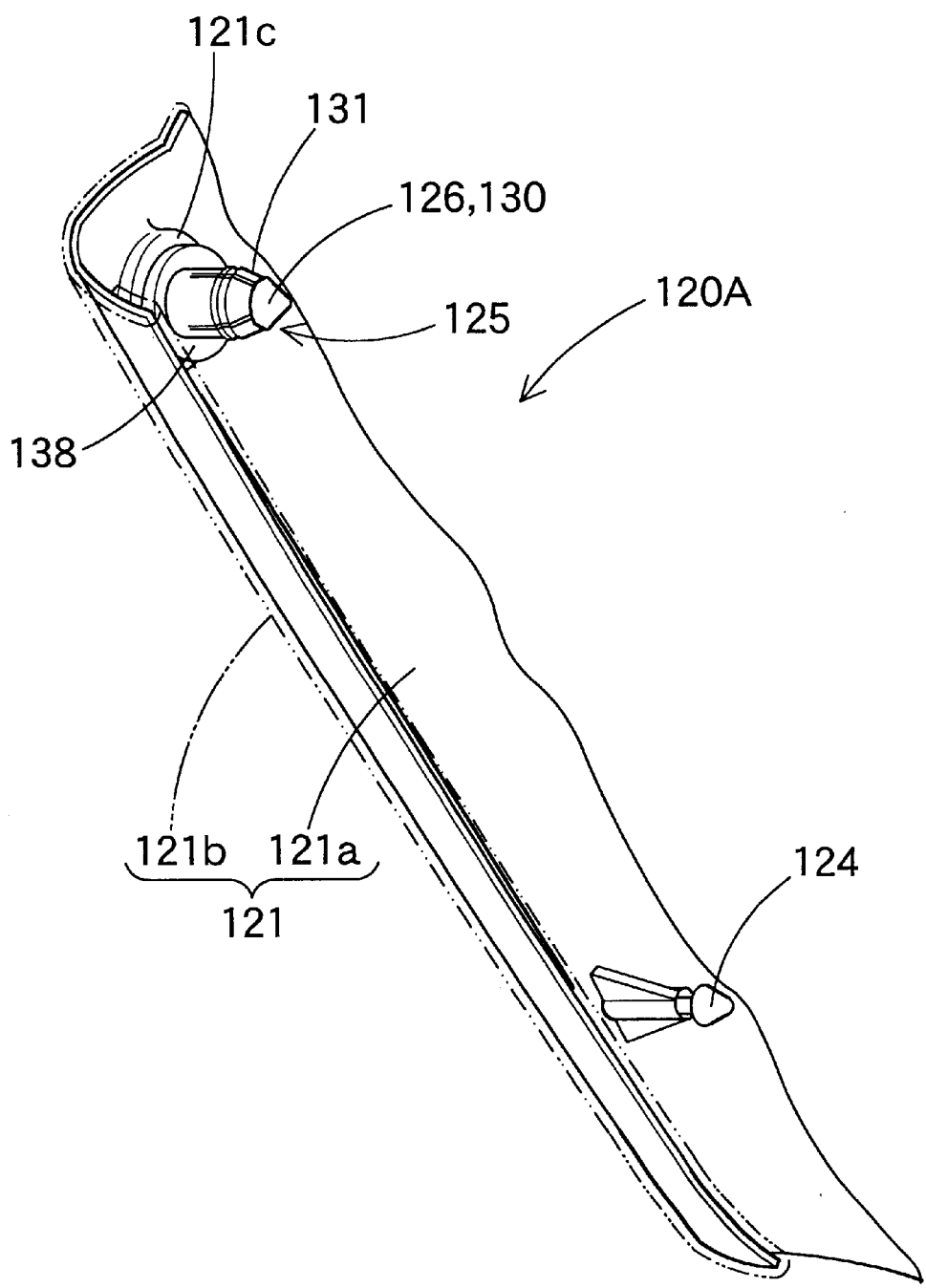
FIG. 29 is a schematic perspective view taken from the outside of the vehicle, showing the front pillar garnish of the second embodiment.

The retained legs 124 are formed on the lower back side of the garnish body 121, as shown in FIGS. 26, 27 and 29. The retained legs 124 are formed integrally with the base portion 121*a*. The retained legs 124 are inserted into the retaining holes 106, and are retained on the circumferential edges of the retaining holes 106. These retaining holes 106 are formed in the inner panel 105 on the side of the body 101. The retaining forces of the retained legs 124 on the inner panel 105 are weaker than those of the clip portions 125. In other words, the retained legs 124, as retained on the circumferential edges of the retaining holes 106, can be extracted from the retaining holes 106 if they are forcibly pulled toward the interior compartment.

Each clip portion 125 comprises the core member 126 and the cap 131. The core member 126 is arranged on the upper back side of the garnish body 121, as shown in FIGS. 26, 28 and 29.

Figure 33:
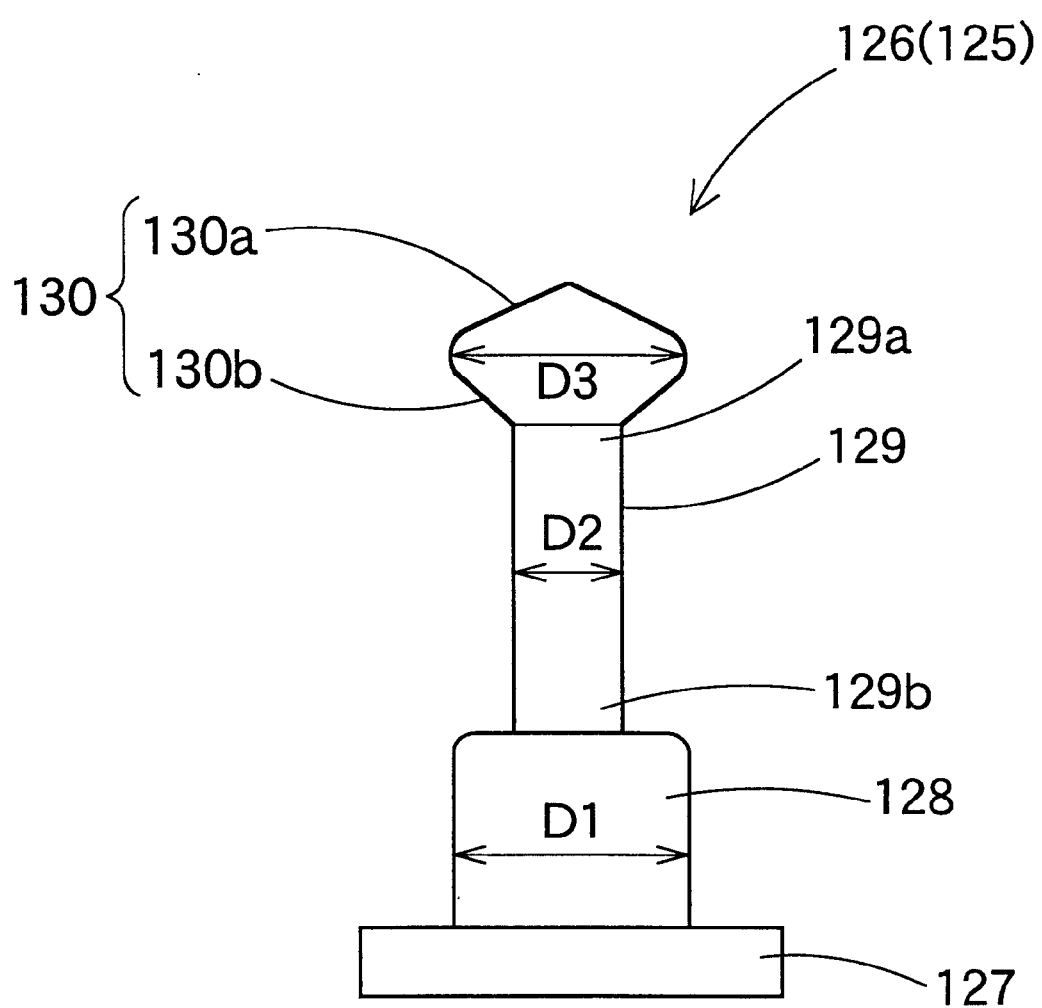
FIG. 33 is a front elevation showing a core member of the clip portion of the second embodiment.

The core member 126 can be made of a rigid steel bar. Moreover, the core member 126 is similar to the core member 46 of the clip portion 45 of the first embodiment, as shown in FIGS. 28 and 33. Specifically, the core member 126 is composed of a flange portion 127 similar to the flange portion 47, a diametrically larger portion 128 similar to the diametrically larger portion 48, a neck portion 129 similar to the neck portion 49, and a head portion 130 similar to the head portion 50.

The flange portion 127 is formed into a disc shape and is buried in boss portion 121*c* of the garnish body 121. The boss portion 121*c* is formed into a column shape and is molded integrally with the base portion 121*a*. The diametrically larger portion 128 is protruded in a column shape from the flange portion 127. The neck portion 129 is protruded in a diametrically smaller column shape than the diametrically larger portion 128 from the end face of the diametrically larger portion 128. The head portion 130 is joined to the leading end portion 129a of the neck portion 129. The head portion 130 is made larger in the external diameter than the neck portion 129. The head portion 130 is provided with diverging and converging portions 130b and 130a. The diverging portion 130b is arranged on the root side of the head portion 130 and diverges toward the leading end side. The converging portion 130a is arranged on the leading end side and converges toward the leading end side.

Figure 31:
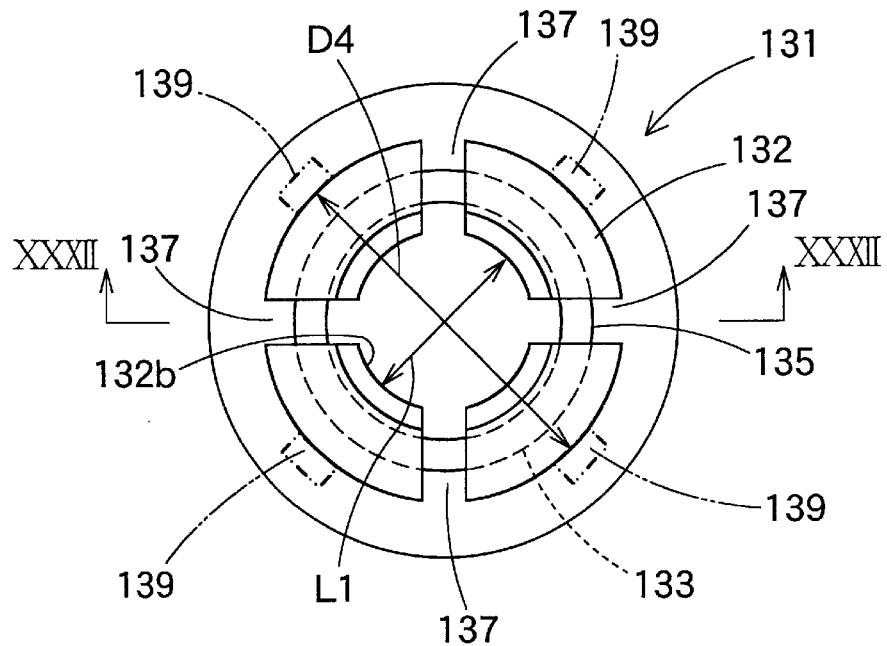
FIG. 31 is a top plan view of a cap of a clip portion used in the second embodiment.
Figure 32:
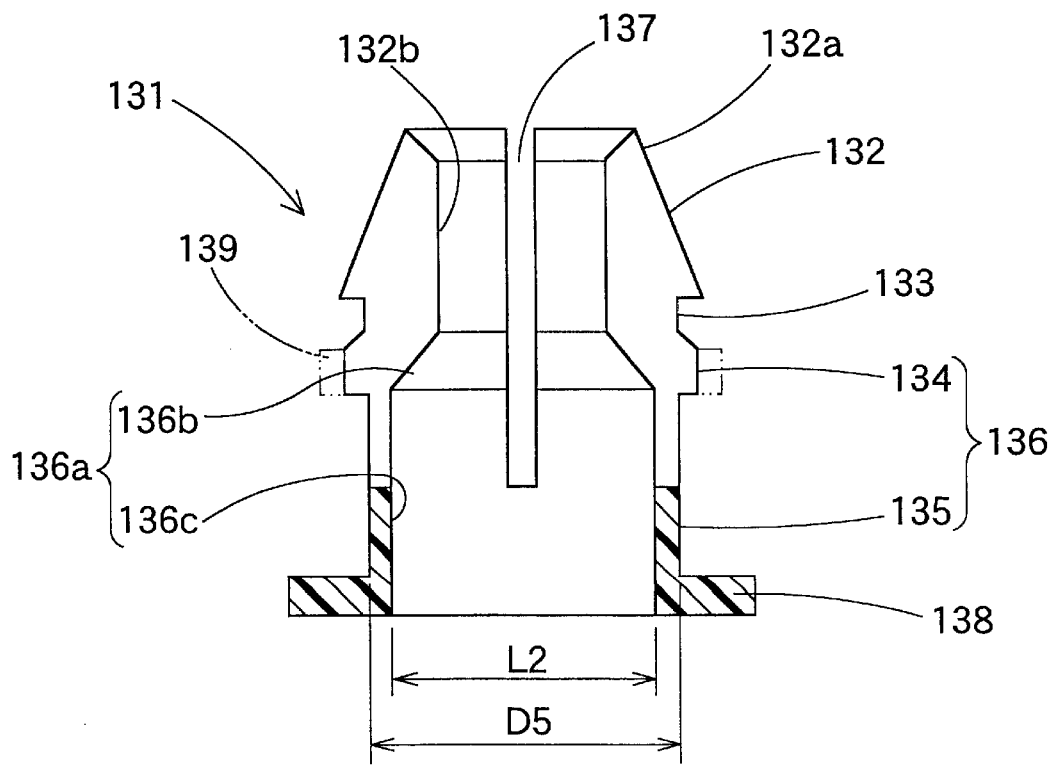
FIG. 32 is a section taken along line XXXII—XXXII of FIG. 31, and shows the cap used in the second embodiment.

The cap 131 can be made of an elastically deformable synthetic resin such as polyamide (or 66 nylon) or thermoplastic olefinic elastomers, or rubber. The cap 131 is also similar to the cap 71 of the first embodiment and is retained by mounting the cap 131 around the core member 126, as shown in FIGS. 28, 31 and 32. Specifically, the cap 131 is formed into a generally cylindrical shape so as to cover the core member 126 from the root portion 129b of the neck portion 129 to the root portion (or the diverging portion 130b) of the head portion 130. When the cap 131 is mounted around the core member 126, an annular flange portion 138 at the end portion on the root portion side abuts against the boss portion 121c of the garnish body 121.

The cap 131 is provided, like the cap 71 of the first embodiment, with first and second grooves 133 and 135 which are formed in the entire circumference. These grooves 133 and 135 are arranged in the outer circumferences of the leading end portion 129a and the root portion 129b of the neck portion 129, respectively, when the cap 131 is mounted around the core member 126. The first and second grooves 133 and 135 can receive an inner circumferential portion 107a of the retaining hole 107 which is formed in the inner panel 105 of the body 101. At the leading end side of the first groove 133, there is provided a fixedly retained portion 132. This fixedly retained portion 132 can be retained on the circumferential edge of the retaining hole 107 by inserting the fixedly retained portion 132 into the retaining hole 107. The fixedly retained portion 132 has a converging leading end portion 132a. This leading end portion 132a is generally flush with the converging portion 130a on the leading end portion side of the head portion 130 when the cap 131 is mounted around the core member 126. Between the first and second grooves 133 and 135, there is arranged a cylindrical portion 134. This cylindrical portion 134 has a constant external diameter.

An inner circumference 136a of root portion 136 of the cap 131 is made diametrically larger than an inner circumference 132b of the fixedly retained portion 132. The cylindrical portion 134 and the second grooves 135 are arranged at the root portion 136. The root portion inner circumference 136a is provided with a diverging portion 136b and a straight portion 136c. The diverging portion 136b diverges from the inner side face 132b of the fixedly retained portion 132. The straight portion 136c is given a constant internal diameter from the diverging portion 136b.

Figure 34A:
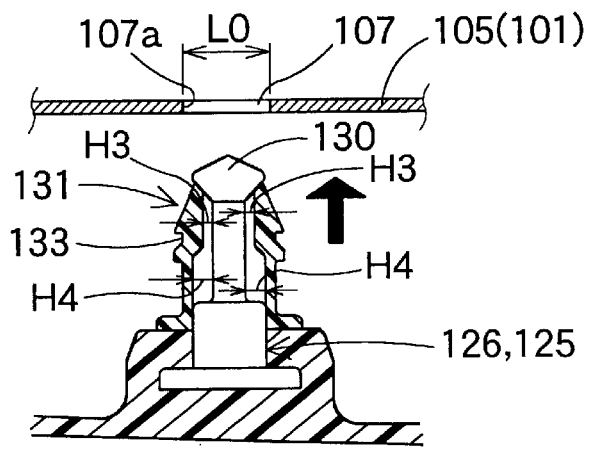
FIGS. 34A to 34E are enlarged sections for explaining the usage of the clip portion of the garnish of the second embodiment.
Figure 34B:
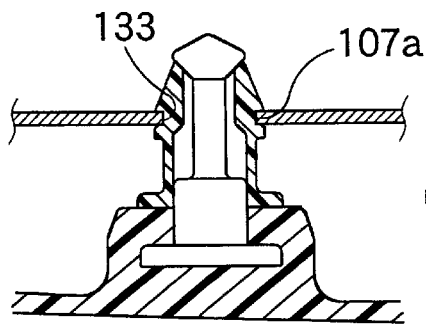
Figure 34D:
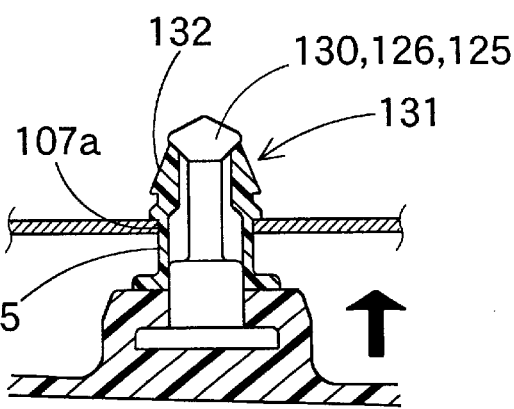

The internal diameter L1 of the inner circumference 132b of the fixedly retained portion 132 is set so that the fixedly retained portion 132 can be pushed in the inserting direction into the retaining hole 107. Specifically, the predetermined smaller clearance H3 (as shown in FIG. 34A) is left between the inner circumference 132b and the neck portion 129 when the cap 131 is mounted around the core member 126. This smaller clearance H3 absorbs the absorption of the fixedly retained portion 132 when the fixedly retained portion 132 is pushed in the inserting direction into the retaining hole 107. On the other hand, the internal diameter L1 is so set that the head portion 136 of the core member 126 may not be extracted when the fixedly retained portion 132 is retained (i.e., in the first retaining state, as shown in FIGS. 28 and 34B) on the circumferential edge of the retaining hole 107 in the back side of the inner panel 105. The internal diameter L1 also is set so that the head portion 130 of the core member 126 can be extended when the inner circumferential portion 107a of the retaining hole 107 is arranged (i.e., in the second retaining state, as shown in FIG. 34D) at the second groove 135.

Figure 34C:
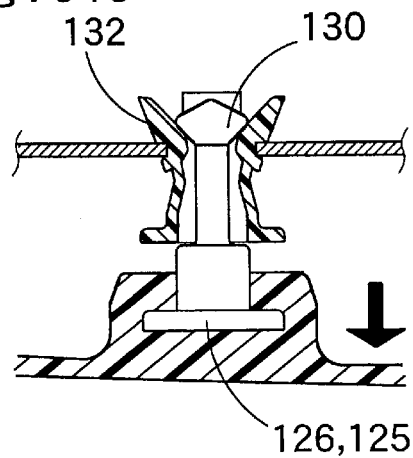
Figure 34E:
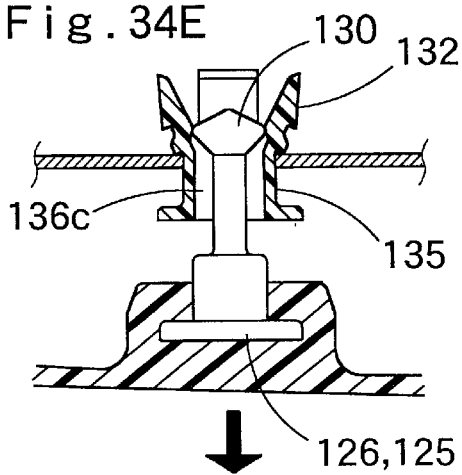

The inner circumference 136a of the root portion 136 is set so that the cap 131 can be pushed in the inserting direction until the inner circumferential portion 107a of the retaining hole 107 is arranged at the position of the second groove 135. When the core member 126 is mounted in the cap 131, more specifically, the predetermined larger clearance H4 exists (as shown in FIG. 34A) between the inner circumference 136a and the neck portion 129. This larger clearance H4 is made larger than the smaller clearance H3. The larger clearance H4 absorbs the constricting warpage of the root portion 136 so that the cap 131 can be pushed in the inserting direction until the inner circumferential portion 107a of the retaining hole 107 is arranged at the position of the second groove 135. Moreover, the straight portion 136c has an internal diameter L2 set so that the head portion 130 of the core member 126 can be pulled out from the cap 131 when the inner circumferential portion 107a of the retaining hole 107 is arranged at the position of the second groove 135. The external diameter D4 of the cylindrical portion 134 is set to such a size that the cap 131 can be retained on the circumferential edge of the retaining hole 107 when the inner circumferential portion 107a of the retaining hole 107 is arranged in the second groove 135 (i.e., in the second retaining state, as shown in FIGS. 34D and 34E).

In the second embodiment, the internal diameter L2 of the straight portion 136c in the inner circumference 136a of the root portion 136 is equal to the external diameter D1 of the diametrically larger portion 128 of the core member 126.

In the cap 131 of the second embodiment, there are formed four slits 137 extending in the axial direction. These slits 137 are formed from the leading end of the fixedly retained portion 132 to the vicinity of the intermediate portion of the second groove 135. The slits 137 are provided for mounting the cap 131 easily around the core member 126. With the slits 137, the fixedly retained portion 132 and the cylindrical portion 134 can easily bulge or constrict.

In accordance with an example of the core member 126 of the second embodiment: the diametrically larger portion 128 has the external diameter D1 of 11 mm; the neck portion 129 has the external diameter D2 of 5 mm; and the head portion 130 has the maximum external diameter D3 of 11 mm. In the cap 131: the fixedly retained portion 132 or the cylindrical portion 136 has the maximum external diameter D4 of 16.5 mm; the arranged portions of the first and second grooves 133 and 135 have external diameters D5 of 14 mm; the inner circumference 132b of the fixedly retained portion 132 has the internal diameter L1 of 8 mm; and the straight portion 136c of the root portion inner circumference 136a has the internal diameter L2 of 11 mm. The smaller clearances H3 and H3 are individually set to 1.5 mm, and the larger clearances H4 and H4 are individually set to 3 mm. The retaining hole 107 of the inner panel 105 has an internal diameter L0 of 14 mm.

Steps for mounting the pillar garnish 120A of the second embodiment on the inner panel 105 on the side of the body 101 will now be described. The cap 131 is mounted in advance (FIG. 34A) around the core member 126 by bringing the flange portion 138 into abutment against the boss portion 121c. The cap 131 is elastically deformable so that the cap 131 can be easily mounted around the core member 126 by fitting the cap 131 from the side of the flange portion 138.

In this state, moreover, the retained leg 124 is inserted into the retaining hole 106 of the inner panel 105, and retained on the circumferential edge of the retaining hole 106. As shown in FIGS. 34A and 34B, the fixedly retained portion 132 of the cap 131 is on the back side of the circumferential edge of the retaining hole 107. The smaller clearances H3 absorb the warpage of the fixedly retained portion 132. As a result, the fixedly retained portion 132 can be inserted into the retaining hole 107 so far as to arrange the portion 107a of the inner circumference of the retaining hole 107 in the first groove 133. When the retaining hole inner circumferential portion 107a is arranged in the first groove 133, moreover, the fixedly retained portion 132 of the cap 131 is retained on the circumferential edge of the retaining hole 107 on the back side of the inner panel 105. In short, there is established the first retaining state of the clip portion 125. In this first retaining state, the internal diameter L1 of the inner circumference 132b of the fixedly retained portion 132 is so set that the head portion 130 of the core member 126 cannot be extracted. Thus, the fixedly retained portion 132 of the cap 131 containing the core member 126 is retained on the circumferential edge of the retaining hole 107 so that the cap 131 cannot be extracted. As a result, the pillar garnish 120A is firmly fixed on the inner panel 105 on the side of the body 101.

If the inflator 112 is activated after mounting of the head-protecting airbag device M2 on the vehicle, the airbag 108 is inflated to expand. Then, in the front pillar portion PF, the door portion 122 of the front pillar garnish 120A is pushed and opened by the airbag 108, as indicated by double-dotted lines in FIGS. 26 to 28 and FIG. 30. As a result, the airbag 108 protrudes to cover the opening W.

Figure 30:
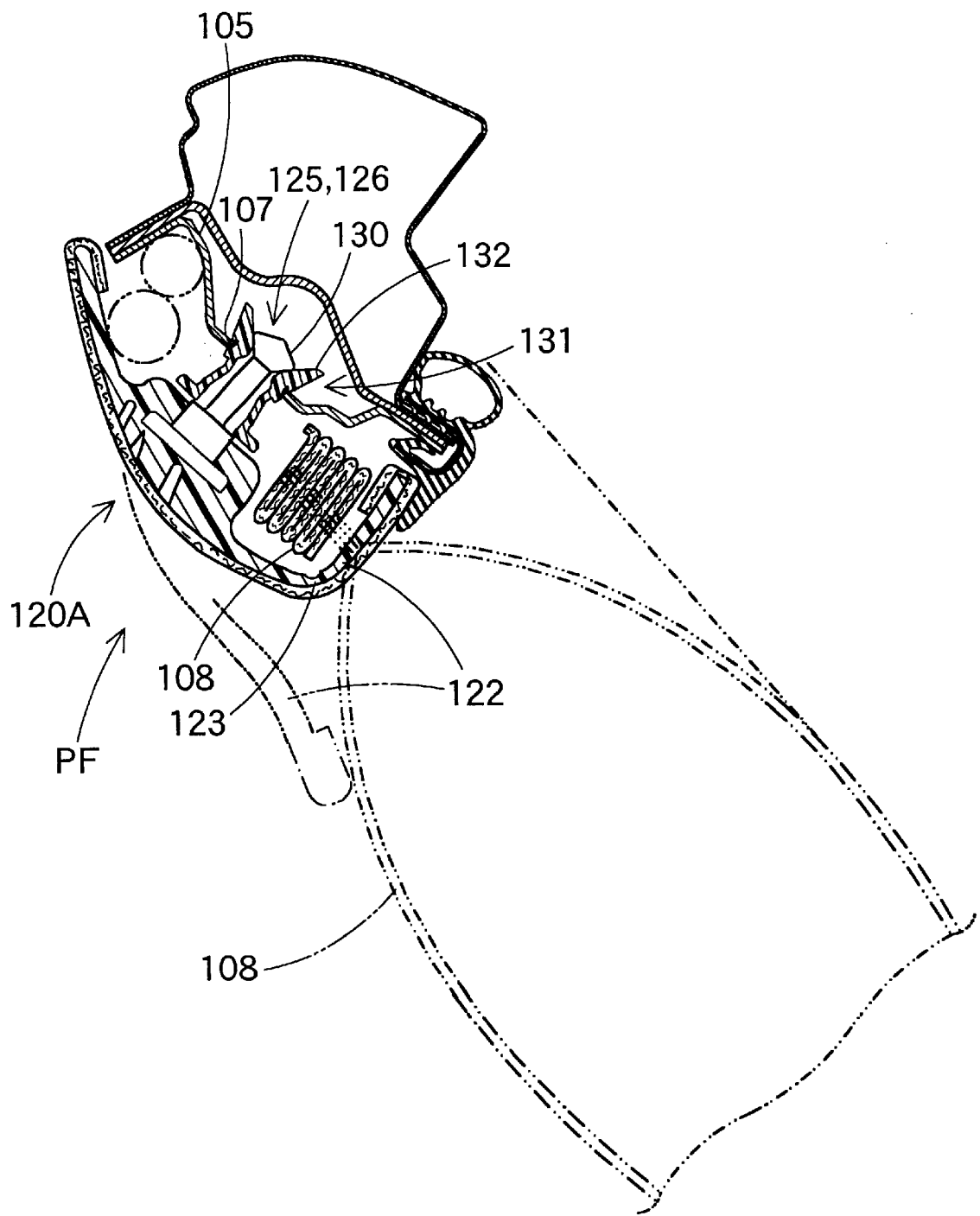
FIG. 30 is a schematic section showing the front pillar garnish of the second embodiment when the airbag is inflated to expand.

On the upper portion side of the pillar garnish 120A of the embodiment, the area in which the door portion 122 opens is widened as the airbag 108 inflates and expands. Specifically, the upper portion side of the pillar garnish 120A is pushed by the airbag 108 so as to move into the vehicle interior compartment. During airbag development, the diverging portion 130b of the core member 126 enlarges the diameter of the leading end portion 132a of the fixedly retained portion 132, as shown in FIGS. 30 and 34C. The head portion 130 cannot come out of the fixedly retained portion 132. Thus, the garnish body 121 can move into the vehicle as the leading end portion 132a of the fixedly retained portion 132 elastically deforms. As a result, the area for the door portion 122 to open can be widened.

For maintenance after mounting of the head-protecting airbag device M2 on the vehicle is completed, the front pillar garnish 120A is demounted from the inner panel 105 in the following manner. First, the clip portion 125 is pushed in the inserting direction so far as to arrange the inner circumferential portion 107a of the retaining hole 107 in the second groove 135 of the cap 131, as shown in FIG. 34D, so that the clip portion 125 is in the second retaining state. At this time, the larger clearances H4 between the inner circumference 136a on the side of the root portion 136 of the cap 131 and the neck portion 129 of the core member 126 are narrowed by warping of the cap 131. Thus, the retaining hole inner circumferential portion 107a can be arranged at the position of the second groove 135.

In the second retaining state, the root portion 136 of the cap 131 and the inner circumferences 136a and 132b of the fixedly retained portion 132 are set so that the head portion 130 of the core member 126 can be extracted. As shown in FIG. 34E, the core member 126 of the clip portion 125 can be easily extracted together with the garnish body 121 from the cap 131. As a result, the garnish body 121 can be demounted from the inner panel 105 on the side of the body 101. After this, the cap 131 is easily pulled out from the retaining hole 107, because the cap 131 is elastically deformable. The cap 131 can then be mounted around the core member 126, which has been demounted beforehand from the inner panel 105.

Here, the retained leg 124 has a low retaining force. If the garnish body 121 is forcibly pulled into the vehicle, therefore, the retained leg 124 can be easily pulled out from the retaining hole 106.

Thus, the front pillar garnish 120A of the second embodiment can be fixed in an easily demountable manner firmly on the inner panel 105 on the side of the body 101 without using any mounting bolt.

The clip portion 125 may be constructed to prevent unintentional movement from the first retaining state to the second retaining state, as indicated by double-dotted lines in FIGS. 31 and 32. To accomplish this object, projections 139 are formed on the edge of the first groove 133 in the cap 131, at the cylindrical portion 134. These projections 139 have heights and extend around the cylindrical portion 134 by a range suitable for easing their workability at the time of moving to the second retaining state.

Figure 40:
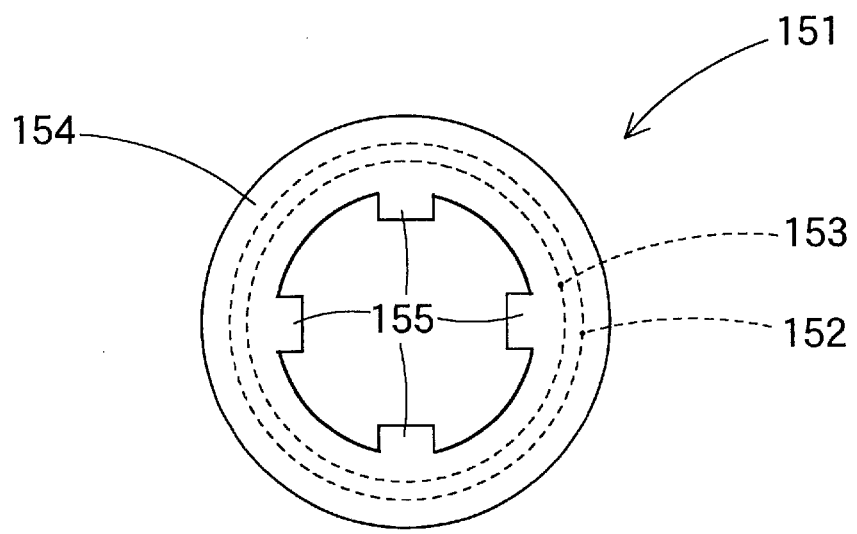
FIG. 40 is a bottom view of the cap shown in FIG. 39.
Figure 41:
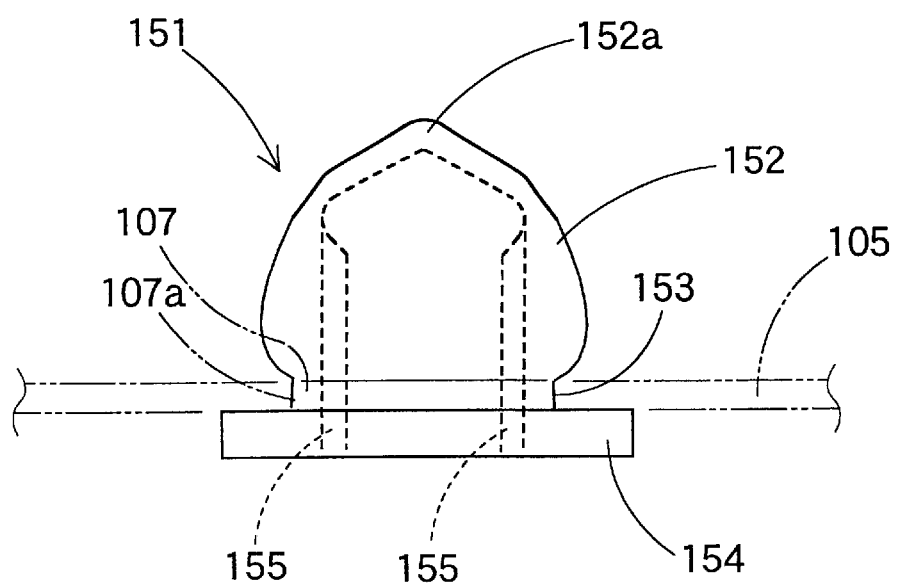
FIG. 41 is a front elevation of the cap shown in FIG. 39.

When the garnish 120A of the second embodiment is to be used as a normal-type garnish that does not cover the airbag 108, the cap 131 is exchanged for the cap 141, as shown in FIGS. 35 to 38. Alternatively, the cap 131 can be exchanged for cap 151, as shown in FIGS. 39 to 41.

The cap 141 is formed, like the cap 131, into a generally cylindrical shape and is made of an elastically deformable synthetic resin such as polyamide (or 66 nylon) or thermoplastic elastomers of olefins, or rubber. The cap 141 covers from the root portion 129b of the neck portion 129 to the root portion (or the diverging portion 130b) of the head portion 130, as shown in FIGS. 35 to 38. The cap 141 is mounted and retained sideways around the core member 126 of the garnish body 121.

The cap 141 is provided with a fixedly retained portion 142 arranged so as to bulge at its leading end. This fixedly retained portion 142 covers the core member 126 from the root portion 130b of the head portion 130 to the leading end portion 129a of the neck portion 129. The fixedly retained portion 142 is inserted into the retaining hole 107 of the inner panel 105, and retained on the circumferential edge of the retaining hole 107 on the exterior side. The fixedly retained portion 142 is provided on the root portion side with a groove 143 capable of fitting the inner circumferential portion 107a of the retaining hole 107. The fixedly retained portion 142 has a converging leading end portion 142a. This leading end portion 142a is generally flush with the converging portion 130a at the leading end portion of the head portion 130 when the cap 141 is mounted around the core member 126. Moreover, the fixedly retained portion 142 has an external diameter set to such a size that it can be easily extracted from the retaining hole 107 when it is forcibly pulled.

Moreover, the groove 143 is provided on the root portion side with a first flange portion 144. This first flange portion 144 comes into abutment against the interior side circumferential edge of the retaining hole 107 when the inner circumferential portion 107a is fitted in the groove 143. On the root portion side of the first flange portion 144, there is formed a cylindrical straight portion 145. This straight portion 145 is provided on the root portion side with a second flange portion 148. This second flange portion 148 comes into abutment against the boss portion 121c of the garnish body 121 when the cap 141 is mounted around the core member 126. In the cap 141, moreover, there is formed a slit 147 which extends throughout in the axial direction. This slit 147 is provided for mounting the cap 141 sideways around the core member 126.

The cap 151 is formed into a bottomed cylindrical shape, and can be made of an elastically deformable synthetic resin such as polyamide (or 66 nylon) or thermoplastic elastomers of olefins, or rubber. The cap 151 is mounted and retained from its leading end side around the core member 126, as shown in FIGS. 39 to 41. The cap 151 covers the core member 126 from the vicinity of the root portion 129b of the neck portion 129 to the converging portion 130a of the head portion 130. The cap 151 is essentially a truncated embodiment of cap 144, inasmuch as the cap 151 substantially possesses the shape of the leading end side of the first flange portion 144 of the cap 141.

The cap 151 is provided with a bottomed fixedly retained portion 152 which is arranged in a bulging shape at the leading end of the cap 151. This fixedly retained portion 152 covers the core member 126 from the vicinity of the leading end portion 129a of the neck portion 129 to the leading end portion 130a of the head portion 130. The fixedly retained portion 152 is retained in the exterior side circumferential edge of the retaining hole 107. In the root portion side of the fixedly retained portion 152, there is formed a groove 153 capable of receiving in the inner circumferential portion 107a of the retaining hole 107. The fixedly retained portion 152 has a converting leading end portion 152a. Moreover, the fixedly retained portion 152 has an external diameter set to such a size that the fixedly retained portion 152 can be easily extracted from the retaining hole 107 if the cap 151 is forcibly pulled out. On the root portion side of the groove 153, there is formed a flange portion 154 which abuts against the interior side circumferential edge of the retaining hole 107. The flange portion 154 comes into abutment against the interior side circumferential edge of the retaining hole 107 when the inner circumferential portion 107a is fitted in the groove 153.

The cap 151 is provided on its inner circumferential side with four ribs 155. Each rib 155 abuts against the diverging portion 130b when the cap 151 is mounted around the core member 126. The rib 155 is provided for preventing the cap 151 from easily coming out from the head portion 130 when the cap 151 is mounted around the core member 126.

The cap 141 is mounted sideways over the core member 126 by widening the slit 147. The cap 151 is mounted around the core member 126 so as to fit the head portion 130. As a result, the caps 141 and 151 are individually mounted on the garnish body 121. In the pillar garnishes 120N1 and 120N2 having the caps 141 and 151 mounted thereon, like the pillar garnish 120A, the retained legs 124 are inserted into the retaining holes 106 of the inner panel 105, and are retained on the circumferential edges of the retaining holes 106. The fixedly retained portions 142 and 152 of the caps 141 and 151 are inserted into the circumferential edges of the retaining holes 107 so as to be disposed at the back side of the inner panel 105. Then, the normal type pillar garnishes 120N1 and 120N2 can be mounted on the front pillar body 102.

Figure 35:
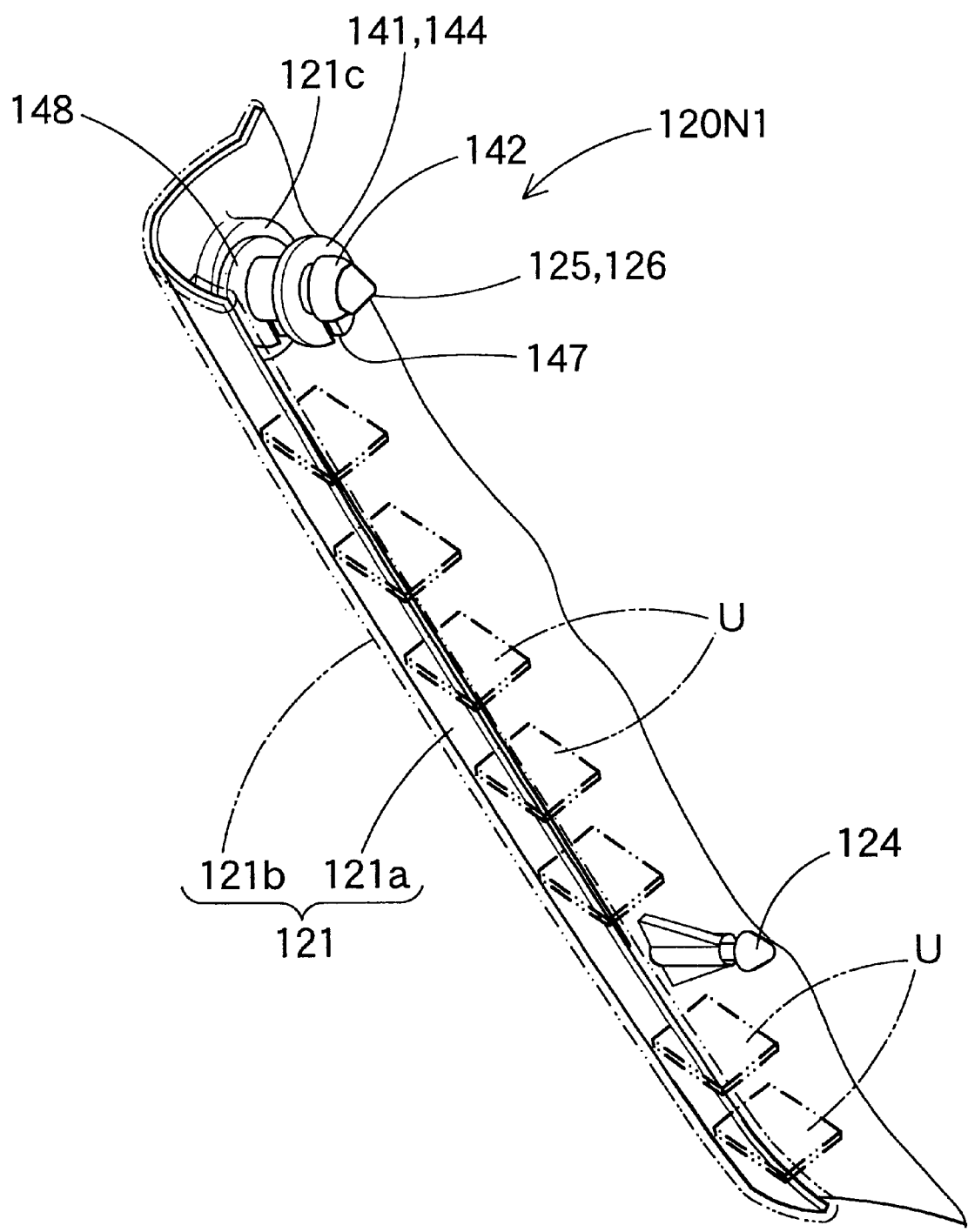
FIG. 35 is a schematic perspective view taken from the outside of the vehicle, showing an airbag cover of the second embodiment when the airbag cover is used as a normal-type garnish.

A member indicated by letter U in FIGS. 35, 36, and 39 is an impact energy absorber. This impact energy absorber U is separately mounted on the inner panel 105 and the garnish body 121. The impact energy absorber U is made of a sheet metal or a fragile hard synthetic resin. The impact energy absorber U plastically deforms when the passenger interferes with the garnishes 120N1 and 120N2. As a result, the impact energy absorber U absorbs the impact.

The pillar garnishes 120N1 and 120N2 are demounted by forcibly pulling to the interior side. Then, the core members 126 mounting the retained legs 124 and the caps 141 and 151 individually come out from the retaining holes 106 and 107. As a result, the garnishes 120N1 and 120N2 can be demounted from the front pillar body 102.

By interchanging the caps 131, 141, and 151, as has been described hereinbefore, the pillar garnish 120 of the second embodiment can be used commonly for the two types, the airbag cover type and the normal type.

Figure 42:
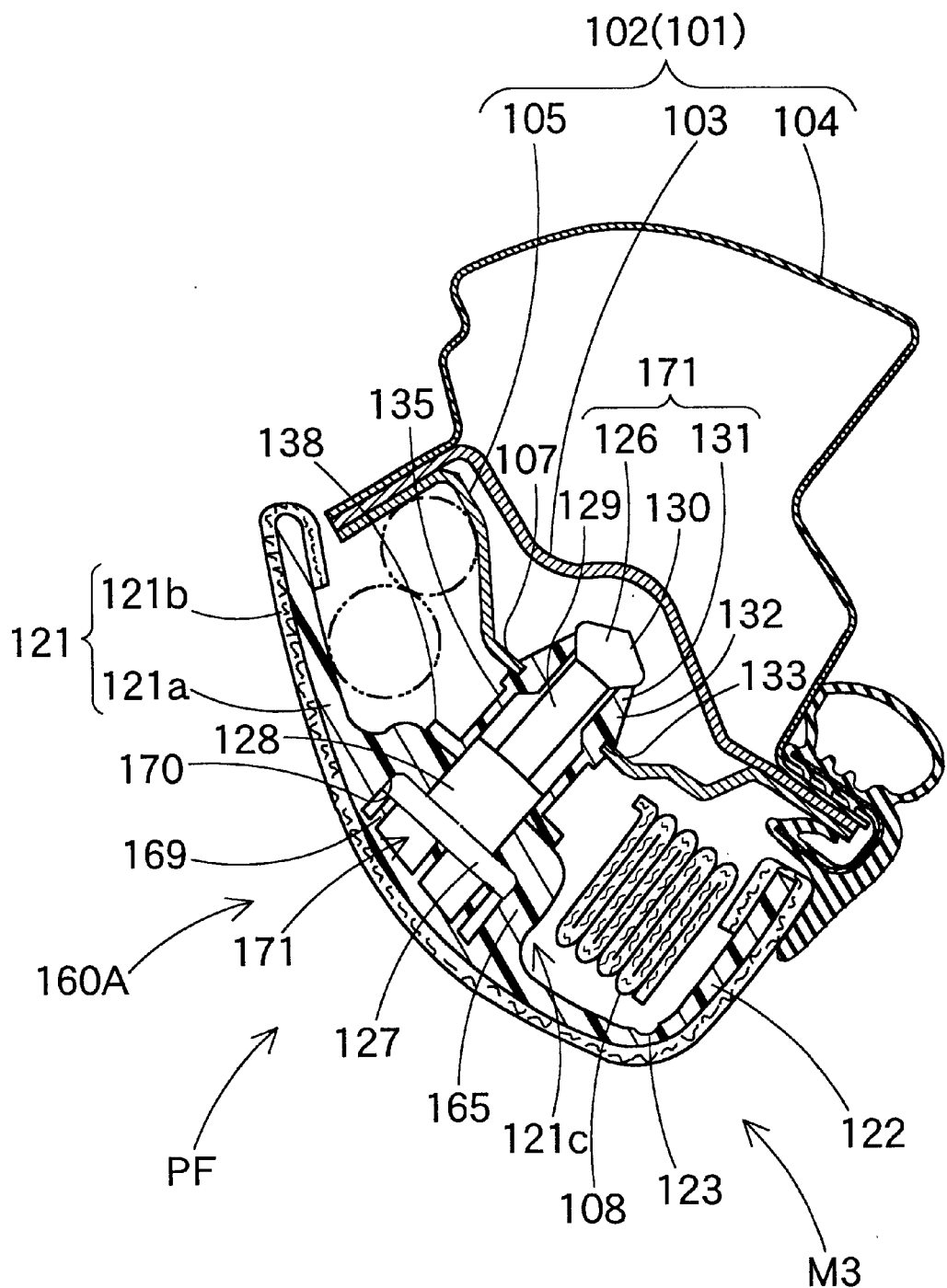
FIG. 42 is an enlarged section showing the vicinity of a clip portion of an airbag cover (or a front pillar garnish) of a third embodiment.
Figure 43:
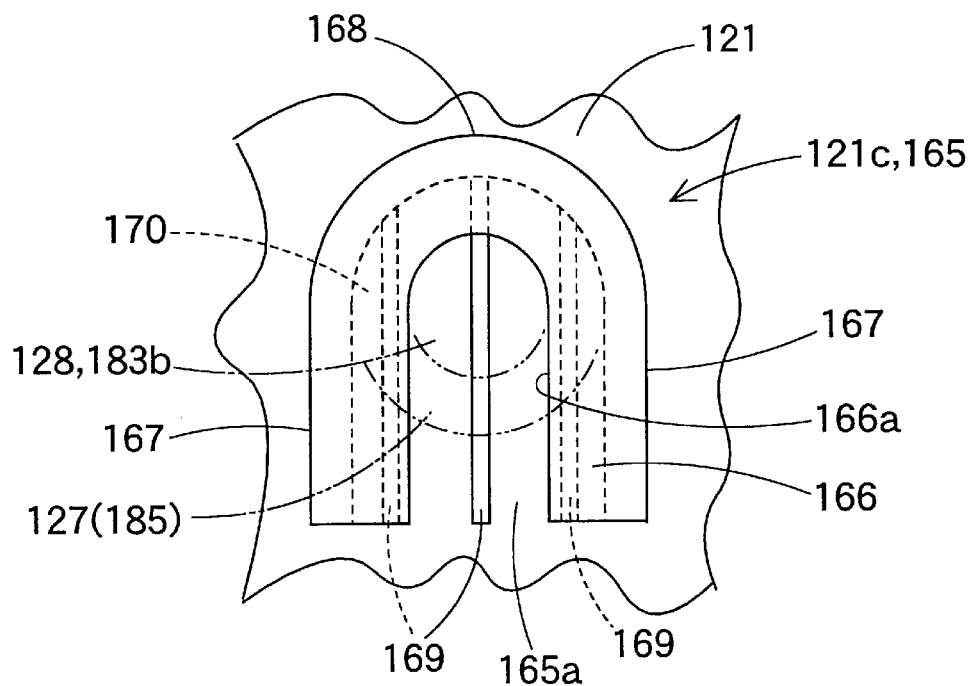
FIG. 43 is a top plan view showing an interchangeable base portion of the garnish of the third embodiment.
Figure 44:
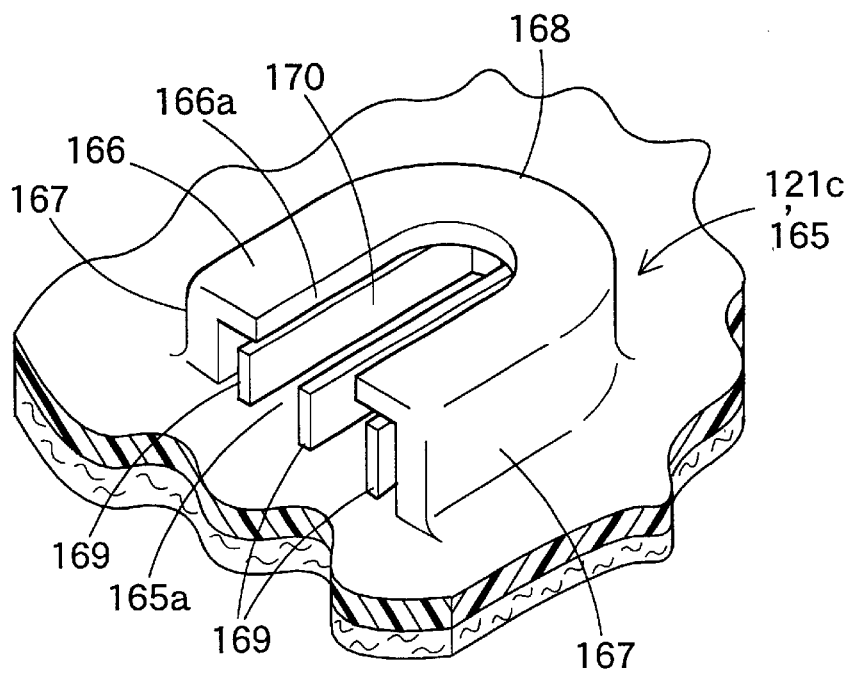
FIG. 44 is a perspective view showing the interchangeable base portion of the garnish of the third embodiment.
Figure 45:
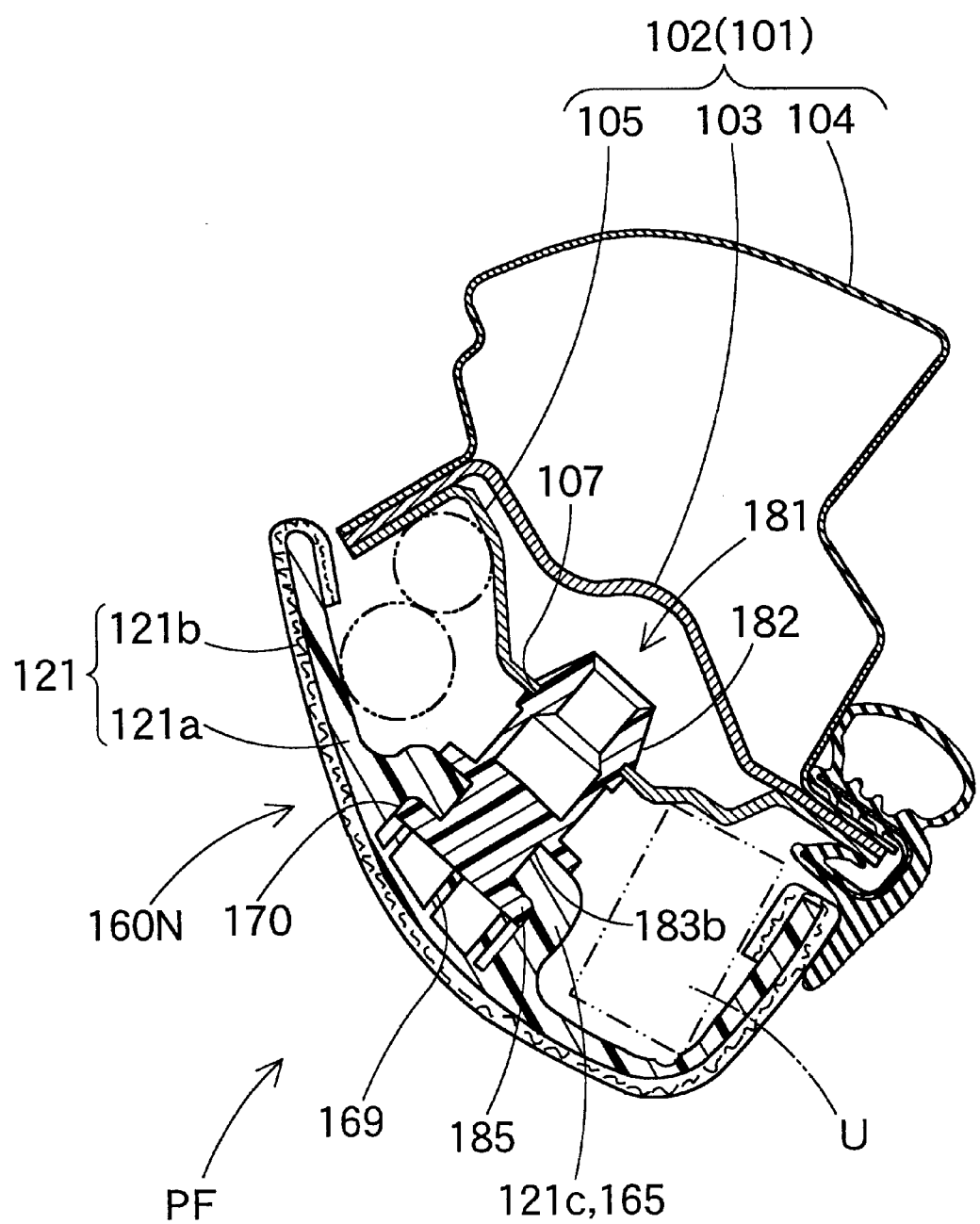
FIG. 45 is an enlarged section showing the vicinity of the clip portion for a normal-type garnish.

A front pillar garnish 160A of a head-protecting airbag device M3 according to a third embodiment is mounted, like the garnish 120 of the second embodiment, on the front pillar portion PF, as shown in FIGS. 42 and 45. This garnish body 121 of the third embodiment is provided with an interchanging base portion 165 for mounting clip portions 171 and 181 interchangeably. The remaining constructions are similar to those of the garnish 120 of the second embodiment, so that their description will be omitted by designating the same portions by the same reference numerals.

In this front pillar garnish 160A, the interchanging base portion 165 is formed by forming a retaining recess 170 in the boss portion 121c, which is formed in the base portion 121a of the garnish body 121. The boss portion 121c is composed of a ceiling wall portion 166, side wall portions 167 and 167 and a back wall portion 168. The side wall portions 167 are formed on the ceiling wall portion 166 on the two sides of the garnish widthwise direction. The retaining recess 170 is defined by the ceiling wall portion 166, the side wall portions 167 and 167 and the back wall portion 168. The retaining recess 170 is made so as to communicate with an opening 165a on the front side and a thin opening 166a. This thin opening 166a leads from the opening 165a, and is opened in the ceiling wall portion 166. The thin opening 166a is extended in the garnish longitudinal direction. On the bottom face or the interior side face of the retaining recess 170, moreover, there are formed three ribs 169. These ribs 169 are individually extended in the longitudinal direction of the garnish 160. The retaining recess 170 is defined by the leading ends of the individual ribs 169, the ceiling wall portion 166 and the side wall portions 167 and 167. The retaining recess 170 is so sized as to fit the flange portions 127 and 185 of the clip portions 171 and 181 from the front opening 165a. The opening width of the thin opening 166a is sized so that the root portion side portions 128 and 183b of the clip portions 171 and 181 can be inserted into the thin opening 166a when the flange portions 127 and 185 are fitted in the retaining recess 170.

The clip portion 171 is provided for the airbag-type cover, and uses the core member 126 and the cap 131 of the second embodiment. Therefore, the portions similar to those of the second embodiment will not be described hereinbelow, but are designated by similar reference numerals.

Figure 46:
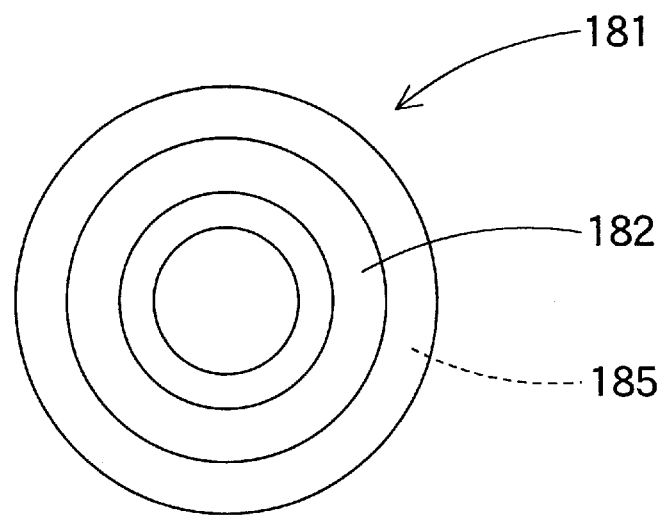
FIG. 46 is a top plan view showing the clip portion of the normal-type garnish of the third embodiment.
Figure 47:
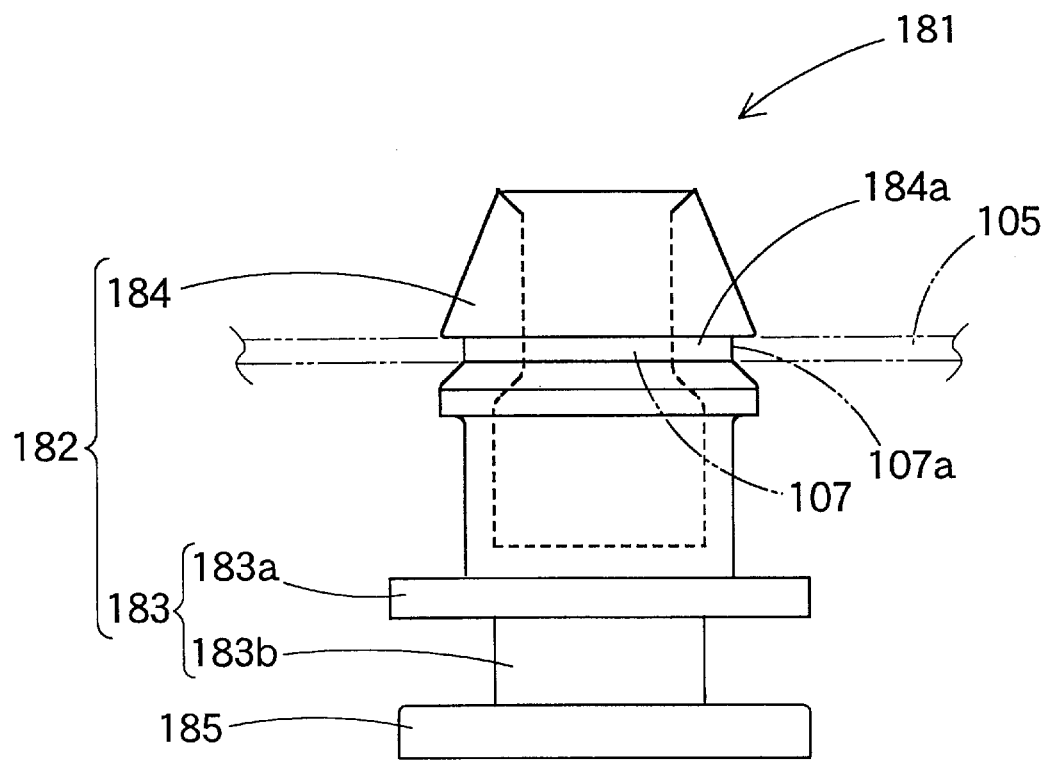
FIG. 47 is a front elevation showing the clip portion of the normal-type garnish of the third embodiment.

The cap 181 is for the normal-type cover. The cap 181 is made of an elastically deformable synthetic resin such as polyamide (or 166 nylon), polyacetal or thermoplastic olefinic elastomers, or rubber. The cap 181 is provided with a retained stem portion 182 and the flange portion 185. The retained stem portion 182 is demountably retained by the inner panel 105 when the retained stem portion 182 is inserted into the retaining hole 107 of the inner panel 105. The flange portion 185 is arranged on the root portion side of the cap 181. The retained stem portion 182 is provided with a stem body 183 and a retained leg portion 184, as shown in FIGS. 45 to 47. The retained leg portion 184 forms the leading end side portion of the stem body 183. Moreover, the stem body 183 is composed of a second flange portion 183a and the neck portion 183b. The second flange portion 183a abuts against the ceiling wall portion 166 of the boss portion 121c when the flange portion 185 is fitted in the retaining recess 170. The neck portion 183b is arranged in the thin opening 166a. The retained leg portion 184 is retained on the circumferential edge of the retaining hole 107. The retained leg portion 184 has a cylindrical shape converging to the leading end. At an axially intermediate portion of the retained leg portion 184, there is formed a circumferentially recessed groove 184a. The inner circumferential portion 107a of the retaining hole 107 is fitted in the groove 184a when the retained leg portion 184 is retained on the circumferential edge of the retaining hole 107. The groove 184a is made to be sufficiently shallow that the retained leg portion 184 may be demounted if pulled forcibly.

A front pillar garnish 160A of the airbag-type cover is assembled in the following manner. First, the cap 131 is retained on the core member 126 to form the clip portion 171. Then, this clip portion 171 is mounted on the interchangeable base portion 165. With the diametrically larger portion 128 protruding from the thin opening 166a, the flange portion 127 of the clip portion 171 is fitted in the front opening 165a in the retaining recess 170. As a result, the front pillar garnish 160A of the airbag-type cover is assembled. This garnish 160A can provide actions and effects similar to those of the pillar garnish 120A of the second embodiment.

For assembling a normal-type front pillar garnish 160N, the cap 181 may be mounted on the interchangeable base portion 165. Specifically, the flange portion 185 of the cap 181 is fitted, while protruding through the thin opening 166a, in the front opening 165a in the retaining recess 170. This garnish 160N can provide actions and effects similar to those of the pillar garnishes 120N1 and 120N2 of the second embodiment.

In these pillar garnishes 160A and 160N of the third embodiment, moreover, the clip portions 171 and 181 for the airbag-type cover and for the normal-type cover are mounted as a whole, so as to be interchangeable with the interchangeable base portion 165 of the garnish body 121. The interchangeable base portion 165 makes it easier to design, as a whole, the clip portions 171 and 181 as compared with the second embodiment, in which the caps 131, 141 and 151 are partially interchanged. As a result, the clip portions 171 and 181 can be designed to optimize the retaining force on the inner panel 105.

In the third embodiment, the interchangeable base portion 165 of the garnish body 121 is exemplified by the retaining recess provided 170 at the thick boss portion 121c. As a result, a molding sink, as might otherwise be caused by injection molding of the base portion 121a, is less likely to occur on the side of the base portion 121a. As a result, it is possible to improve the design of the interior side of the garnish body 121. These actions and effects are prominent, especially when the pillar garnish body 121 is constructed exclusively of the base portion 121a without the surface skin 121b. Even with this surface skin, the design may be deteriorated by a molding sink. However, deterioration of the design is avoided if the retaining recess 170, for "robbing" or "thieving" an excess of the molding material, is formed in the thick boss portion 121c, as in the illustrated embodiment. In the case of the third embodiment, the ribs 169 are provided on the bottom side of the retaining recess 170, thereby to enlarge the thieving portion. As a result, molding sink can be prevented more effectively.

The second and third embodiments have been described in regards to the front pillar garnishes 120 and 160, but the invention could also be applied to an airbag cover such as the rear pillar garnish or the center pillar garnish, etc.

Figure 48:
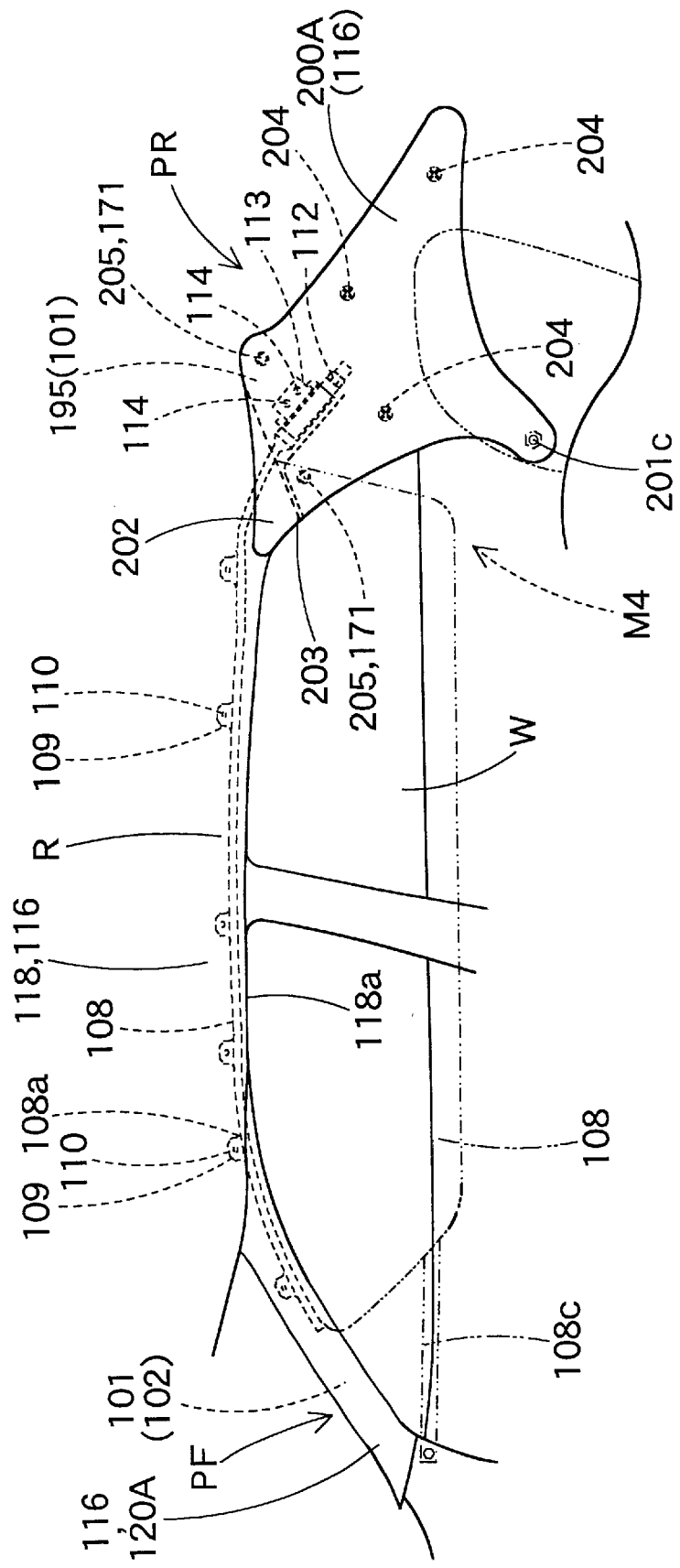
FIG. 48 is a front elevation taken from the inside of a vehicle, and shows of a head-protecting airbag device of a fourth embodiment.

A head-protecting airbag device M4 according to a fourth embodiment, as shown in FIG. 48, is provided with a rear pillar garnish 200A to be mounted as the airbag cover on the rear pillar garnish PR. This head-protecting airbag device M4 is different from the second embodiment in its construction in the vicinity of the rear pillar garnish 200A. The remaining constructions of the roof side rail portion R and the front pillar portion PF are similar to those of the second embodiment. Therefore, the description of these constructions will be omitted by designating the same portions by the same reference numerals.

Figure 53:
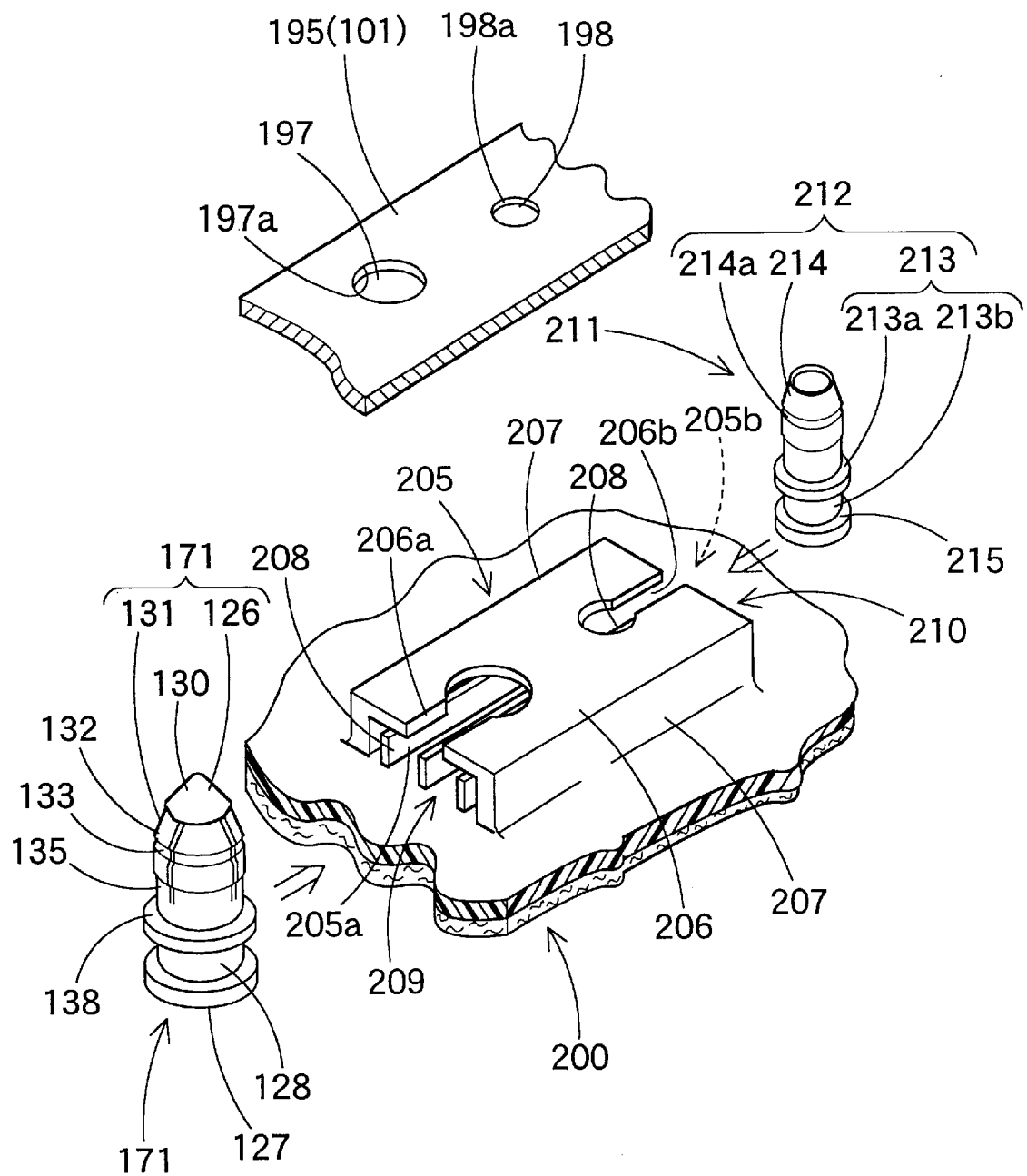
FIG. 53 is a perspective view showing the vicinity of an interchangeable base portion of the fourth embodiment.

As shown in FIG. 53, an inner panel 195 acting as the rear pillar body for mounting the rear pillar garnish 200 is provided with two kinds of retaining holes 197 and 198. These retaining holes 197 and 198 are arranged with different internal diameters at different positions. The clip portion 171 for the airbag-type cover is inserted into the retaining hole 197 and retained on the circumferential edge 197a of the retaining hole 197. A clip portion 211 for the normal type is inserted into the retaining hole 198, and retained on the circumferential edge 198a of the retaining hole 198. The retaining hole 197 has an internal diameter sufficiently large to easily enhance the retaining force. The retaining hole 198 has an internal diameter set to be so small as to lower the retaining force.

Moreover, an interchangeable base portion 205 of the garnish 200 is provided with retaining recesses 209 and 210, which are arranged at positions different from each other. In the retaining recess 209, there is mounted the clip portion 171 for the airbag cover type. In the retaining recess 210, there is mounted the clip portion 211 for the normal-type cover.

Figure 49:
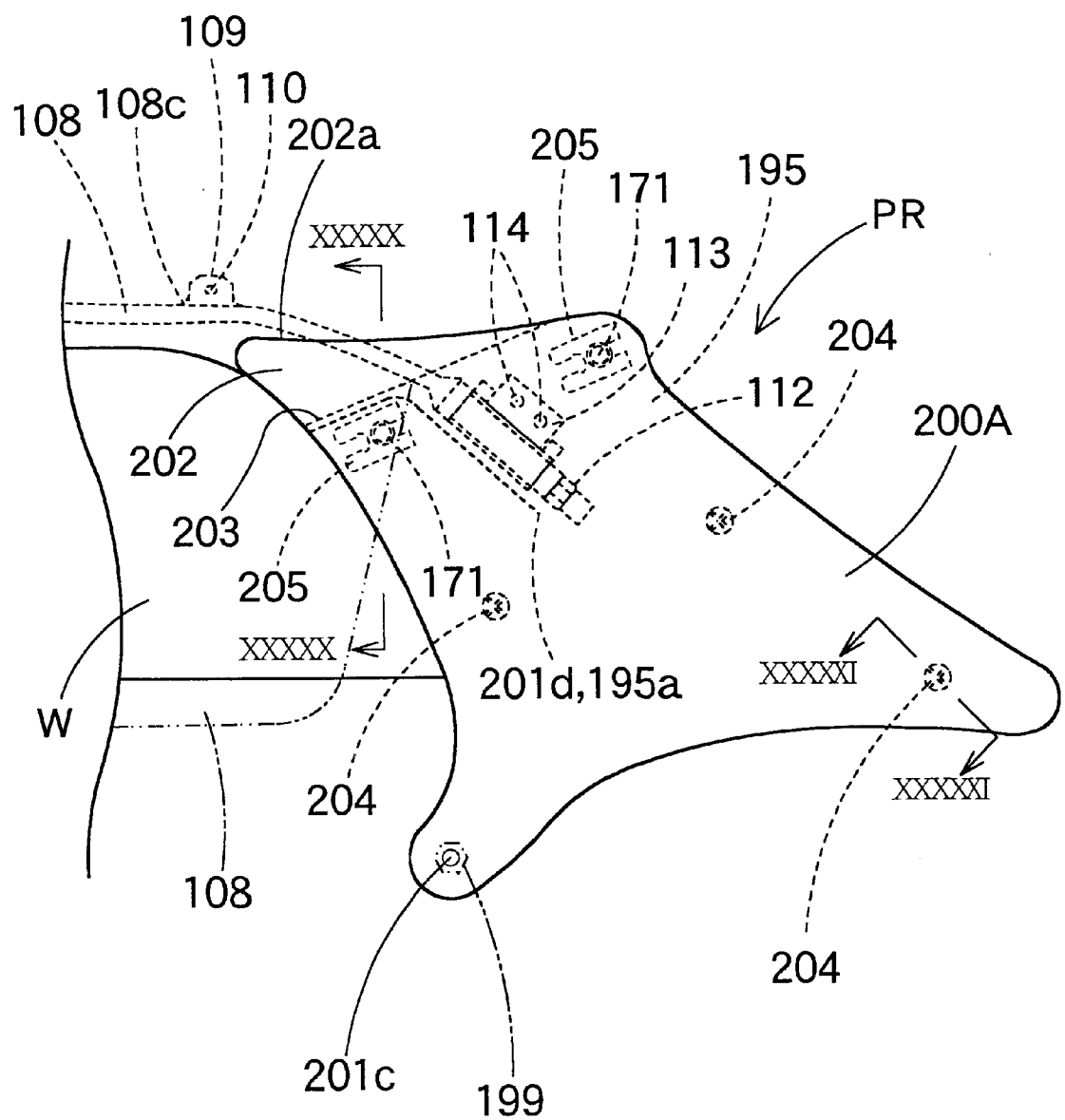
FIG. 49 is an enlarged front elevation showing an airbag cover (or a rear pillar garnish) of the fourth embodiment.
Figure 50:
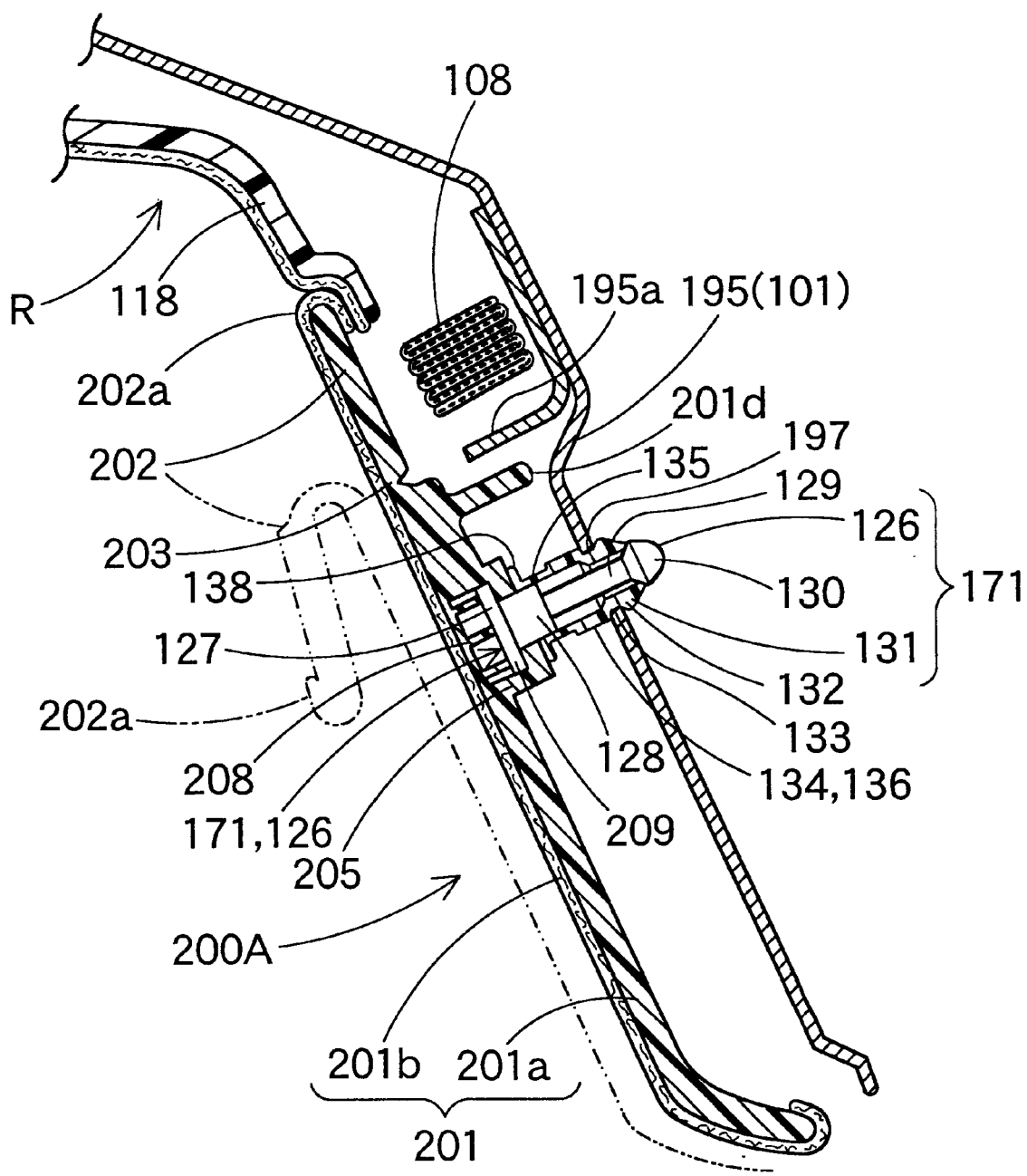
FIG. 50 is an enlarged section showing a portion taken along line L—L of FIG. 49.

Here will be described in detail a rear pillar garnish 200A for the airbag-type cover of the fourth embodiment. As shown in FIGS. 48 to 50, the garnish 200A is formed into a generally rectangular shape. This garnish 200A includes a garnish body 201, retained legs 204, the interchangeable base portions 205 and the clip portions 171. The garnish body 201 is formed to cover the whole area of the interior side of the rear pillar portion PR. The retained legs 204 are retained on an inner panel 195 as the rear pillar body. The clip portions 171 are mounted on the interchangeable base portions 205.

The garnish body 201 is composed of a base portion 201a and a surface skin 201b. The base portion 201a can be made of a synthetic resin such as thermoplastic elastomers of olefins. The surface skin 201b can be made of a synthetic resin such as soft vinyl chloride or thermoplastic elastomers of olefins, or a fabric, and is bonded to the surface of the base portion 201a. On the other hand, the garnish body 201 is provided on its front end front side with a triangular door portion 202. This door portion 202 is pushed and opened downward by the airbag 108 being inflated to expand. On the lower edge side of the door portion 202, there is formed a hinge portion 203 for allowing the door portion 202 to easily open. The hinge portion 203 is formed by thinning the base portion 201a.

In the front lower corner of the garnish body 201, a mounting hole 201c is formed for passing a bolt 199 therethrough. This bolt 199 fixes the garnish 200A on the inner panel 195.

In the garnish body 201, a regulating wall 201d is arranged below the hinge portion 203 on the exterior side. The regulating wall 201d protrudes to the outside of the vehicle. The front side of the regulating wall 201d extends along the hinge portion 203. The rear side of the regulating wall 201d is bent. The rear side of the regulating wall 201d is arranged on the front side of and along the inflator 112. In the inner panel 195, there is also arranged a regulating wall 195a. The leading end of the regulating wall 195a overlaps the leading end of the regulating wall 201d. These regulating walls 201d and 195a guide the pressure of the airbag 108 toward the door portion 202 when the airbag 108 expands.

Figure 51:
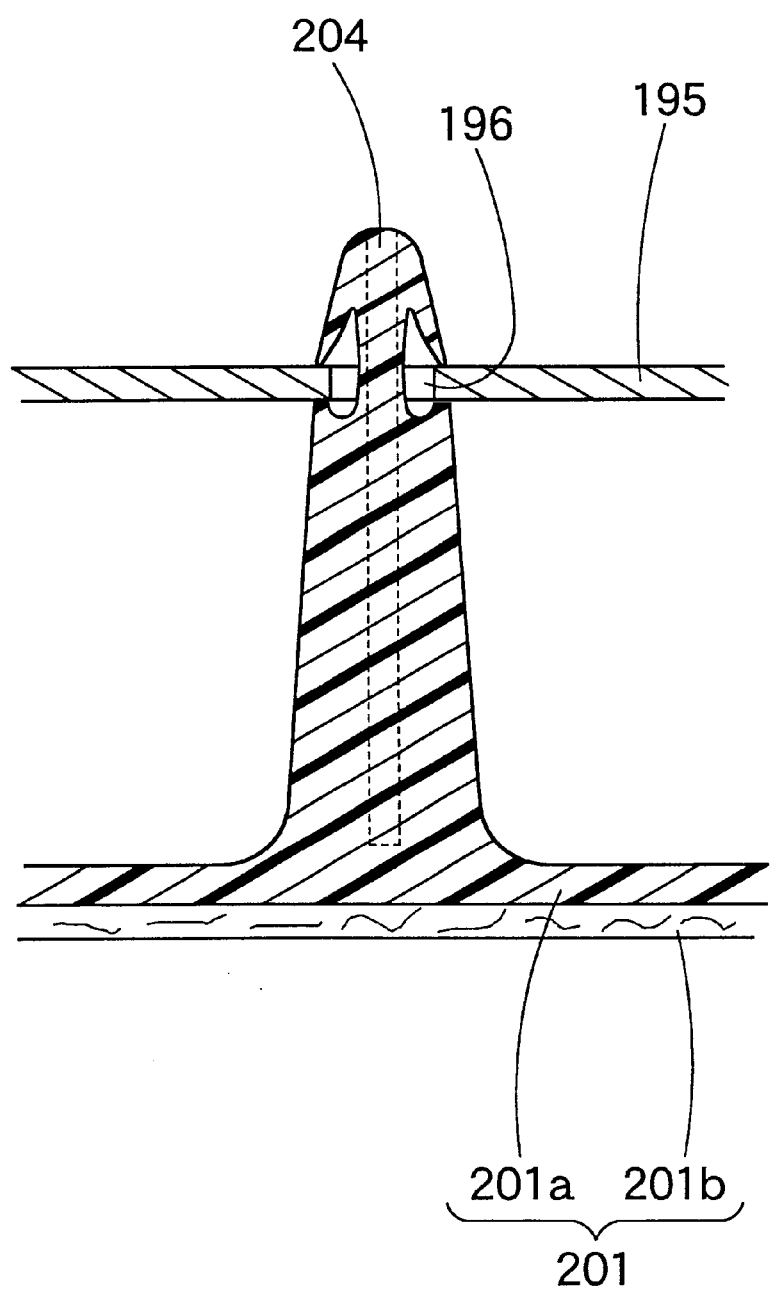
FIG. 51 is an enlarged section showing a portion taken along line LI—LI of FIG. 49.

The retained legs 204 are arranged at three positions at the lower portions on the back side of the garnish body 201, as shown in FIGS. 48, 49 and 51. These retained legs 204 are retained by the inner panel 195 by inserting the retained legs 204 into retaining holes 196 formed in the inner panel 195. The retaining forces of the retained legs 204 on the inner panel 195 are set so that the retained legs 204 can be extracted from the retaining holes 196 if forcibly pulled toward the interior side.

The interchangeable base portions 205 are formed into a box shape, as shown in FIGS. 49, 50 and 53, and are arranged on the exterior face of the garnish body 201 and at two positions below and near the hinge portion 203. On these interchangeable base portions 205, there can be individually mounted the two clip portions 171 and 211 for the airbag-type cover and for the normal-type cover. Specifically, the interchangeable base portions 205 are individually provided with the two retaining recesses 209 and 210. Each interchangeable base portion 205 is composed of the ceiling wall portion 106 and side wall portions 207. The side wall portions 207 are disposed on opposite sides of a ceiling wall portion 206 and are generally vertical. At one end of the interchangeable base portion 205, there is formed the retaining recess 209 for mounting the clip portion 171 for the airbag-type cover. At the other end of the interchangeable base portion 205, there is formed the retaining recess 210 for mounting the clip portion 211 for the normal-type cover.

The retaining recess 209 is defined, like the retaining recess 70 of the second embodiment, by the ceiling wall portion 206 and the side wall portions 207. The retaining recess 209 communicates with an inserting opening 205a and a sliding opening 206a. Into the inserting opening 205a, there can be inserted the flange portion 127 of the clip portion 171. The sliding opening 206a opens the opening 205a into the ceiling wall portion 206. The sliding opening 206a is arranged to extend longitudinally relative to the garnish 200.

The retaining recess 210 is defined by the ceiling wall portion 206 and the side wall portions 207. The retaining recess 210 communicates with an inserting opening 205b and a sliding opening 206b. Into the inserting opening 205b can be inserted a flange portion 215 of the clip portion 211. The sliding opening 206b opens the opening 205b into the ceiling wall portion 206. The opening 206b is arranged to extend longitudinally relative to the garnish 200.

On the bottom face of each of the retaining recesses 209 and 210, i.e., on the face of the interior side, there are formed three ribs 208. Each rib 208 extends longitudinally relative to the garnish 200. Each retaining recess 209 and 210 is defined by the leading end of each rib 208, the ceiling wall portion 206 and the side wall portions 207. The openings 205a and 205b has an opening width set to receive the flange portions 127 and 215 of the clip portions 171 and 211, respectively. The sliding openings 206a and 206b have respective opening widths set to receive the portions 128 and 213b of the clip portions 171 and 211, respectively, on the root portion side when the clip portions 171 and 211 are respectively fitted in the retaining recesses 209 and 210 of the flange portions 127 and 215.

Moreover, the clip portion 171 is provided for the airbag-type cover, and is made similar to that of the third embodiment, thus, its description will not be repeated.

Figure 54:
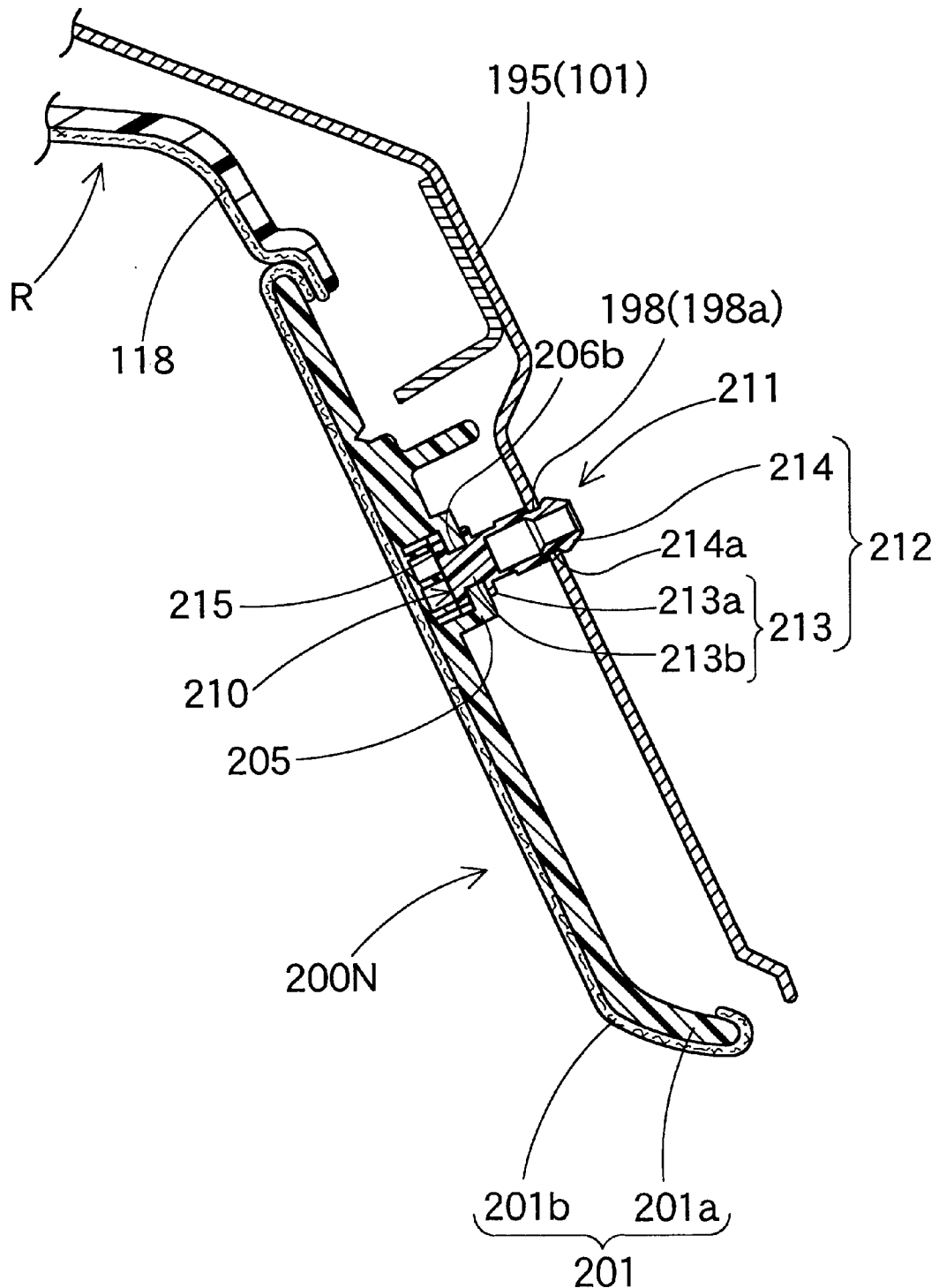
FIG. 54 is a section showing the vicinity of a clip portion of a normal-type garnish according to the fourth embodiment.

The clip portion 211 is for the normal-type cover, as shown in FIGS. 53 and 54, and is made similar to the clip portion 181 of the second embodiment. However, the radial size is smaller than that of the clip portion 181. The clip portion 211 can be made of an elastic deformable synthetic resin such as polyamide (or 66 nylon), polyacetal or thermoplastic olefinic elastomers, or rubber. The clip portion 211 comprises a retained stem portion 212 and the stem portion 215. The retained stem portion 212 is demountably retained on the inner panel 195 by inserting the retained stem portion 212 into the retaining hole 198 of the inner panel 195. The flange portion 215 is arranged on the root portion side of the clip portion 211. The retained stem portion 212 comprises a stem body 213 and a retained leg portion 214. The retained leg portion 213 is arranged on the leading end side of the stem body 213. This stem body 213 comprises a second flange portion 213a and the neck portion 213b. The second flange portion 213a abuts against the ceiling wall portion 206 when the flange portion 215 is fitted in the retaining recess 210. The neck portion 213b is arranged in the sliding opening 206b when the flange portion 215 is fitted in the retaining recess 210. The retained leg portion 214 is retained on the circumferential edge of the retaining hole 198. The retained leg portion 214 is formed into a cylindrical shape having a converging leading end. At an axially intermediate portion of the retained leg portion 214, there is formed a groove 214a which is circumferentially recessed from the circumference. In this groove 214a, there is fitted the inner circumferential portion 198a of the retaining hole 198 when the retained leg portion 214 is retained on the circumferential edge of the retaining hole 198. The groove 214a is made shallow so that the retained leg portion can be demounted if forcibly pulled out.

When the rear pillar garnish 200A of the airbag cover type is to be assembled, the cap 131 is retained on the core member 126 to form the clip portion 171. With the diametrically larger portion 128 protruding from the sliding opening 206a, the flange portion 127 of the clip portion 171 is then fitted from the inserting opening 205a into the retaining recess 209. When the clip portion 171 is mounted on the interchangeable base portion 205, the rear pillar garnish 200A of the airbag-type cover is assembled. This garnish 200A functions similarly to the pillar garnish 160A of the third embodiment.

The clip portion 211 is also mounted on the interchangeable base portion 205. The flange portion 215 of the clip portion 211 is fitted from the inserting opening 205b in the retaining recess 210 and protrudes from the sliding opening 206. When the clip portion 211 is thus mounted on the interchangeable base portion 205, a rear pillar garnish 200N of the normal type is assembled. This garnish 200N can provide actions and effects similar to those of the pillar garnish 160N of the third embodiment.

In these pillar garnishes 200A and 200N of the fourth embodiment, the clip portions 171 and 211 for the airbag-type cover and for the normal-type cover are individually mounted in an interchangeable manner on the interchangeable base portion 205. As compared with the case in which the caps 131, 141 and 151 are interchanged, therefore, the desired retaining force on the inner panel 195 is easily taken into consideration by selection of an appropriate cap. As a result, the retaining force on the inner panel 195 can be controlled by design and choice of the clip portions 171 and 211.

If the flange portions 127 and 215 are retained in the retaining recesses 209 and 210, moreover, the predetermined clip portions 171 and 211 can be simply mounted on the interchangeable base portion 205. This makes it possible to easily assemble the pillar garnishes 200A and 200N which are optimized for the applications of the airbag-type cover and the normal-type cover, respectively.

Figure 52:
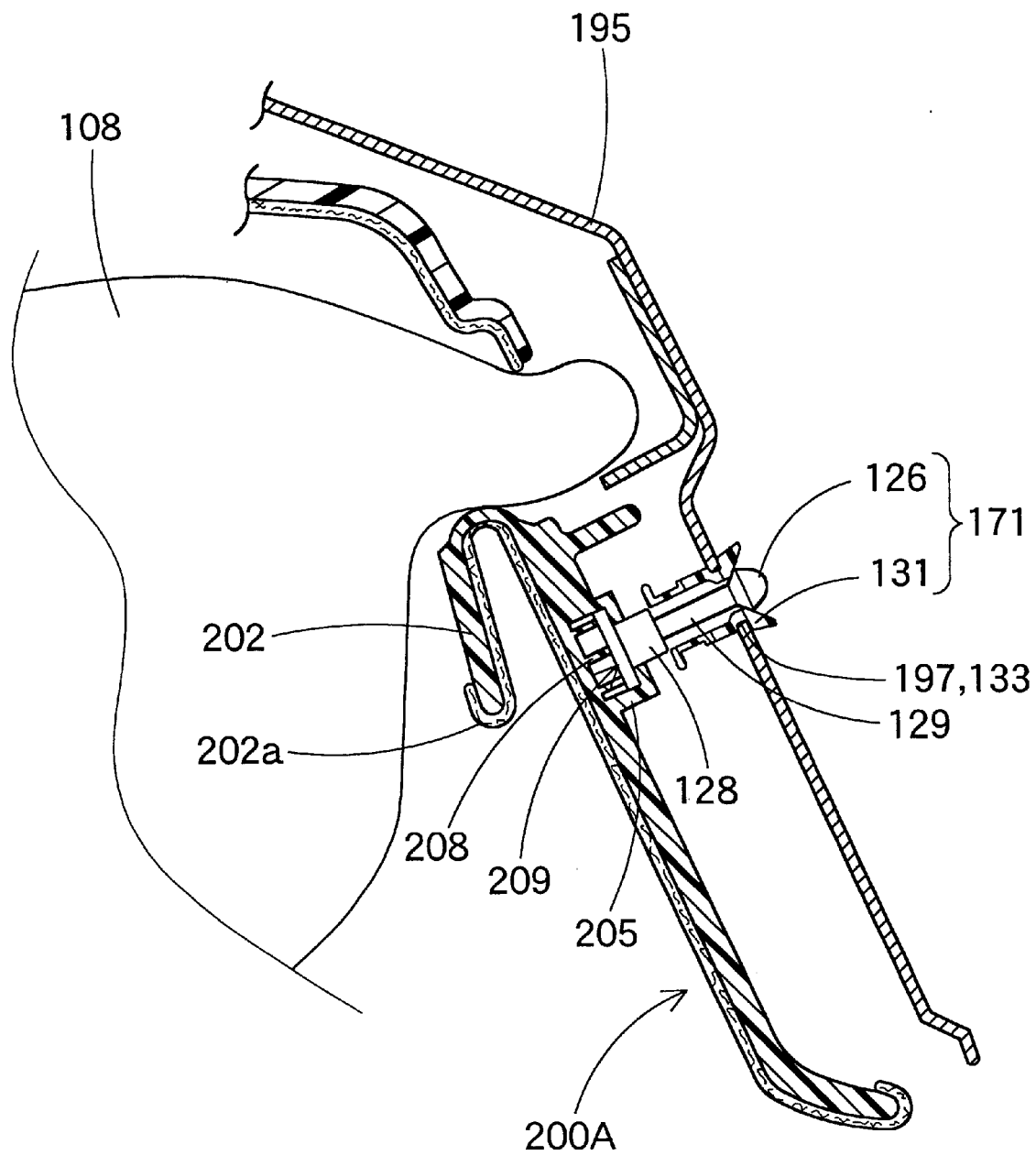
FIG. 52 is a schematic section showing the rear pillar garnish of the fourth embodiment when an airbag is inflated and expanded.

In the fourth embodiment, when the inflator 112 is activated after the rear pillar garnish 200A for the airbag-type cover has been mounted on the vehicle, the door portion 202 is pushed by the inflating airbag 108. The door portion 202 is opened while moving its upper edge 202a to the inside of the vehicle while pivoting about the hinge portion 203, as shown in FIGS. 50 and 52. Then, the airbag 108 protrudes into the opening which is created by movement of the door portion 202.

Figure 55:
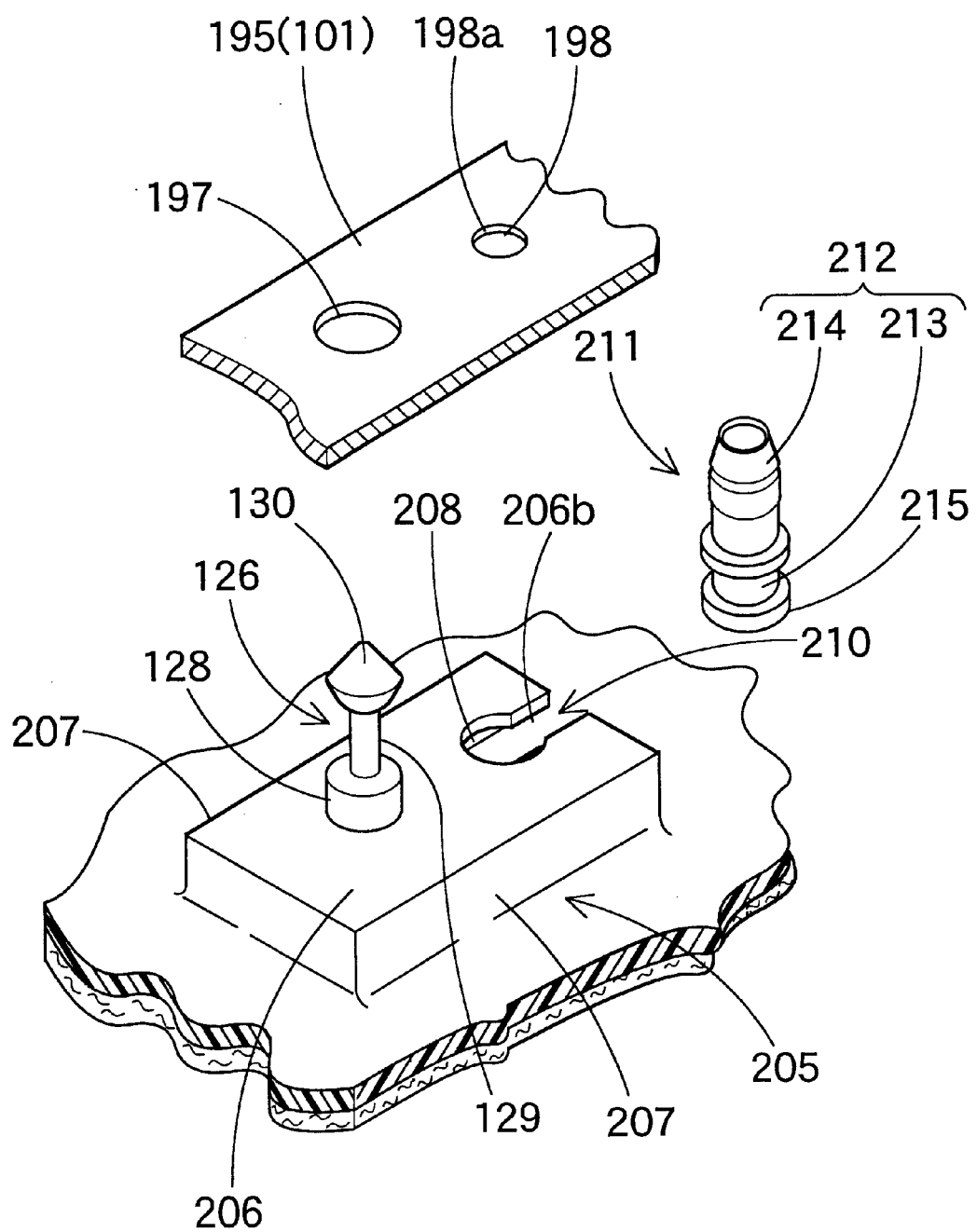
FIG. 55 is a perspective view showing another embodiment of the interchangeable base.

When the inner panels 105 and 195 on the side of the body 101 are provided with two kinds of retaining holes capable of separately retaining the clip portion of the airbag-type cover and the clip portion of the normal-type cover, the construction may be modified into one shown in FIG. 55. In short, the interchangeable base portion 205 itself may be provided with the core member 126. The core member 126 can be made of a synthetic resin, and is formed integrally with the garnish body when this body is molded. Moreover, the core member 126 is provided at its leading end with the head portion 130. The head portion 130 can retain the airbag cover cap 131 (as referred to in the second embodiment). The core member 126 may be cut off when the pillar garnish is used for the normal type. The core member 126 is diametrically smaller than the airbag cover cap 131. Thus, the core member 126 is permitted to move through the inner circumference of the retaining hole 197 without interference. When the pillar garnish is used for the normal type, therefore, the core member 126 may be left as it is.

Figure 56:
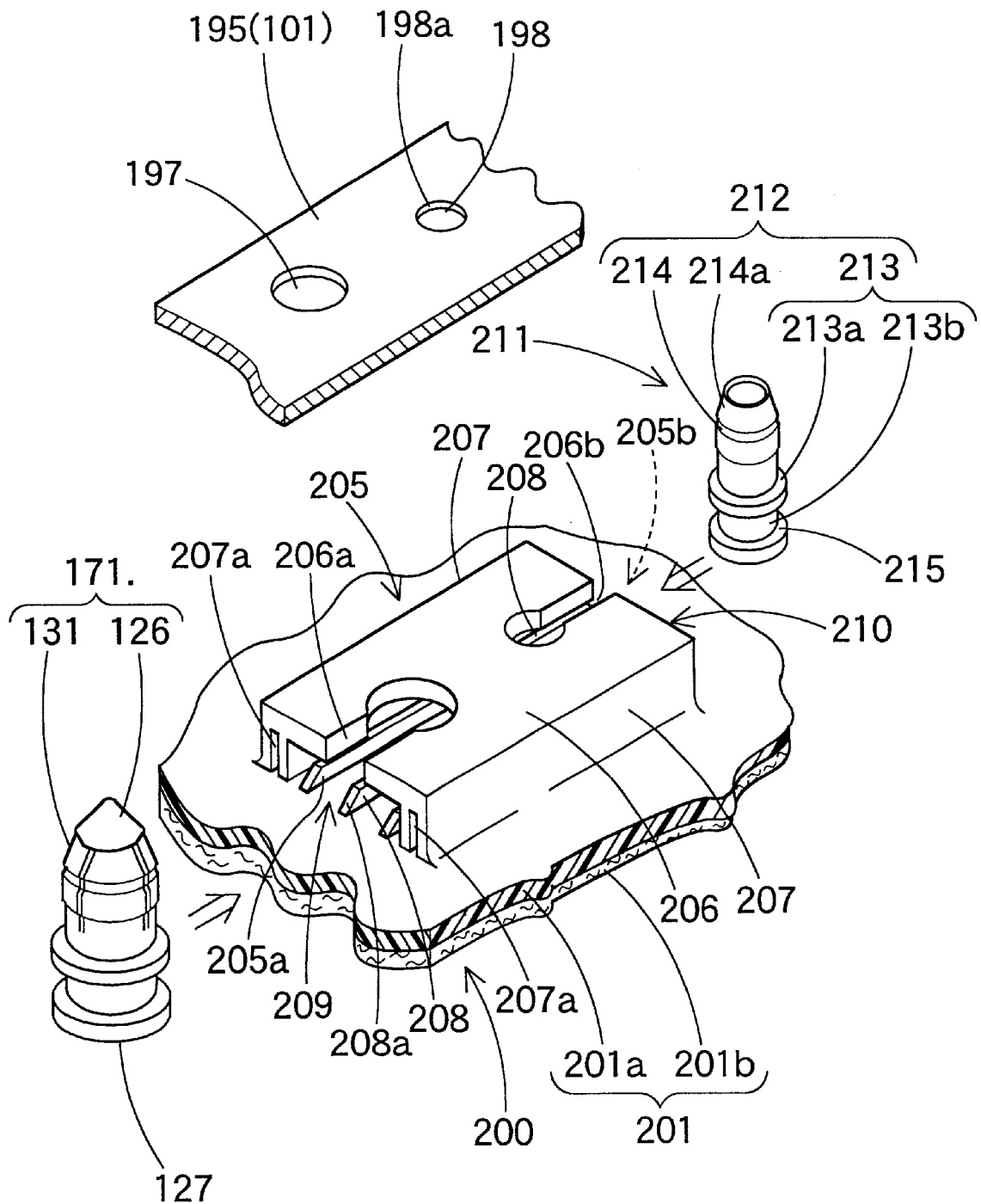
FIG. 56 is a perspective view showing still another embodiment of the interchangeable base.

In order to enhance the strength of the interchangeable base portion 205, the ceiling wall portion 206 and the side wall portions 207 may be thickened, as shown in FIG. 56. In this modification, it is desirable that a thieving portion 207a be formed in the side wall portion 207. Otherwise, a molding sink is liable to occur in the interior side surface of the garnish body 201 (or the base portion 201a) in the arranged portion of the side wall portion 207. The molding sink can be prevented if the thickness of the synthetic resin material of the side wall portion from the interior side surface is reduced.

As shown in FIG. 56, a slanted guide portion 208a is formed on the end face of the rib 208 on the side for inserting the flange portions 127 and 215. Then, the flange portions 127 and 215 of the clip portions 171 and 211 can be easily inserted into the retaining recesses 209 and 210 of the interchangeable base portion 205.

In the second, third and fourth embodiments, the retained legs 124 and 204 are integrally formed with the garnish bodies 121 and 201. However, the construction may be modified by replacing the retained legs 124 and 204 by the clip portions 125, 171, 181 and 211. If a retaining structure of the same retaining force is thus formed at all the portions, the pillar garnish can be mounted/demounted on the body 101 by the constant force.

Figure 57:
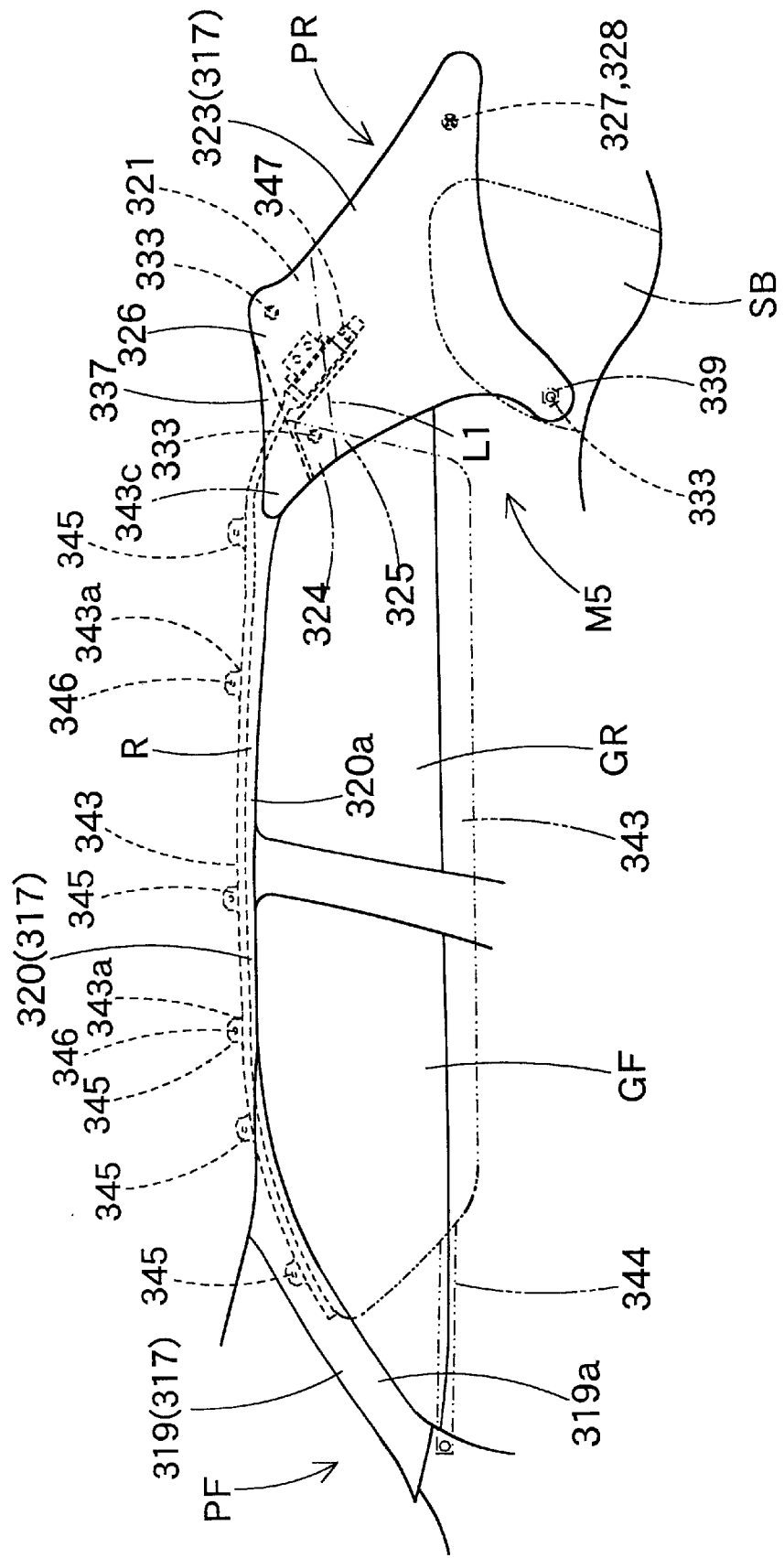
FIG. 57 is a front elevation taken from the inside of a vehicle, showing a head-protecting airbag device according to a fifth embodiment.

A head-protecting airbag device M5 according to a fifth embodiment, as shown in FIG. 57, is constructed to include an airbag 343, an inflator 347 and an airbag cover 317. The airbag 343 is folded and housed in the rear pillar portion PR, the roof side rail portion R and the front pillar portion PF in the interior compartment of the vehicle. The inflator 347 feeds the airbag 343 with an inflating gas. The airbag cover 317 covers the folded airbag 343 on the interior side. The airbag cover 317 is constructed to include a rear pillar garnish 323, the lower edge 320a of a roof interior member 320, and front pillar garnish 319.

Figure 58:
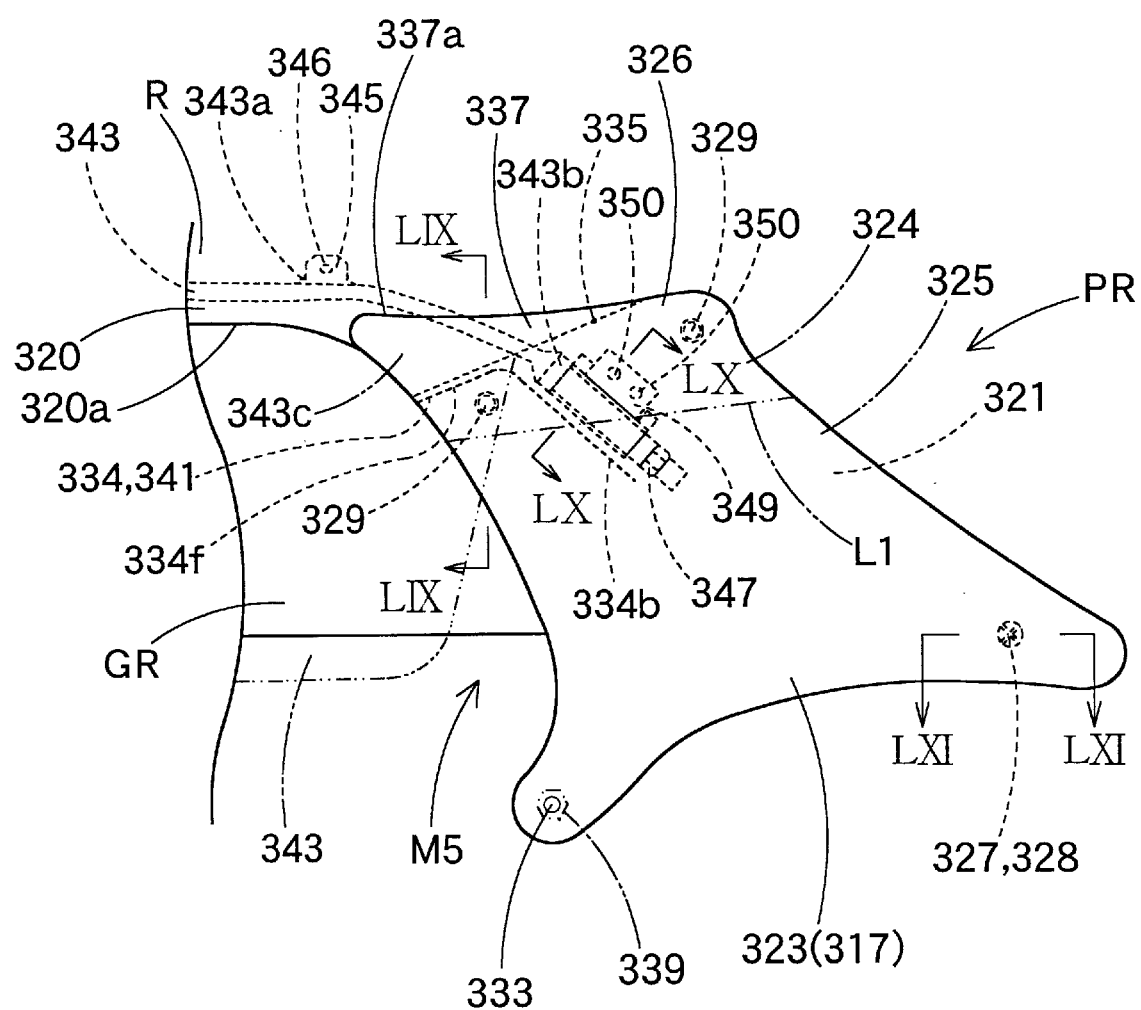
FIG. 58 is a schematic front elevation showing the vicinity of a rear pillar garnish according to the fifth embodiment.
Figure 60:
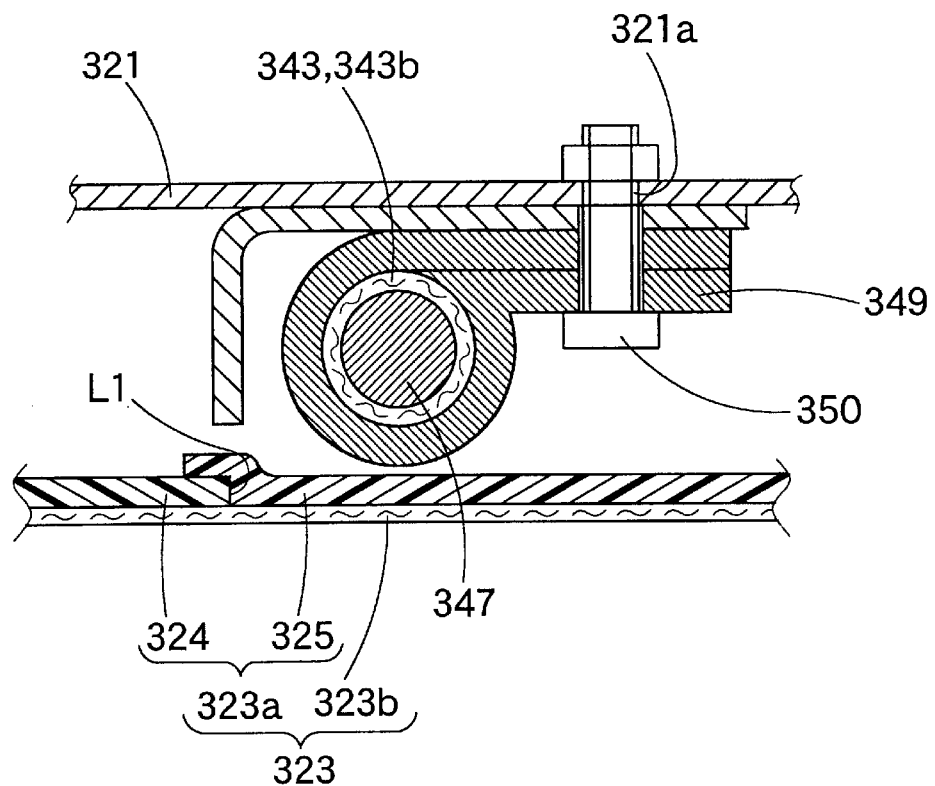
FIG. 60 is a schematic section showing a portion taken along line LX—LX of FIG. 58.

The airbag 343 is provided with a plurality of mounting portions 343a and a plurality of jointing cylindrical portions 343b. Each mounting portion 343a is arranged on the upper edge side of the airbag 343, and fixes a mounting bracket 345 made of a sheet metal. Each jointing cylindrical portion 343b is mounted on the inflator 347 (as shown in FIGS. 58 and 60). An inner panel 321 or the body of the rear pillar portion PR is extended to the roof side rail portion R and the front pillar portion PF. The airbag 343 is mounted on the inner panel 321 by the mounting brackets 345 and mounting bolts 346. The airbag 343 is provided on its front side with a belt 344, which is connected to the lower portion of the front pillar portion PF. The belt 344 establishes a tension on the lower edge side of the inflating airbag 343 to prevent the lower edge side of the airbag 343 from moving to the exterior side of the vehicle.

The inflator 347 is formed into a cylinder type to mount the jointing cylindrical portion 343b of the airbag 343 therearound, as shown in FIGS. 57, 58 and 60. Around the jointing cylindrical portion 343b, there is mounted a mounting bracket 349 made of a sheet metal. The mounting bracket 349 is mounted on the inner panel 321 by means of two attachment bolts 350. These bolts 350 are fastened in the mounting holes 321a which are internally threaded. By mounting the mounting brackets 349 on the inner panel 321, the inflator 347 is mounted on the inner panel 321 on the upper side of the rear pillar portion PR.

Figure 59:
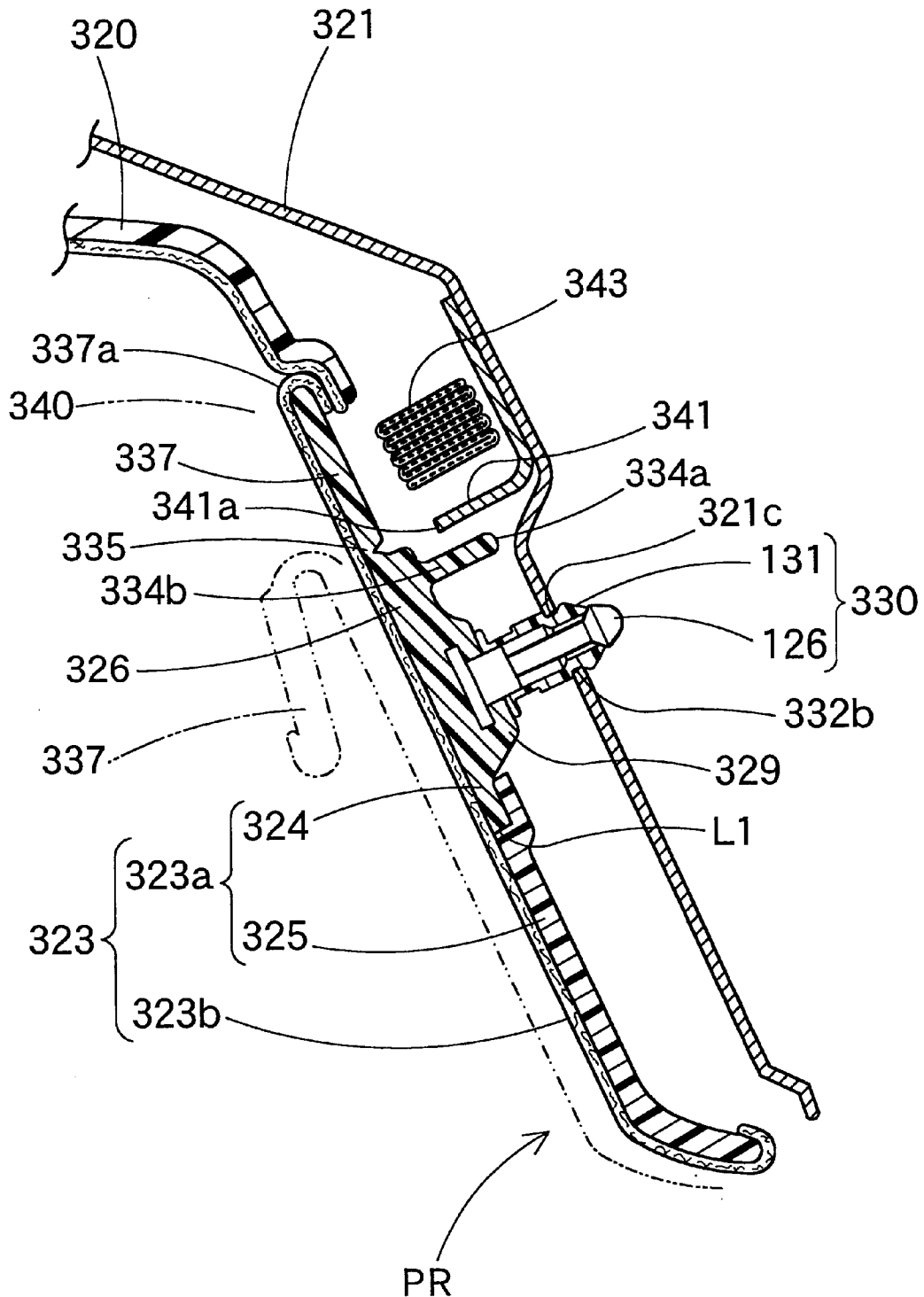
FIG. 59 is a schematic section showing a portion taken along line LIX—LIX of FIG. 58.

The rear pillar portion PR is constructed, as shown in FIGS. 58 and 59, to include the inner panel 321 on the body side of the vehicle, a regulating wall 341 made of a sheet metal, and the rear pillar garnish 323. The rear pillar garnish 323 covers and conceals the interior sides of the inner panel 321 and the regulating wall 341.

The rear pillar garnish 323 is formed into a generally rectangular shape and is composed of a door portion 337 and a body portion 326, as shown in FIGS. 57 to 61. The door portion 337 is arranged on the upper end front side of the garnish 323. The door portion 337 is pushed and opened as the airbag 343 inflates and expands. With the exception of the door portion 337, the body portion 326 of the garnish 323 functions to mount the garnish 323 on the inner panel 321. On the exterior side face of the body portion 326, there are arranged mounting seats 329 and 327. Two of the mounting seats 329 are arranged in the vicinity of the door portion 337. On each mounting seat 329, there is arranged a clip portion 330. The mounting seat 327 is arranged in the vicinity of the rear lower corner of the body portion 326. On the mounting seat 327, there is arranged a clip portion 328.

The garnish 323 has a two-layered structure having a base portion 323a and a surface skin 323b made of synthetic resins. The surface skin 323b can be made of a synthetic resin such as soft vinyl chloride or thermoplastic olefinic elastomers, or a fabric and is joined to the interior side surface of the base portion 323a. The base portion 323a can be a two-color molding of an elastomer portion 324 and a hard portion 325. The elastomer portion 324 is arranged in the upper side region of the base portion 323a, and extends over the region containing the door portion 337 and the two mounting seats 329. The elastomer portion 324 can be made of an olefinic thermoplastic elastomer. The hard portion 325 constructs the lower side region of the elastomer portion 324. The hard portion 325 can be made of polypropylene. A boundary line L1 between the elastomer portion 324 and the hard portion 325 is indicated by a double-dotted line in FIGS. 57 and 58. Here, the elastomer portion 324 and the hard portion 325 are made of materials of the same kind having a compatibility.

Figure 61:
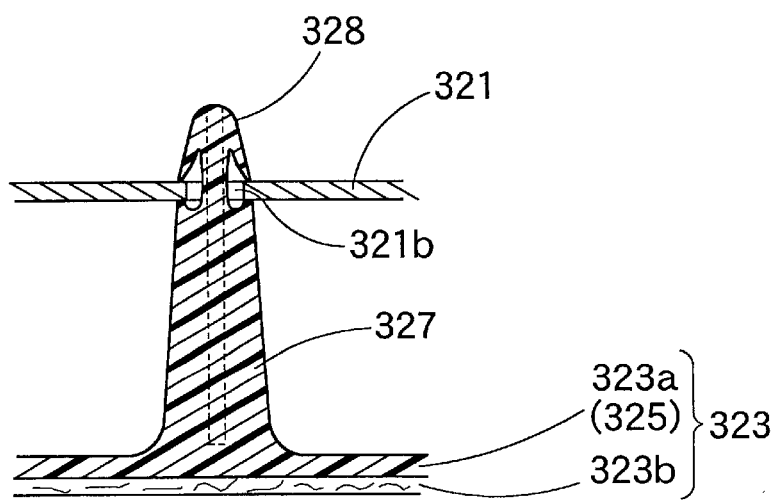
FIG. 61 is a schematic section showing a portion taken along line LXI—LXI of FIG. 58.

In the front lower corner of the body portion 326, there is formed a mounting hole 333, in which a bolt 339 is inserted for fixing the garnish 323 on the inner panel 321. The mounting seat 327 of the body portion 326 supports the clip portion 328, as shown in FIGS. 58 and 61. The clip portion 328 is inserted into a retaining hole 321b of the inner panel 321, and is retained on the circumferential edge of the retaining hole 321b. In the case of this embodiment, the mounting seat 327 and the clip portion 328 are molded integrally with each other as a single piece. The mounting seat 329 of the body portion 326 supports the clip portion 330, as shown in FIGS. 58 and 59. This clip portion 330 is partially buried in the mounting seat 329. The clip portion 330 is inserted into a retaining hole 321c of the inner panel 321, and is retained on the circumferential edge of the retaining hole 321c.

Figure 62:
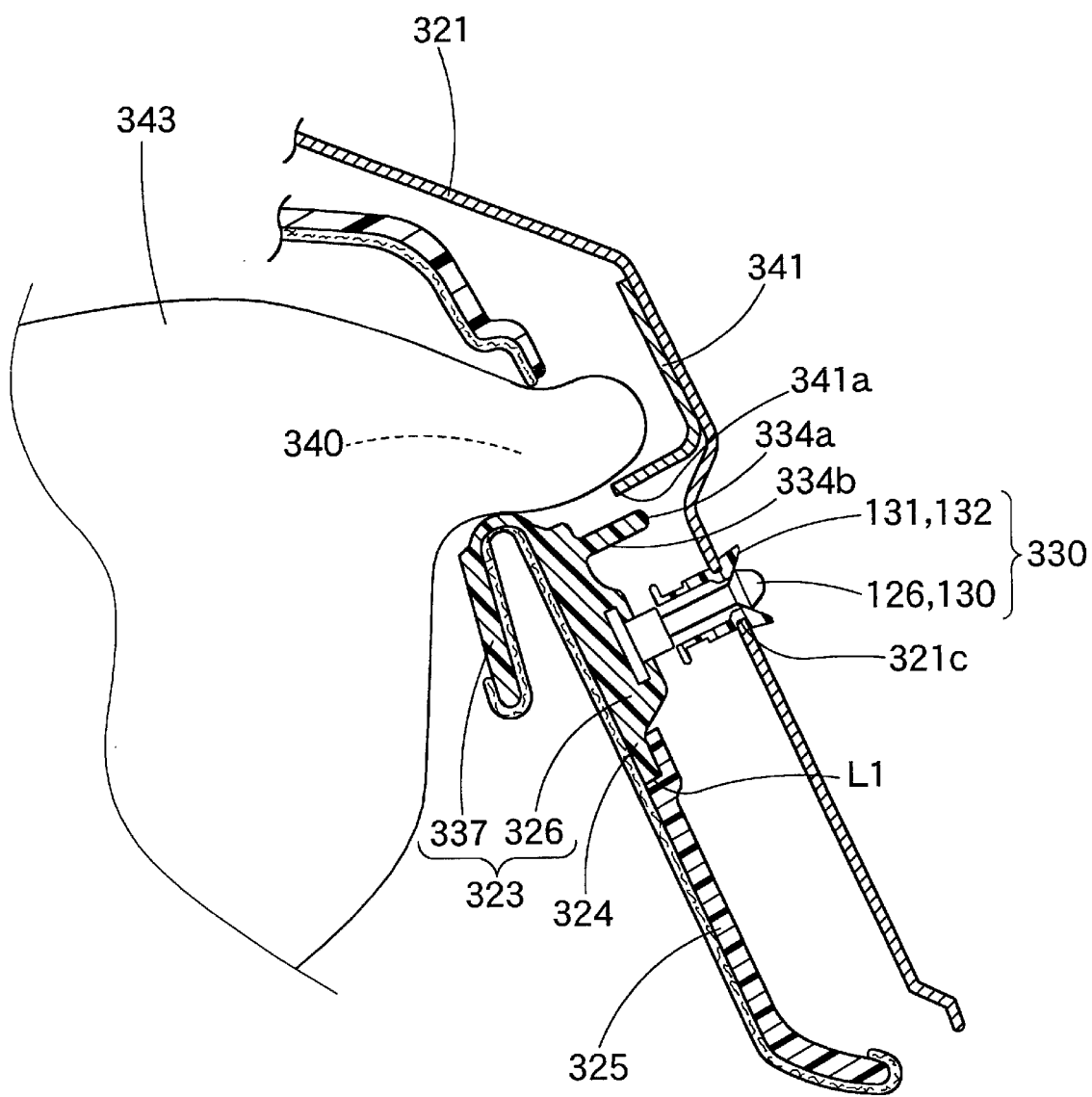
FIG. 62 is a schematic section at the time when the airbag of the fifth embodiment is inflated to expand.

As in the case of the second to fourth embodiments, the clip portion 330 comprises the core member 126 and the cap 131, as shown in FIGS. 59, 62 and 63. These portions are similar to those of the second to fourth embodiments and will be briefly described by designating these portions by common reference numerals.

The core member 126 can be made of a rigid steel bar or the like. The cap 131 can be made of an elastically deformable synthetic resin such as polyamide (66 nylon) or thermoplastic olefinic elastomers, or rubber. The cap 131 has a generally cylindrical shape that can be fitted on the core member 126. The core member 126 is provided with the head portion 130, the neck portion 129 and the flange portion 127. The head portion 130 is arranged at the leading end and is formed into a triangular pyramid shape. The neck portion 129 is formed into a columnar shape diametrically smaller than the head portion 130. The flange portion 127 is arranged on the root portion side, and is buried in the mounting seat 329.

The cap 131 is provided with the fixedly retained portion 132, the first groove 133, the second groove 135 and the flange portion 138. The fixedly retained portion 132 is arranged at the leading end, and diverges so as to be thicker toward the root portion side. The fixedly retained portion 132 is brought into abutment against the back side of the head portion 130 of the core member 126. The first groove 133 is circumferentially arranged adjacent to the fixedly retained portion 132. The second groove 135 is circumferentially arranged on the root portion side of the cap 131. The flange portion 138 is arranged on the root portion side, and abuts against the mounting seat 329. The cap 131 is provided with a plurality (four in the embodiment) of slits 137. Each slit 137 is formed axially in the cap 131, from the leading end of the cap 131 and into proximity with the second groove 135.

The external diameters of the first groove 133 and the second groove 135 are set substantially equal to the internal diameter of the retaining hole 321c of the inner panel 321. The internal diameters of the fixedly retained portion 132 and the first groove 133 are set smaller than the external diameter of the head portion 130 of the core member 126. The internal diameter of the vicinity of the second groove 135 is set substantially equal to the external diameter of the head portion 130.

The core member 126 retains the cap 131 so as to form the clip portion 330. In this state, the leading end of the fixedly retained portion 132 abuts against the back face side of the head portion 130. The flange portion 138 of the cap 131 abuts against the mounting seat 329.

The clip portion 330 is inserted to place the first groove 133 into the retaining hole 321c of the inner panel 321. As a result, the garnish 323 is firmly mounted on the inner panel 321. In this mounted state, the garnish 323 will move into the interior compartment of the vehicle as the airbag 343 is inflated to expand. As shown in FIG. 62, more specifically, the core member 126 moves towards the interior compartment of the vehicle so that the head portion 130 no longer contacts the leading edge of the fixedly retained portion 132 of the cap 131. However, the fixedly retained portion 132 is made to be so thick that the head portion 130 cannot pass through the fixedly retained portion 132. The leading edge of the fixedly retained portion 132 is also pushed radially outward by the head portion 130 so that the fixedly retained portion 132 cannot come out from the retaining hole 321c. This prevents the clip portion 330 from being extracted from the retaining hole 321c. As a result, the stable mounted state of the garnish 323 on the inner panel 321 is maintained.

Figure 63A:
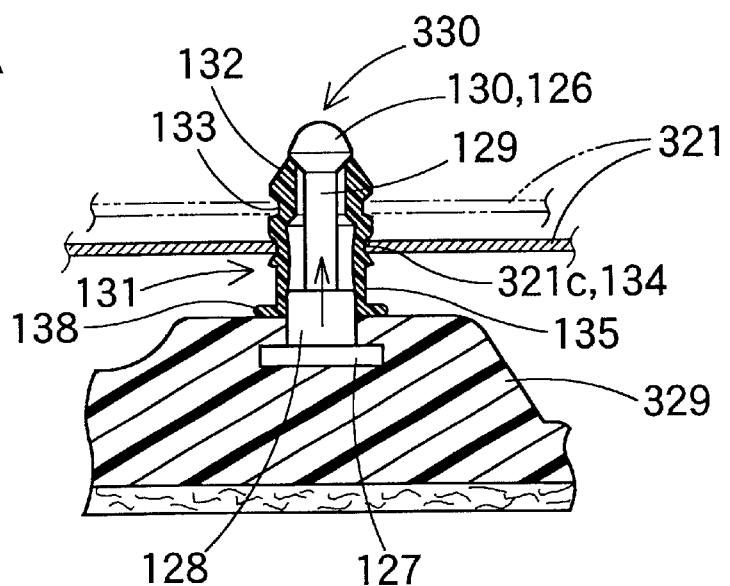
FIGS. 63A to 63C are sections sequentially showing the states in which a clip portion mounted in a mounting seat of the rear pillar garnish of the fifth embodiment is demounted from an inner panel.
Figure 63B:
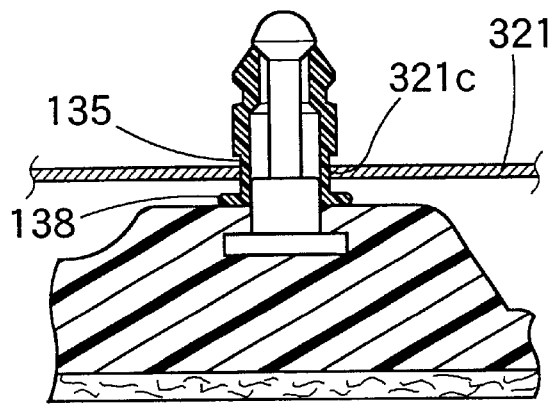
Figure 63C:
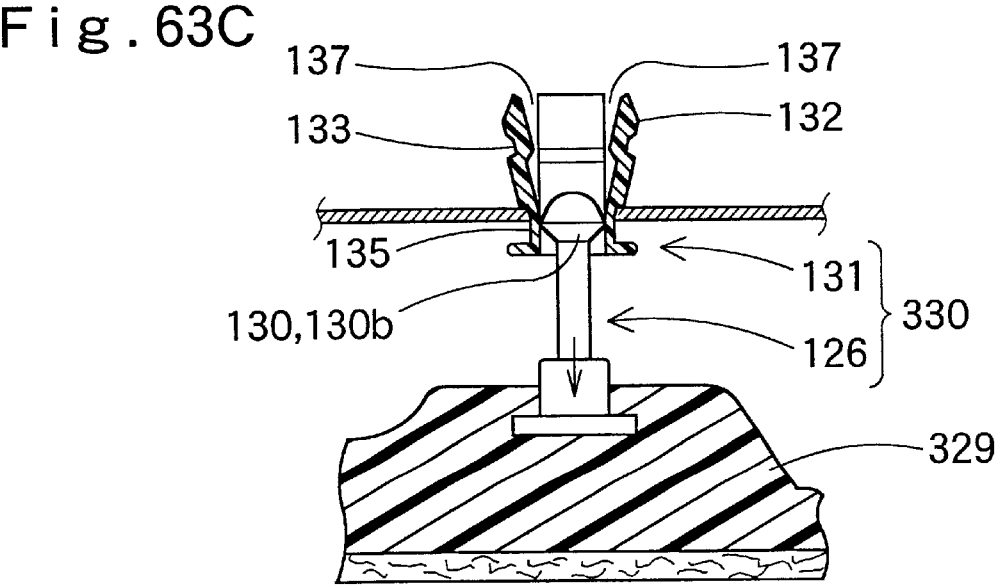

By pushing a portion of the clip portion 330 together with the garnish 323, as shown in FIGS. 63A and 63B, the inner circumference of the retaining hole 321c is arranged in the second groove 135. At this time, the internal diameter of the cap 131 at the portion of the second groove 135 is substantially equal to the external diameter of the head portion 130. If the garnish 323 is then moved into the vehicle, as shown in FIG. 63C, the core member 126 can pass through the cap 131. As a result, the garnish 323 can be simply demounted from the inner panel 321. At this time, the cap 131 is retained on the circumferential edge of the retaining hole 321c.

As shown in FIG. 61, the clip portion 328 is retained in the retaining hole 321b. If the garnish 323 is forced to move into the inside of the vehicle, however, the clip portion 328 can be extracted from the retaining hole 321b.

At the boundary portion of the body portion 326 from the door portion 337, i.e., on the lower edge side of the door portion 337, there is linearly formed a hinge portion 335 for opening the door portion 337 smoothly. This hinge portion 335 is formed by forming a groove in the exterior side face of the base portion 323a.

On the exterior side face of the body portion 326 below the hinge portion 335, there is arranged a regulating wall 334 protruding to the outside of the vehicle. This regulating wall 334 is formed integrally with the base portion 323a. The regulating wall 334 extends at its front portion side 334f along the hinge portion 335. The regulating wall 334 is bent at its rear portion side 334b, and is arranged on the front side of the inflator 347. The rear portion side 334b is arranged along the inflator 347. The regulating wall 334 guides the expanding airbag 343 to the door portion 337, permitting the door portion 337 to be opened quickly.

On the inner panel 321 on the body side of the vehicle, there is fixed the regulating wall 341 which can be made of a sheet metal so as to have an L-shaped section. The regulating wall 341 is formed by arranging a leading end 341a to overlap a leading end 334a of the regulating wall 334. The regulating wall 341 also guides the airbag 343 to expand against the door portion 337, thus contributing to the quick opening of the door portion 337.

The door portion 337 is formed into a triangular sheet shape, and is arranged on the upper end front side of the garnish 323. The door portion 337 is provided on its lower edge side with the aforementioned hinge portion 335 for providing a pivot point. As a result, the door portion 337 is opened while turning downward, when pushed by the airbag 343.

When the pillar garnish 323 of the fifth embodiment is manufactured, the elastomer portion 324 of the base portion 323a is injection-molded in advance. Then, a predetermined slide core in the mold for the elastomer portion 324 is moved to form a cavity for molding the hard portion 325. When this hard portion 325 is injection-molded, the base portion 323a can be easily formed. After this, a predetermined adhesive is utilized to bond the surface skin 323b to the surface of the base portion 323a so that the garnish 323 can be easily manufactured.

In this embodiment, the elastomer portion 324 is made of a thermoplastic olefinic elastomer, and the hard portion 325 is made of polypropylene. The thermoplastic olefinic elastomer of the elastomer portion 324 and the polypropylene of the hard portion 325 are compatible with each other and are firmly bonded to each other.

During injection molding of the elastomer portion 324, the core member 126 of each clip portion 330 is preset as an insert in the mold. Then, the garnish 323 is manufactured, and the cap 131 is placed on the core member 126.

The fifth embodiment has been described for the case in which the elastomer portion 324 is molded before the hard portion 325. Despite this description, however, the hard portion 325 may be molded before the elastomer portion 324.

The assembly on the vehicle of the head-protecting airbag device MS of the fifth embodiment will now be described. First, the airbag 343 is folded, and the mounting brackets 345 are mounted on the individual mounting portions 343a. The inflator 347 is inserted into the jointing cylindrical portion 343b, and the mounting brackets 349 are mounted. In order to prevent the airbag 343 from being unfolded (or restored), the folded airbag 343 is wrapped at its predetermined portions with a tape member (not shown). As a result, there is produced an airbag assembly.

Then, the individual mounting brackets 345 and 349 are fixed on the inner panel 321 by means of the mounting bolts 346 and 350. By further mounting the front pillar garnish 319 as the airbag cover 317, the roof interior member 320 and the rear pillar garnish 323 on the inner panel 321, the head protecting airbag device M5 can be assembled in the vehicle.

The rear pillar garnish 323 is mounted on the inner panel 321 in the following manner. The clip portion 328 is inserted into the retaining hole 321b, and is retained on the circumferential edge of the retaining hole 321b. On the other hand, the clip portions 330 are inserted into the retaining holes 321c to arrange the first grooves 133 of the caps 131 are in the circumferential edges of the individual retaining holes 321c. Moreover, the mounting bolt 339 is inserted into a mounting hole 333, and fastened on the inner panel 321. As a result, the rear pillar garnish 323 can be mounted on the inner panel 321.

According to this embodiment, after the rear pillar garnish 323 has been mounted on the inner panel 321, a rear seat SB (as shown in FIG. 57) is arranged in the vehicle. As a result, the mounting bolt 339 is not exposed to the interior side.

If the inflator 347 is activated after the head-protecting airbag device M5 has been mounted on the vehicle, the inflating gas flows into the airbag 343. As the airbag 343 inflates, there are pushed and opened the lower edges 319a and 320a of the front pillar garnish 319 and the roof interior member 320 of the airbag cover 317. At the rear pillar garnish 323, on the other hand, the door portion 337 is pushed and opened by the inflating airbag 343, as shown in FIG. 62. At this time, the door portion 337 is opened by pivoting about the hinge portion 335 so that the upper edge 337a enters into the vehicle interior compartment. Then, the airbag 343 protrudes into an opening 340 which is formed by the displaced door portion 337. Moreover, the airbag 343 covers the portions of front and rear side window glasses GF and GR, as indicated by double-dotted lines in FIG. 57.

In the rear pillar portion PR, the folded airbag 343 is covered with the door portion 337 on the upper end front side of the garnish 323. Moreover, the airbag 343 is arranged to extend forward and upward from the portion covered with the door portion 337 to the roof side rail portion R. The door portion 337 is constructed to open downward. When the airbag 343 is inflated to expand, the airbag 343 protrudes downward on the interior side so as to cover the door portion 337 opened downward. As a result, the front side upper portion of the rear pillar garnish 323 on the interior side is covered with a portion 343c of the airbag 343 that has been inflated to expand.

When the door portion 337 is opened, the garnish 323 is moved to the interior side by the force of the inflating airbag 343. This movement is restricted, however, because the ore member 126 of the clip portion 330 does not completely come out from the fixedly retained portion 132. Therefore, the vicinity of the door portion 337 slightly moves to the interior side. And, the door portion 337 is opened to the position where the garnish 323 has moved. In other words, the area for the door portion 337 to open is widened to the extent that the airbag 343 is allowed to smoothly protrude.

In the fifth embodiment, the rear pillar garnish 323 is made as an integral molding of the door portion 337 and the body portion 326. In other words, the rear pillar garnish 323 is not constructed such that the door portion 337 is separately mounted. This makes it possible to construct the garnish 323 such that the parting line of the door portion 337 is not present on the interior side. Thus, the rear pillar portion PR can be covered with the rear pillar garnish 323 in which the body portion 326 and the door portion 337 are integrally formed. As a result, the appearance of the rear pillar portion PR can be improved.

Especially in the case of this embodiment, the surface skin 323b can be arranged as to cover the whole surface of the base portion 323a on the interior side. As a result, the appearance of the rear pillar portion PR can be further improved. Without considering this point, the garnish 323 may be constructed without the surface skin 323b. In this case, too, the door portion 337 and the body portion 326 are naturally constructed as the integral molding. Thus, it is possible to improve the appearance design of the rear pillar portion PR.

The mounting seats 329 for the clip portions 330 in the vicinity of the door portion 337 are arranged on the elastomer portion 324 which is made of a thermoplastic elastomer. Use of a thermoplastic elastomer will avoid breakage of the mounting seats 329 when the door portion 337 is pushed and opened by the inflating and expanding airbag 343. Breakage is avoided because any impact is absorbed, even if acting upon the mounting seats 329, by the elasticity of the thermoplastic elastomer. As a result, the pushing force generated by the inflating airbag 343 can be properly applied to the door portion 337 to open the same smoothly.

In the rear pillar garnish 323 of the fifth embodiment, therefore, the folded airbag 343 can be arranged in the rear pillar portion PR while suppressing deterioration in the appearance of the rear pillar portion PR. When the airbag 343 is inflated to expand, the door portion 337 can be smoothly opened.

In the head-protecting airbag device M5 of the fifth embodiment, the regulating walls 334 and 341 are arranged in the vicinity of the boundary between the door portion 337 and the body portion 326. The regulating walls 334 and 341 are arranged so as to separate or partition the folded airbag 343 and the body portion 326. When the airbag 343 expands, its pressure can be guided to the door portion 337. As a result, the door portion 337 can be quickly opened by the regulating walls 334 and 341. These actions and effects can also be obtained by the pillar garnish 200A of the fourth embodiment, which is not a two-color molding.

The regulating walls can be constructed of the regulating wall 341 of the inner panel 321 on the body side, and/or the regulating wall 334 of the garnish 323 on the airbag cover side.

Figure 64:
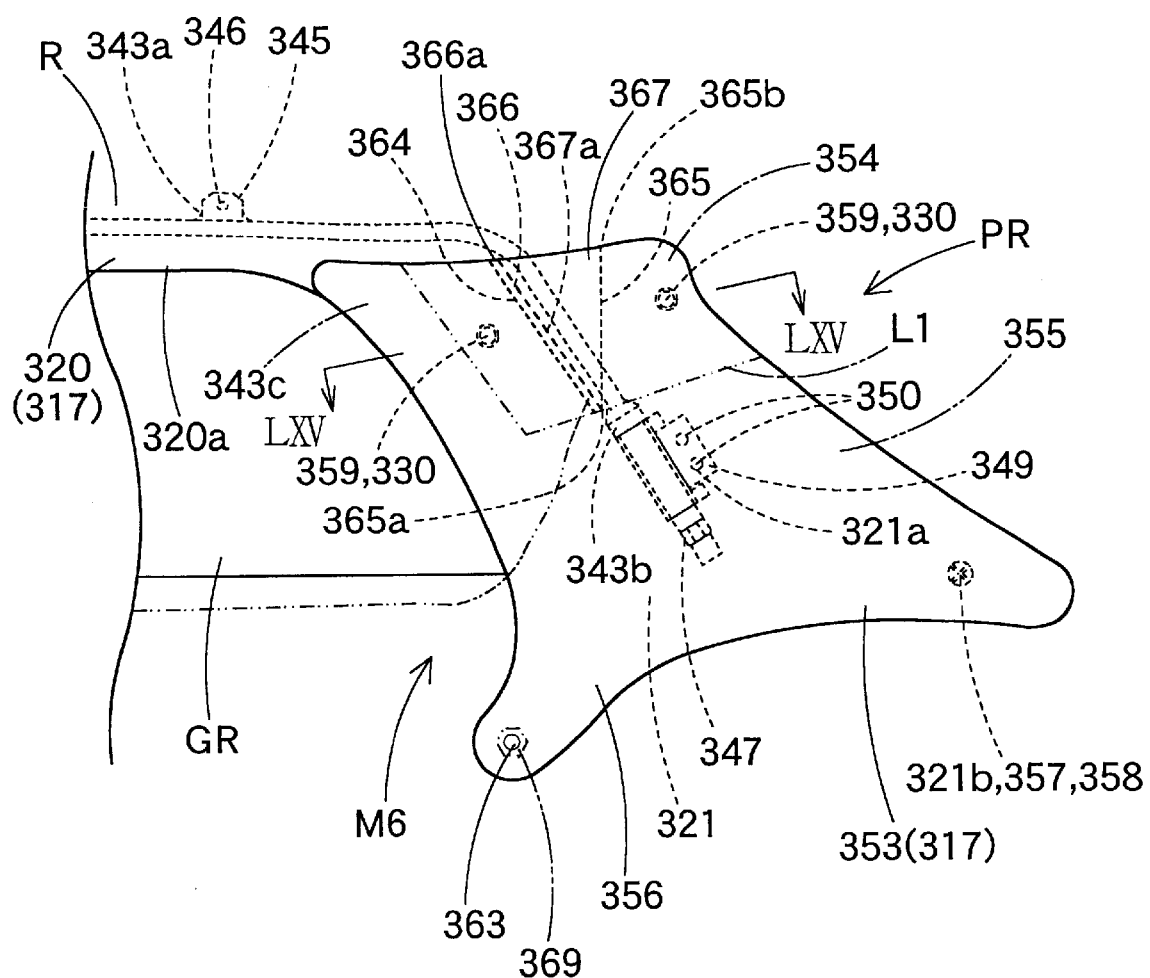
FIG. 64 is a schematic front elevation showing the vicinity of a pillar garnish in a head protecting airbag device of a sixth embodiment.
Figure 65:
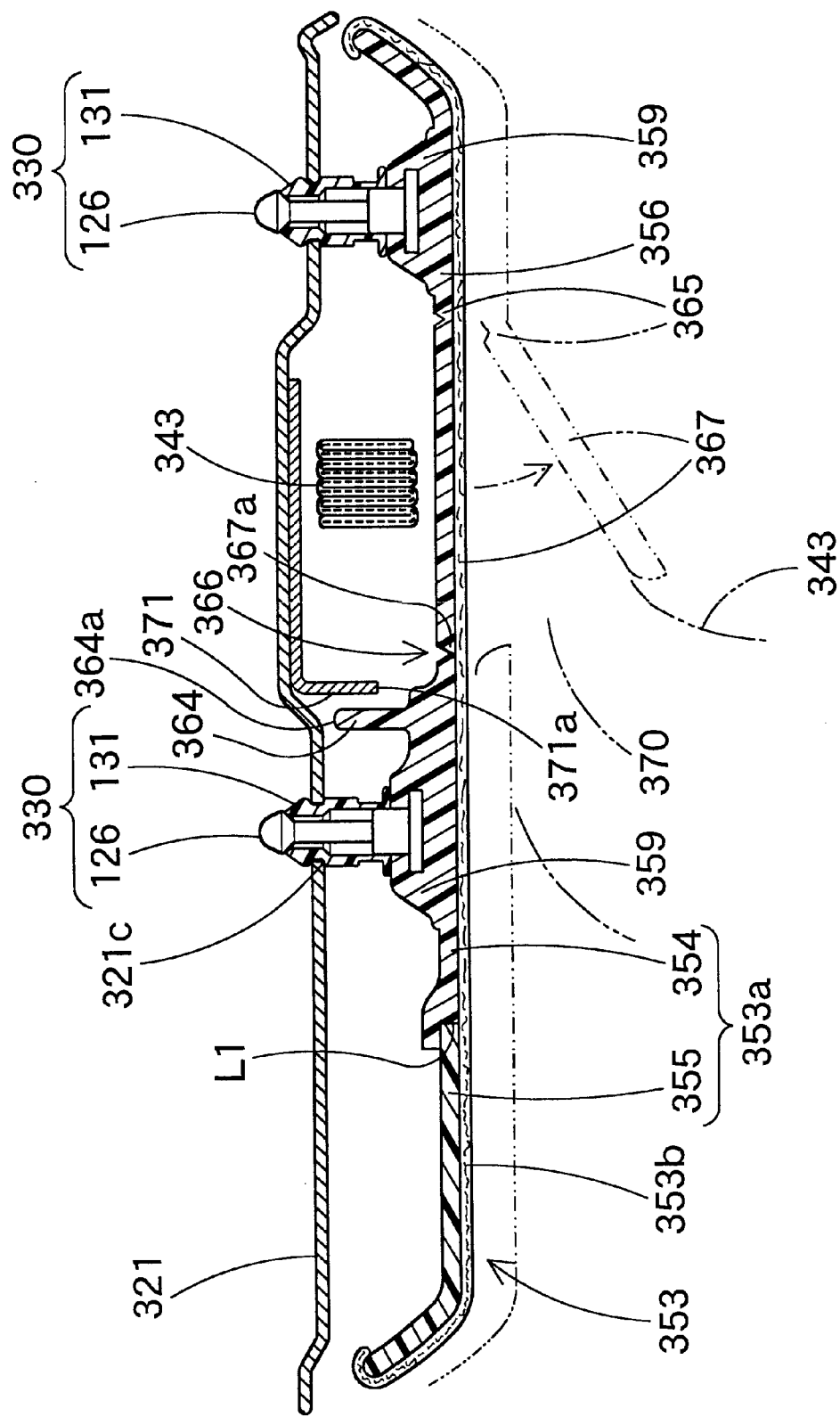
FIG. 65 is a schematic section showing a portion taken along line LXV—LXV of FIG. 64.

The garnish 323 of the fifth embodiment is constructed such that the door portion 337 is opened without any rupture in its peripheral edge. However, the construction may be modified into a rear pillar garnish 353 according to a sixth embodiment, as shown in FIGS. 64 and 65. In this garnish 353, the door portion 367 is opened by rupturing its peripheral edge.

This pillar garnish 353 is constructed of the door portion 367 and a body portion 356. The door portion 367 is arranged on the rear portion side from the upper end center of the garnish 353, and is pushed and opened by the airbag 343 being inflated to expand. The body portion 356 is a portion of the garnish 353 other than the door portion 367. The body portion 356 mounts the garnish 353 on the inner panel 321 or the rear pillar portion body. On the exterior side face of the body portion 356, there are arranged mounting seats 359 and 357. Two mounting seats 359 are arranged in the vicinity of the door portion 367. Each mounting seat 359 supports the same clip portion 330 as that of the fifth embodiment. The mounting seat 357 is arranged in the vicinity of the rear lower corner of the garnish 353. The mounting seat 357 supports a clip portion 358.

The garnish 353 has a two-layered structure of a base portion 353a and a surface skin 353b made of synthetic resins. The surface skin 353b is made of a synthetic resin such as soft vinyl chloride or thermoplastic olefinic elastomers, or a fabric and is bonded to the interior surface of the base portion 353a. Moreover, the base portion 353a is a two-color molding of an elastomer portion 354 and a hard portion 355. The elastomer portion 354 is arranged on the rear upper portion side of the garnish 353. The elastomer portion 354 is arranged in the region containing the door portion 367 and the mounting seats 359 of the body portion 356. The elastomer portion 354 is made of a thermoplastic olefinic elastomer. The hard portion 355 is arranged in the region other than the elastomer portion 354. Specifically, the hard portion 355 is arranged in the region on the front upper portion side and the lower portion side of the elastomer portion 354. The hard portion 355 is made of polypropylene. The boundary line L1 between the elastomer portion 354 and the hard portion 355 is indicated by a double-dotted line in FIG. 64.

In the front lower corner of the body portion 356, there is formed a mounting hole 363. Into this mounting hole 363, there is inserted a bolt 369 for mounting the garnish 353 on the inner panel 321. The mounting seat 357 of the body portion 356 supports the clip portion 358. This clip portion 358 is inserted into the retaining hole 321b of the inner panel 321, and is retained on the circumferential edge of the retaining hole 321b. The mounting seat 357 is molded integrally with the clip portion 358. Here, the mounting seat 357 and the clip portion 358 are constructed like the mounting seat 327 and the clip portion 328 of the fifth embodiment. The mounting seats 359 of the body portion 356 are constructed like the mounting seats 329 of the fifth embodiment. In short, the mounting seats 359 bury and support the clip portion 330.

The door portion 367 is formed into a triangular sheet shape. In this door portion 367, a portion 366 to be ruptured is arranged on the side of a front edge 367a. The rupturable portion 366 is arranged to extend downward from the upper end center of the garnish 323. The rupturable portion 366 is constructed by forming a groove in the exterior side face of the base portion 353a. At the rear edge of the door portion 367, there is formed a hinge portion 365 for allowing the door portion 367 to open smoothly. This hinge portion 365 is linearly formed by forming a groove in the exterior side face of the base portion 353a. The lower end 365a of the hinge portion 365 is generally flush with the lower end of the rupturable portion 366. The upper end 365b of the hinge portion 365 is arranged at a generally intermediate point between the upper end 366a of the rupturable portion 366 and the upper rear corner of the elastomer portion 354. Moreover, the door portion 367 is arranged in a triangular sheet shape joining the points 366a, 365a and 365b. Here, the portion of the base portion 353a of the hinge portion 365 is set to be thicker than the portion of the base portion of the rupturable portion 366 so that the hinge portion 365 may not be ruptured.

On the face of the exterior side of the body portion 356, there is arranged a regulating wall 364 protruding to the exterior side. This regulating wall 364 is arranged on the front side of the rupturable portion 366. The regulating wall 364 is formed integrally with the base portion 353a. The regulating wall 364 guides the pressure of the airbag 343 to the door portion 367 when the airbag 343 inflates to open the door portion 367 quickly. On the inner panel 321 on the body side of the vehicle, there is fixed a regulating wall 371 which is made of a sheet metal to have an L-shaped section. The leading end 371a of the regulating wall 371 overlaps the leading end 364a of the regulating wall 364. The regulating wall 371 also guides the inflating and expanding airbag 343 to the door portion 337.

This garnish 353 of the sixth embodiment is manufactured in the following manner. First, the core member 126 is set in advance as an insert at a predetermined position of the mold. Next, the predetermined slide core in the mold for the hard portion 355 is moved to form a cavity for molding the elastomer portion 354. Then, the elastomer portion 354 is injection-molded to form the base portion 353a. After this, a predetermined adhesive is used to bond the surface skin 353b to the surface of the base portion 353a. As a result, the garnish 353 is easily manufactured.

A technique for assembling the head-protecting airbag device M6 using the garnish 353 of the sixth embodiment will now be described. As in the fifth embodiment, the airbag 343 is folded at first to mount the mounting brackets 345 onto the individual mounting portions 343a. The inflator 347 is inserted into the jointing cylindrical portion 343b, and the mounting brackets 349 are mounted. Next, the airbag 343 is wrapped with a tape (not shown) for preventing the airbag 343 from being unfolded, thereby forming the airbag assembly.

The mounting bolts 346 and 350 are used to mount the individual mounting brackets 345 and 349 on the inner panel 321. On the inner panel 321, there are further mounted the front pillar garnish 319 (not shown in FIGS. 64 and 65) as the airbag cover 317, the roof interior member 320, and the rear pillar garnish 353, so that the head-protecting airbag device M6 can be assembled with the vehicle.

When the pillar garnish 353 is to be mounted on the inner panel 321, the clip portion 358 is first inserted into the retaining hole 321b as in the fifth embodiment. Then, the clip portion 358 is retained on the circumferential edge of the retaining hole 321b. On the other hand, the clip portions 330 are inserted into the retaining holes 321c and are retained on the circumferential edges of the retaining holes 321c. Moreover, the mounting bolts 369 are fastened through the mounting holes 333 on the inner panel 321 so that the garnish 353 can be mounted on the inner panel 321.

If the inflator 347 is activated after the head protecting airbag device M6 has been mounted on the vehicle, the inflating gas flows into the airbag 343. By inflating the airbag 343, the lower edges 319a and 320a of the front pillar garnish 319 and the roof interior member 320 of the airbag cover 317 are pushed and opened. At the portion of the rear pillar garnish 353, the rupturable portion 366 is pushed and ruptured together with the surface skin 353b by the airbag 343. As indicated by double-dotted lines in FIG. 65, the door portion 367 is opened such that its leading edge 367a pivots around the hinge portion 365 to the interior side. Then, the airbag 343 protrudes from an opening 370 which is made by the displaced door portion 367. The inflated airbag 343 covers the portions of the front and rear side window glasses GR.

At this time, the door portion 367 is arranged on the rear side of the upper end center of the garnish 353. The door portion 367 is opened on the side of its front edge 367a. The folded airbag 343 protrudes from the opening 370 of the door portion 367. Even in this garnish 353 of the sixth embodiment, therefore, the front side upper portion is covered with the portion 343c of the inflated and expanded airbag 343.

In this garnish 353 of the sixth embodiment, the door portion 367 and the body portion 356 are constructed as an integral molding. In other words, the garnish 353 is not constructed to mount the door portion 367 separately. As in the fifth embodiment, therefore, the garnish 353 can be constructed such that the parting line of the door portion 367 is not present on the interior side. Therefore, the rear pillar portion PR can be covered with the rear pillar garnish 353, which is made of the integral molding of the body portion 356 and the door portion 367. As a result, it is possible to improve the appearance and design of the rear pillar portion PR.

In the sixth embodiment, the surface skin 353b is arranged to cover the whole surface of the interior side of the base portion 353a. As a result, the appearance and design of the rear pillar portion PR can be further improved. If appearance may be sacrificed, the garnish 353 can be constructed without the surface skin 353b. In this case, the door portion 367 and the body portion 356 are constructed of the integral molding.

The mounting seats 359 in the vicinity of the door portion 367 are formed of the elastomer portion 354 made of a thermoplastic elastomer. Therefore, the mounting seats 359 supporting the clip portion 130 are not broken when the door portion 367 is pushed and opened by the airbag 343 as the airbag 343 is inflated to expand. This is because any impact is absorbed, even if acting upon the mounting seats 359, by the elasticity of the thermoplastic elastomer. As a result, the pushing force of the inflating and expanding airbag 343 can be properly applied to the door portion 367 to open the door portion 367 smoothly.

In the head-protecting airbag device M6 of the sixth embodiment, the regulating walls 364 and 371 are arranged in the vicinity of the boundary portion between the door portion 367 and the body portion 366. The regulating walls 364 and 371 are arranged to separate the folded airbag 343 and the body portion 356. When the airbag 343 expands, therefore, its force can be guided to the door portion 367. As a result, the door portion 367 can be quickly opened with the assistance of the regulating walls 364 and 371.

In the garnishes 323 and 353 of the fifth and sixth embodiments, the clip portion 330 to be arranged on the mounting seats 329 and 359 is exemplified by one that is detachable from the mounting portions 329 and 359. However, the clip portion may be formed integrally with the mounting seats 327 and 357.

On the other hand, the mounting seats to be mounted on the rear pillar portion body need not be the mounting seats 329 and 359 of the fifth and sixth embodiments. In short, the mounting seats may be any such seats, so long as the seats can be mounted on the rear pillar portion body on the body side. Therefore, the mounting seats may be exemplified by those having mounting holes for inserting bolts or rivets thereinto for fastening the garnish. Alternatively, the mounting seats may be those having the bolts or nuts buried therein. Moreover, the mounting seats may be given a structure in which the clip portions or bolts can be separately assembled after the molding process.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A head-protecting airbag device comprising an airbag cover mounted on a vehicle body which has a retaining hole and includes a folded airbag, said airbag cover being constructed and arranged to cover the folded airbag and comprising a clip portion, said clip portion protruding from a back side of said airbag cover and being insertable along an inserting direction into the retaining hole to establish first and second retaining states, wherein:

in the first retaining state said clip portion cannot be pulled away from the retaining hole in an opposite direction to the inserting direction to extract said clip portion from the retaining hole, in the second retaining state said clip portion is inserted farther in the inserting direction into the inserting hole and is extractable from the vehicle body by pulling said clip portion from the retaining hole in the opposite direction, and the second retaining state of said clip portion is established by pushing said airbag cover in the first retaining state.

2. A head-protecting airbag device according to claim 1, wherein:

said clip portion includes a plurality of pawl members movable relative to each other from a narrow state in which leading end portions of the said pawl members are sufficiently close to each other to permit insertion and extraction of said pawl members into and out of the retaining hole, and a diverging state in which said leading end portions of said pawl members are spaced from each other by a sufficient distance to contact a back side of a circumferential edge of the retaining hole and establish said clip portion in the first retaining state; and wherein said pawl members have respective shrinking guide portions positioned on a front side of the circumferential edge of the retaining hole in the first retaining state, and wherein movement of said clip portion from the first retaining state to the second retaining state causes the retaining hole circumferential edge to move said shrinking guide portions and thereby guide said pawl members from the first retaining state into the second retaining state.

3. A head-protecting airbag device according to claim 1, wherein said clip portion comprises:

a rigid core member including a neck portion protruding from the back side of said airbag cover and a head portion arranged at a leading end of said neck portion, said head portion having a root portion, a leading end, and said head portion being larger in width size than said neck portion; and an elastically deformable cap having first and second grooves and a fixedly retained portion on a leading end side of said first and second grooves, said cap being mountable around said core member into a mounted position in which said cap covers said neck portion and said root portion of said head portion and in which said first groove is positioned in closer proximity to said leading end of said head portion than said second groove, which is positioned at a root portion of said neck portion, wherein in the first retaining state a circumferential edge of the retaining hole is fitted in said first groove and said fixedly retained portion is retained on the back side of the retaining hole such that head portion of said core member is not extractable by movement of said head portion in the opposite direction, wherein in the second retaining state the circumferential edge of the retaining hole is fitted in said second groove, and said fixedly retained portion has an inner side face sufficient in size to permit said head portion of said core member to be inserted therein and extracted from said cap, and wherein in the mounted state, said inner side face of said fixedly retained portion is spaced from said neck portion of said core member by a small clearance sufficient to receive inward deformation of said fixedly retained portion caused by said insertion of said fixedly retained portion through the retaining hole.

4. A head-protecting airbag device according to claim 3, wherein said core member is rod shape.

5. A head-protecting airbag device according to claim 3, wherein said core member is plate shaped.

6. A head-protecting airbag device according to claim 3, wherein said core member is molded integrally with said airbag cover body.

7. A head-protecting airbag device according to claim 3, wherein said cap has at least one slit extending in an axial direction relative to said cap from a leading end of said fixedly retained portion.

8. A head-protecting airbag device according to claim 3, wherein said cap has at least one slit extending in the axial direction relative to said cap throughout the entire length of said cap.

9. A head-protecting airbag device according to claim 3, wherein said core member is interchangeable with said cap and other caps exerting different retaining forces on the circumferential edge of the retaining hole.

10. A head-protecting airbag device according to claim 3, wherein said airbag cover body includes an interchangeable base portion, and wherein said clip portion is mountable on and demountable from said interchangeable base portion.

11. A head-protecting airbag device according to claim 10, wherein said interchangeable base portion has a retaining recess for receiving a portion of said clip portion, and wherein said retaining recess is at a position different from a mounting position at which said clip portion is mounted in the circumferential edge of the retaining hole.

12. A head-protecting airbag device comprising an airbag cover mountable in a vehicle for covering a folded airbag housed from a rear pillar portion to at least a roof side rail portion of the vehicle body, said airbag cover comprising a rear pillar garnish mountable on the rear pillar portion, said rear pillar garnish comprising a body portion and a door portion molded integrally with said body portion, said body portion having a mounting seat mountable on said rear pillar, said door portion being arranged on an upper end side of said garnish and constructed and arranged to open upon inflation and expansion of the airbag, wherein portions of said door portion and said mounting seat of said body portion in the vicinity of said door portion comprises at least one thermoplastic elastomer, and wherein a remaining portion of said door portion and said mounting seat not in the vicinity of said door portion comprises at least one hard synthetic resin, wherein said mounting seat comprises a clip portion insertable along an inserting direction into a retaining hole of the vehicle body to establish first and second retaining states, wherein in the first retaining state said clip portion cannot be pulled away from the retaining hole in an opposite direction to the inserting direction to extract said clip portion from the retaining hole, and wherein in the second retaining state clip portion is inserted farther in the inserting direction into the inserting hole and is extractable from the vehicle body by pulling said clip portion from the retaining hole in the opposite direction, wherein said clip portion comprises:

a rigid core member including a neck portion protruding from the back side of said airbag cover and a head portion arranged at a leading end of said neck portion, said head portion having a root portion, a leading end, and said head portion being larger in width size than said neck portion; and an elastically deformable cap having first and second grooves and a fixedly retained portion on a leading end side of said first and second grooves, said cap being mountable around said core member into a mounted position in which said cap covers said neck portion and said root portion of said head portion and in which said first groove is positioned in closer proximity to said leading end of said head portion than said second groove, which is positioned at a root portion of said neck portion, wherein in the first retaining state a circumferential edge of the retaining hole is fitted in said first groove and said fixedly retained portion is retained on the back side of the retaining hole such that head portion of said core member is not extractable by movement of said head portion in the opposite direction, wherein in the second retaining state the circumferential edge of the retaining hole is fitted in said second groove, and said fixedly retained portion has an inner side face sufficient in size to permit said head portion of said core member to be inserted therein and extracted from said cap, and wherein in the mounted state, said inner side face of said fixedly retained portion is spaced from said neck portion of said core member by a small clearance sufficient to receive inward deformation of said fixedly retained portion caused by said insertion of said fixedly retained portion through the retaining hole.

13. A head-protecting airbag device according to claim 12, wherein said thermoplastic elastomer and said hard synthetic resin are compatible with each other.

14. A head-protecting airbag device according to claim 12, wherein a surface skin is arranged on an interior surface side of said rear pillar garnish to face an interior compartment of the vehicle body.

15. A head-protecting airbag device according to claim 12, wherein said door portion is arranged at an upper edge of said rear pillar garnish, and wherein said door pivots about a hinge portion arranged on a lower edge side of said door portion so that said door is pushed and opened downward as said airbag is inflated and expands.

16. A head-protecting airbag device according to claim 12, wherein said door portion has a rupturable portion of reduced thickness that is ruptured as said airbag is inflated and expands, said rupturable portion facing away from an interior compartment of the vehicle body.

* * * * *